US009805555B2

(12) United States Patent
Baerlocher et al.

(10) Patent No.: US 9,805,555 B2
(45) **Date of Patent: *Oct. 31, 2017**

(54) GAMING DEVICE AND METHOD PROVIDING SLOT GAME HAVING VIRTUAL MAP DRIVEN REEL STOP POSITION DETERMINATIONS

(71) Applicant: IGT, Las Vegas, NV (US)

(72) Inventors: Anthony J. Baerlocher, Henderson, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 829 days.

This patent is subject to a terminal disclaimer.

(21) Appl. No.: 14/218,351

(22) Filed: Mar. 18, 2014

(65) Prior Publication Data

US 2014/0206429 A1 Jul. 24, 2014

Related U.S. Application Data

(63) Continuation of application No. 12/617,385, filed on Nov. 12, 2009, now Pat. No. 8,702,496, which is a
(Continued)

(51) Int. Cl.
*A63F 9/24* (2006.01)
*A63F 13/00* (2014.01)
(Continued)

(52) U.S. Cl.
CPC .................................... *G07F 17/34* (2013.01)

(58) Field of Classification Search
CPC ...... G07F 17/32; G07F 17/34; G07F 17/3244; G07F 17/3213
(Continued)

(56) References Cited

U.S. PATENT DOCUMENTS 4,236,717 A 12/1980 Wichinsky
4,448,419 A 5/1984 Telnaes
(Continued)

FOREIGN PATENT DOCUMENTS

AU 2003/244623 3/2004
EP 0 443 738 8/1991
(Continued)

OTHER PUBLICATIONS

Elvis Game Brochure, published by IGT published in 1999, 2 pages.
(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

Various embodiments of the disclosed gaming device include a housing which supports a plurality of mechanical reels and a plurality of stop input devices which are configured to provide a Pachisuro-style slot game. Each of the plurality of reels is associated with a different one of the plurality of stop input devices. Each stop input device enables a player to stop the respective reel when the reel is spinning by activating the stop input device. Each reel includes a plurality of stop positions and each stop position includes a symbol. The gaming device also includes a processor and a memory device. For each reel, the processor randomly determines the stop position at which the reel ultimately stops based on a virtual map stored in the memory device for an initiating stop position of that reel which is selected by the player's activation of the stop input device for that reel.

25 Claims, 61 Drawing Sheets

Virtual Map For First Reel,
Stop Position 0

| Stop Position | Symbol | Weight |
|---|---|---|
| 17 | Red 7 | 46 |
| 18 | Free Shot | 68 |
| 19 | Orange | 59 |
| 20 | Jackpot | 19 |
| 21 | 1 Bar | 64 |

110a

Related U.S. Application Data continuation-in-part of application No. 12/404,810, filed on Mar. 16, 2009, now Pat. No. 8,911,288.

(51) Int. Cl.
*G06F 17/00* (2006.01)
*G06F 19/00* (2011.01)
*G07F 17/34* (2006.01)

(58) Field of Classification Search
USPC ........................................................ 463/16, 20
See application file for complete search history.

(56) References Cited

U.S. PATENT DOCUMENTS

| | | | |
|---|---|---|---|
| 4,582,324 A | 4/1986 | Koza et al. | |
| 4,618,150 A | 10/1986 | Kimura | |
| 4,657,256 A | 4/1987 | Okada | |
| 4,695,053 A | 9/1987 | Vazquez, Jr. et al. | |
| 4,858,932 A | 8/1989 | Keane | |
| 4,871,171 A | 10/1989 | Rivero | |
| 4,889,339 A | 12/1989 | Okada | |
| 5,074,559 A | 12/1991 | Okada | |
| 5,123,649 A | 6/1992 | Tiberio | |
| 5,263,716 A | 11/1993 | Smyth | |
| 5,342,047 A | 8/1994 | Heidel et al. | |
| 5,393,061 A | 2/1995 | Manship et al. | |
| 5,409,225 A | 4/1995 | Kelly et al. | |
| 5,449,173 A | 9/1995 | Thomas et al. | |
| 5,524,888 A | 6/1996 | Heidel | |
| 5,609,524 A | 3/1997 | Inoue | |
| 5,639,089 A | 6/1997 | Matsumoto et al. | |
| 5,695,188 A | 12/1997 | Ishibashi | |
| 5,769,716 A | 6/1998 | Saffari et al. | |
| 5,772,509 A | 6/1998 | Weiss | |
| 5,788,573 A | 8/1998 | Baerlocher et al. | |
| 5,823,874 A | 10/1998 | Adams | |
| 5,833,536 A | 11/1998 | Davids et al. | |
| 5,833,537 A | 11/1998 | Barrie | |
| 5,848,932 A | 12/1998 | Adams | |
| 5,863,249 A | 1/1999 | Inoue | |
| 5,873,781 A | 2/1999 | Keane | |
| 5,882,261 A | 3/1999 | Adams | |
| 5,910,046 A | 6/1999 | Wada et al. | |
| 5,911,418 A | 6/1999 | Adams | |
| 5,941,770 A | 8/1999 | Miers et al. | |
| 5,951,397 A | 9/1999 | Dickinson | |
| 5,988,638 A * | 11/1999 | Rodesch | G07F 17/32 273/143 R |
| 6,015,346 A | 1/2000 | Bennett | |
| 6,019,369 A | 2/2000 | Nakagawa et al. | |
| 6,047,963 A | 4/2000 | Pierce et al. | |
| 6,050,895 A | 4/2000 | Luciano, Jr. et al. | |
| 6,071,192 A | 6/2000 | Weiss | |
| 6,089,976 A | 7/2000 | Schneider et al. | |
| 6,089,978 A | 7/2000 | Adams | |
| 6,102,798 A | 8/2000 | Bennett | |
| 6,110,039 A | 8/2000 | Oh | |
| 6,110,041 A | 8/2000 | Walker et al. | |
| 6,117,007 A | 9/2000 | Matsuyama et al. | |
| 6,117,008 A | 9/2000 | Machiguchi | |
| 6,139,013 A | 10/2000 | Pierce et al. | |
| 6,142,873 A | 11/2000 | Weiss et al. | |
| 6,142,874 A | 11/2000 | Kodachi et al. | |
| 6,142,875 A | 11/2000 | Kodachi et al. | |
| 6,159,095 A | 12/2000 | Frohm et al. | |
| 6,159,097 A | 12/2000 | Gura | |
| 6,165,070 A | 12/2000 | Nolte et al. | |
| 6,174,233 B1 | 1/2001 | Sunaga et al. | |
| 6,174,235 B1 | 1/2001 | Walker et al. | |
| 6,210,279 B1 | 4/2001 | Dickinson | |
| 6,220,593 B1 | 4/2001 | Pierce et al. | |
| 6,261,177 B1 | 7/2001 | Bennett | |
| 6,267,669 B1 | 7/2001 | Luciano, Jr. et al. | |
| 6,270,408 B1 | 8/2001 | Sakamoto et al. | |
| 6,315,660 B1 | 11/2001 | Demar et al. | |
| 6,315,664 B1 | 11/2001 | Baerlocher et al. | |
| 6,464,581 B1 | 10/2002 | Yoseloff et al. | |
| 6,506,114 B1 | 1/2003 | Estes et al. | |
| 6,572,473 B1 | 6/2003 | Baerlocher | |
| 6,641,477 B1 | 11/2003 | Dietz, II | |
| 6,666,766 B2 | 12/2003 | Baerlocher et al. | |
| 6,676,512 B2 | 1/2004 | Fong et al. | |
| 6,726,204 B2 | 4/2004 | Inoue | |
| 6,761,632 B2 | 7/2004 | Bansemer et al. | |
| 6,780,103 B2 | 8/2004 | Bansemer et al. | |
| 6,835,133 B2 | 12/2004 | Baerlocher et al. | |
| 6,852,027 B2 | 2/2005 | Kaminkow et al. | |
| 6,855,054 B2 | 2/2005 | White et al. | |
| 6,863,606 B1 | 3/2005 | Berg et al. | |
| 6,918,830 B2 | 7/2005 | Baerlocher | |
| 6,942,568 B2 | 9/2005 | Baerlocher | |
| 6,942,571 B1 | 9/2005 | Mcallister et al. | |
| 6,984,174 B2 | 1/2006 | Cannon et al. | |
| 7,056,210 B2 | 6/2006 | Bansemer et al. | |
| 7,077,744 B2 | 7/2006 | Cannon | |
| 7,169,044 B2 | 1/2007 | Baerlocher et al. | |
| 7,175,521 B2 | 2/2007 | Mcclintic | |
| 7,175,524 B2 | 2/2007 | Bansemer et al. | |
| 7,326,115 B2 | 2/2008 | Baerlocher | |
| 7,473,175 B2 | 1/2009 | Baerlocher | |
| 2003/0036420 A1* | 2/2003 | Baerlocher | G07F 17/32 463/16 |
| 2003/0125107 A1 | 7/2003 | Cannon et al. | |
| 2003/0207707 A1 | 11/2003 | Slomiany et al. | |
| 2004/0023713 A1 | 2/2004 | Wolf et al. | |
| 2004/0029636 A1 | 2/2004 | Wells | |
| 2004/0048650 A1 | 3/2004 | Mierau et al. | |
| 2004/0219965 A1* | 11/2004 | Okada | G07F 17/3202 463/16 |
| 2005/0003880 A1 | 1/2005 | Englman et al. | |
| 2005/0009595 A1 | 1/2005 | Boyd et al. | |
| 2005/0029977 A1 | 2/2005 | Nireki et al. | |
| 2005/0101378 A1 | 5/2005 | Kaminkow et al. | |
| 2006/0046830 A1 | 3/2006 | Webb et al. | |
| 2006/0178200 A1 | 8/2006 | Shiraishi | |
| 2006/0205474 A1 | 9/2006 | Bansemer et al. | |
| 2007/0129133 A1 | 6/2007 | Bansemer et al. | |
| 2007/0155464 A1 | 7/2007 | Baerlocher et al. | |
| 2007/0202943 A1 | 8/2007 | Thomas | |
| 2008/0026818 A1 | 1/2008 | Okada | |
| 2008/0119283 A1 | 5/2008 | Baerlocher | |
| 2008/0311980 A1 | 12/2008 | Cannon | |
| 2009/0258696 A1 | 10/2009 | Chim | |

FOREIGN PATENT DOCUMENTS

| | | |
|---|---|---|
| EP | 0 688 002 | 12/1995 |
| EP | 1 184 822 | 3/2002 |
| GB | 1 476 848 | 6/1977 |
| GB | 2090690 | 7/1982 |
| GB | 2 100 905 | 6/1983 |
| GB | 2 147 442 | 9/1985 |
| GB | 2 165 385 | 9/1986 |
| GB | 2 180 087 | 3/1987 |
| GB | 2 183 883 | 6/1987 |
| GB | 2 226 436 | 6/1990 |
| GB | 2225889 | 6/1990 |
| GB | 2 335 524 | 9/1999 |
| GB | 2 393 555 | 3/2004 |
| JP | H11-9765 | 1/1999 |
| WO | WO 88/08179 | 10/1988 |
| WO | WO 00/12186 | 3/2000 |
| WO | WO 2006/028860 | 3/2006 |

OTHER PUBLICATIONS

Office Action for U.S. Appl. No. 12/404,810 dated Aug. 9, 2011, 34 pages.

Office Action for U.S. Appl. No. 12/404,810 dated Jan. 23, 2012, 20 pages.

Pachinko Game Description at http://en.Wikipedia.org.wiki/Pachinko, printed May 12, 2009, 12 pages.

(56) References Cited

OTHER PUBLICATIONS

Pachinko Game Description at http://www.pachinko.com/English, written by Real Entertainment Ltd., printed Mar. 21, 2001, 1 page.
Party Time Razzle Dazzle Advertisement, written by IGT, published in 1999, 2 pages.
PC Plinko Game Description at www.pcmicro.com/66s/ra95c.htm, written by iiP Tech, Inc., 1993, 6 pages.
Pinball Advertisement, written by IGT, published in 2004, 2 pages.
Pachinko Game Description, written by Brian Kent, published in 1997, 4 pages.
Press Your Luck Article published by Strictly Slots in Dec. 2000, 1 page.
Primetime Amusements Redemption Games at www.primetimeamusements.com, printed on Feb. 28, 2002, 1 page.
Slot Machine Description at http://en.wikipdia.org/wiki/slot_machine, printed May 12, 2009, 17 pages.
Power Slotto Article, published by Strictly Slots in Jul. 2001, 1 page.

* cited by examiner

FIG. 3

100

| Stop Position | First Reel (54a) | Second Reel (54b) | Third Reel (54c) |
|---|---|---|---|
| 0 | Orange | 2 Bar | Cherry |
| 1 | Bonus | Free Shot | Blue 7 |
| 2 | 3 Bar | Bonus | Red 7 |
| 3 | Jackpot | 1 Bar | Bell |
| 4 | Bell | Bell | Freeshot |
| 5 | Free Shot | Jackpot | Jackpot |
| 6 | Orange | Free Shot | 1 Bar |
| 7 | Blue 7 | 3 Bar | Orange |
| 8 | 1 Bar | Blue 7 | Free Shot |
| 9 | Red 7 | Cherry | 2 Bar |
| 10 | 2 Bar | Orange | Bonus |
| 11 | Free Shot | Blue 7 | 3 Bar |
| 12 | Bell | Jackpot | Blue 7 |
| 13 | Blue 7 | 3 Bar | Bonus |
| 14 | Cherry | Bell | Free Shot |
| 15 | 2 Bar | Cherry | Bell |
| 16 | Blue 7 | Red 7 | 2 Bar |
| 17 | Red 7 | Orange | Bonus |
| 18 | Free Shot | Bonus | Orange |
| 19 | Orange | Free Shot | Free Shot |
| 20 | Jackpot | 3 Bar | Red 7 |
| 21 | 1 Bar | 1 Bar | 1 Bar |

FIG. 5A

110a

Virtual Map For First Reel,
Stop Position 0

| Stop Position | Symbol | Weight |
|---|---|---|
| 17 | Red 7 | 46 |
| 18 | Free Shot | 68 |
| 19 | Orange | 59 |
| 20 | Jackpot | 19 |
| 21 | 1 Bar | 64 |

FIG. 5B

110b

Virtual Map For First Reel,
Stop Position 1

| Stop Position | Symbol | Weight |
|---|---|---|
| 18 | Free Shot | 85 |
| 19 | Orange | 26 |
| 20 | Jackpot | 28 |
| 21 | 1 Bar | 19 |
| 0 | Orange | 98 |

FIG. 5C

110c

Virtual Map For First Reel,
Stop Position 2

| Stop Position | Symbol | Weight |
|---|---|---|
| 19 | Orange | 24 |
| 20 | Jackpot | 46 |
| 21 | 1 Bar | 13 |
| 0 | Orange | 75 |
| 1 | Bonus | 98 |

FIG. 5D

Virtual Map For First Reel,
Stop Position 3

110d

| Stop Position | Symbol | Weight |
|---|---|---|
| 20 | Jackpot | 56 |
| 21 | 1 Bar | 18 |
| 0 | Orange | 98 |
| 1 | Bonus | 72 |
| 2 | 3 Bar | 12 |

FIG. 5E

Virtual Map For First Reel,
Stop Position 4

110e

| Stop Position | Symbol | Weight |
|---|---|---|
| 21 | 1 Bar | 40 |
| 0 | Orange | 60 |
| 1 | Bonus | 88 |
| 2 | 3 Bar | 40 |
| 3 | Jackpot | 28 |

FIG. 5F

Virtual Map For First Reel,
Stop Position 5

110f

| Stop Position | Symbol | Weight |
|---|---|---|
| 0 | Orange | 105 |
| 1 | Bonus | 80 |
| 2 | 3 Bar | 15 |
| 3 | Jackpot | 48 |
| 4 | Bell | 10 |

FIG. 5G

110g

Virtual Map For First Reel, Stop Position 6

| Stop Position | Symbol | Weight |
|---|---|---|
| 1 | Bonus | 102 |
| 2 | 3 Bar | 16 |
| 3 | Jackpot | 59 |
| 4 | Bell | 10 |
| 5 | Free Shot | 69 |

FIG. 5H

110h

Virtual Map For First Reel, Stop Position 7

| Stop Position | Symbol | Weight |
|---|---|---|
| 2 | 3 Bar | 20 |
| 3 | Jackpot | 64 |
| 4 | Bell | 11 |
| 5 | Free Shot | 54 |
| 6 | Orange | 107 |

FIG. 5I

110i

Virtual Map For First Reel, Stop Position 8

| Stop Position | Symbol | Weight |
|---|---|---|
| 3 | Jackpot | 47 |
| 4 | Bell | 9 |
| 5 | Free Shot | 25 |
| 6 | Orange | 80 |
| 7 | Blue 7 | 95 |

FIG. 5J

110j

Virtual Map For First Reel,
Stop Position 9

| Stop Position | Symbol | Weight |
|---|---|---|
| 4 | Bell | 7 |
| 5 | Free Shot | 42 |
| 6 | Orange | 64 |
| 7 | Blue 7 | 87 |
| 8 | 1 Bar | 56 |

FIG. 5K

110k

Virtual Map For First Reel,
Stop Position 10

| Stop Position | Symbol | Weight |
|---|---|---|
| 5 | Free Shot | 46 |
| 6 | Orange | 33 |
| 7 | Blue 7 | 72 |
| 8 | 1 Bar | 24 |
| 9 | Red 7 | 81 |

FIG. 5L

110l

Virtual Map For First Reel,
Stop Position 11

| Stop Position | Symbol | Weight |
|---|---|---|
| 6 | Orange | 46 |
| 7 | Blue 7 | 74 |
| 8 | 1 Bar | 19 |
| 9 | Red 7 | 73 |
| 10 | 2 Bar | 44 |

FIG. 5M

Virtual Map For First Reel, Stop Position 12

| Stop Position | Symbol | Weight |
|---|---|---|
| 7 | Blue 7 | 65 |
| 8 | 1 Bar | 16 |
| 9 | Red 7 | 51 |
| 10 | 2 Bar | 19 |
| 11 | Free Shot | 105 |

110m

FIG. 5N

Virtual Map For First Reel, Stop Position 13

| Stop Position | Symbol | Weight |
|---|---|---|
| 8 | 1 Bar | 19 |
| 9 | Red 7 | 61 |
| 10 | 2 Bar | 20 |
| 11 | Free Shot | 84 |
| 12 | Bell | 72 |

110n

FIG. 5O

Virtual Map For First Reel, Stop Position 14

| Stop Position | Symbol | Weight |
|---|---|---|
| 9 | Red 7 | 65 |
| 10 | 2 Bar | 29 |
| 11 | Free Shot | 94 |
| 12 | Bell | 44 |
| 13 | Blue 7 | 24 |

110o

FIG. 5P

110p

Virtual Map For First Reel, Stop Position 15

| Stop Position | Symbol | Weight |
|---|---|---|
| 10 | 2 Bar | 47 |
| 11 | Free Shot | 91 |
| 12 | Bell | 82 |
| 13 | Blue 7 | 6 |
| 14 | Cherry | 30 |

FIG. 5Q

110q

Virtual Map For First Reel, Stop Position 16

| Stop Position | Symbol | Weight |
|---|---|---|
| 11 | Free Shot | 100 |
| 12 | Bell | 89 |
| 13 | Blue 7 | 8 |
| 14 | Cherry | 48 |
| 15 | 2 Bar | 11 |

FIG. 5R

110r

Virtual Map For First Reel, Stop Position 17

| Stop Position | Symbol | Weight |
|---|---|---|
| 12 | Bell | 102 |
| 13 | Blue 7 | 7 |
| 14 | Cherry | 42 |
| 15 | 2 Bar | 11 |
| 16 | Blue 7 | 94 |

FIG. 5S

110s

Virtual Map For First Reel,
Stop Position 18

| Stop Position | Symbol | Weight |
|---|---|---|
| 13 | Blue 7 | 8 |
| 14 | Cherry | 48 |
| 15 | 2 Bar | 9 |
| 16 | Blue 7 | 98 |
| 17 | Red 7 | 93 |

FIG. 5T

110t

Virtual Map For First Reel,
Stop Position 19

| Stop Position | Symbol | Weight |
|---|---|---|
| 14 | Cherry | 33 |
| 15 | 2 Bar | 10 |
| 16 | Blue 7 | 64 |
| 17 | Red 7 | 61 |
| 18 | Free Shot | 88 |

FIG. 5U

110u

Virtual Map For First Reel,
Stop Position 20

| Stop Position | Symbol | Weight |
|---|---|---|
| 15 | 2 Bar | 11 |
| 16 | Blue 7 | 71 |
| 17 | Red 7 | 78 |
| 18 | Free Shot | 80 |
| 19 | Orange | 16 |

FIG. 5V

Virtual Map For First Reel,
Stop Position 21

| Stop Position | Symbol | Weight |
|---|---|---|
| 16 | Blue 7 | 70 |
| 17 | Red 7 | 78 |
| 18 | Free Shot | 80 |
| 19 | Orange | 10 |
| 20 | Jackpot | 18 |

110v

FIG. 6A

120a

Virtual Map For Second Reel,
Stop Position 0

| Stop Position | Symbol | Weight |
|---|---|---|
| 17 | Orange | 38 |
| 18 | Bonus | 89 |
| 19 | Free Shot | 61 |
| 20 | 3 Bar | 25 |
| 21 | 1 Bar | 43 |

FIG. 6B

120b

Virtual Map For Second Reel,
Stop Position 1

| Stop Position | Symbol | Weight |
|---|---|---|
| 18 | Bonus | 52 |
| 19 | Free Shot | 42 |
| 20 | 3 Bar | 51 |
| 21 | 1 Bar | 52 |
| 0 | 2 Bar | 59 |

FIG. 6C

120c

Virtual Map For Second Reel,
Stop Position 2

| Stop Position | Symbol | Weight |
|---|---|---|
| 19 | Free Shot | 56 |
| 20 | 3 Bar | 61 |
| 21 | 1 Bar | 38 |
| 0 | 2 Bar | 35 |
| 1 | Free Shot | 66 |

FIG. 6D

Virtual Map For Second Reel, Stop Position 3

120d

| Stop Position | Symbol | Weight |
|---|---|---|
| 20 | 3 Bar | 34 |
| 21 | 1 Bar | 77 |
| 0 | 2 Bar | 42 |
| 1 | Free Shot | 21 |
| 2 | Bonus | 72 |

FIG. 6E

Virtual Map For Second Reel, Stop Position 4

120e

| Stop Position | Symbol | Weight |
|---|---|---|
| 21 | 1 Bar | 63 |
| 0 | 2 Bar | 53 |
| 1 | Free Shot | 40 |
| 2 | Bonus | 39 |
| 3 | 1 Bar | 61 |

FIG. 6F

Virtual Map For Second Reel, Stop Position 5

120f

| Stop Position | Symbol | Weight |
|---|---|---|
| 0 | 2 Bar | 52 |
| 1 | Free Shot | 48 |
| 2 | Bonus | 39 |
| 3 | 1 Bar | 69 |
| 4 | Bell | 48 |

FIG. 6G

120g

Virtual Map For Second Reel, Stop Position 6

| Stop Position | Symbol | Weight |
|---|---|---|
| 1 | Free Shot | 25 |
| 2 | Bonus | 114 |
| 3 | 1 Bar | 40 |
| 4 | Bell | 11 |
| 5 | Jackpot | 66 |

FIG. 6H

120h

Virtual Map For Second Reel, Stop Position 7

| Stop Position | Symbol | Weight |
|---|---|---|
| 2 | Bonus | 35 |
| 3 | 1 Bar | 99 |
| 4 | Bell | 45 |
| 5 | Jackpot | 11 |
| 6 | Free Shot | 66 |

FIG. 6I

120i

Virtual Map For Second Reel, Stop Position 8

| Stop Position | Symbol | Weight |
|---|---|---|
| 3 | 1 Bar | 50 |
| 4 | Bell | 57 |
| 5 | Jackpot | 10 |
| 6 | Free Shot | 60 |
| 7 | 3 Bar | 79 |

FIG. 6J

120j

Virtual Map For Second Reel, Stop Position 9

| Stop Position | Symbol | Weight |
|---|---|---|
| 4 | Bell | 29 |
| 5 | Jackpot | 6 |
| 6 | Freeshot | 48 |
| 7 | 3 Bar | 101 |
| 8 | Blue 7 | 72 |

FIG. 6K

120k

Virtual Map For Second Reel, Stop Position 10

| Stop Position | Symbol | Weight |
|---|---|---|
| 5 | Jackpot | 36 |
| 6 | Free Shot | 63 |
| 7 | 3 Bar | 80 |
| 8 | Blue 7 | 66 |
| 9 | Cherry | 11 |

FIG. 6L

120l

Virtual Map For Second Reel, Stop Position 11

| Stop Position | Symbol | Weight |
|---|---|---|
| 6 | Free Shot | 80 |
| 7 | 3 Bar | 64 |
| 8 | Blue 7 | 45 |
| 9 | Cherry | 11 |
| 10 | Orange | 56 |

FIG. 6M

120m

Virtual Map For Second Reel,
Stop Position 12

| Stop Position | Symbol | Weight |
|---|---|---|
| 7 | 3 Bar | 99 |
| 8 | Blue 7 | 12 |
| 9 | Cherry | 73 |
| 10 | Orange | 56 |
| 11 | Blue 7 | 16 |

FIG. 6N

120n

Virtual Map For Second Reel,
Stop Position 13

| Stop Position | Symbol | Weight |
|---|---|---|
| 8 | Blue 7 | 59 |
| 9 | Cherry | 26 |
| 10 | Orange | 79 |
| 11 | Blue 7 | 48 |
| 12 | Jackpot | 44 |

FIG. 6O

120o

Virtual Map For Second Reel,
Stop Position 14

| Stop Position | Symbol | Weight |
|---|---|---|
| 9 | Cherry | 53 |
| 10 | Orange | 12 |
| 11 | Blue 7 | 55 |
| 12 | Jackpot | 91 |
| 13 | 3 Bar | 45 |

FIG. 6P

Virtual Map For Second Reel, Stop Position 15 (120p)

| Stop Position | Symbol | Weight |
|---|---|---|
| 10 | Orange | 10 |
| 11 | Blue 7 | 71 |
| 12 | Jackpot | 89 |
| 13 | 3 Bar | 75 |
| 14 | Bell | 11 |

FIG. 6Q

Virtual Map For Second Reel, Stop Position 16 (120q)

| Stop Position | Symbol | Weight |
|---|---|---|
| 11 | Blue 7 | 98 |
| 12 | Jackpot | 36 |
| 13 | 3 Bar | 101 |
| 14 | Bell | 18 |
| 15 | Cherry | 3 |

FIG. 6R

Virtual Map For Second Reel, Stop Position 17 (120r)

| Stop Position | Symbol | Weight |
|---|---|---|
| 12 | Jackpot | 83 |
| 13 | 3 Bar | 109 |
| 14 | Bell | 30 |
| 15 | Cherry | 5 |
| 16 | Red 7 | 29 |

FIG. 6S

120s

Virtual Map For Second Reel, Stop Position 18

| Stop Position | Symbol | Weight |
|---|---|---|
| 13 | 3 Bar | 105 |
| 14 | Bell | 24 |
| 15 | Cherry | 4 |
| 16 | Red 7 | 23 |
| 17 | Orange | 100 |

FIG. 6T

120t

Virtual Map For Second Reel, Stop Position 19

| Stop Position | Symbol | Weight |
|---|---|---|
| 14 | Bell | 29 |
| 15 | Cherry | 5 |
| 16 | Red 7 | 21 |
| 17 | Orange | 99 |
| 18 | Bonus | 102 |

FIG. 6U

120u

Virtual Map For Second Reel, Stop Position 20

| Stop Position | Symbol | Weight |
|---|---|---|
| 15 | Cherry | 4 |
| 16 | Red 7 | 19 |
| 17 | Orange | 51 |
| 18 | Bonus | 93 |
| 19 | Free Shot | 89 |

FIG. 6V

Virtual Map For Second Reel,
Stop Position 21

| Stop Position | Symbol | Weight |
|---|---|---|
| 16 | Red 7 | 24 |
| 17 | Orange | 62 |
| 18 | Bonus | 56 |
| 19 | Free Shot | 65 |
| 20 | 3 Bar | 49 |

120v

FIG. 7A

Virtual Map For Third Reel, Stop Position 0

130a

| Stop Position | Symbol | Weight |
|---|---|---|
| 17 | Bonus | 77 |
| 18 | Orange | 78 |
| 19 | Free Shot | 48 |
| 20 | Red 7 | 33 |
| 21 | 1 Bar | 20 |

FIG. 7B

Virtual Map For Third Reel, Stop Position 1

130b

| Stop Position | Symbol | Weight |
|---|---|---|
| 18 | Orange | 77 |
| 19 | Free Shot | 73 |
| 20 | Red 7 | 66 |
| 21 | 1 Bar | 11 |
| 0 | Cherry | 29 |

FIG. 7C

Virtual Map For Third Reel, Stop Position 2

130c

| Stop Position | Symbol | Weight |
|---|---|---|
| 19 | Free Shot | 51 |
| 20 | Red 7 | 154 |
| 21 | 1 Bar | 27 |
| 0 | Cherry | 16 |
| 1 | Blue 7 | 8 |

FIG. 7D

130d

Virtual Map For Third Reel, Stop Position 3

| Stop Position | Symbol | Weight |
|---|---|---|
| 20 | Red 7 | 51 |
| 21 | 1 Bar | 154 |
| 0 | Cherry | 27 |
| 1 | Blue 7 | 16 |
| 2 | Red 7 | 8 |

FIG. 7E

130e

Virtual Map For Third Reel, Stop Position 4

| Stop Position | Symbol | Weight |
|---|---|---|
| 21 | 1 Bar | 15 |
| 0 | Cherry | 86 |
| 1 | Blue 7 | 43 |
| 2 | Red 7 | 58 |
| 3 | Bell | 54 |

FIG. 7F

130f

Virtual Map For Third Reel, Stop Position 5

| Stop Position | Symbol | Weight |
|---|---|---|
| 0 | Cherry | 77 |
| 1 | Blue 7 | 19 |
| 2 | Red 7 | 16 |
| 3 | Bell | 97 |
| 4 | Free Shot | 47 |

FIG. 7G

130g

Virtual Map For Third Reel, Stop Position 6

| Stop Position | Symbol | Weight |
|---|---|---|
| 1 | Blue 7 | 35 |
| 2 | Red 7 | 98 |
| 3 | Bell | 55 |
| 4 | Free Shot | 49 |
| 5 | Jackpot | 19 |

FIG. 7H

130h

Virtual Map For Third Reel, Stop Position 7

| Stop Position | Symbol | Weight |
|---|---|---|
| 2 | Red 7 | 102 |
| 3 | Bell | 49 |
| 4 | Free Shot | 10 |
| 5 | Jackpot | 60 |
| 6 | 1 Bar | 35 |

FIG. 7I

130i

Virtual Map For Third Reel, Stop Position 8

| Stop Position | Symbol | Weight |
|---|---|---|
| 3 | Blue 7 | 68 |
| 4 | Free Shot | 53 |
| 5 | Jackpot | 26 |
| 6 | 1 Bar | 22 |
| 7 | Orange | 87 |

FIG. 7J

130j

Virtual Map For Third Reel, Stop Position 9

| Stop Position | Symbol | Weight |
|---|---|---|
| 4 | Free Shot | 51 |
| 5 | Jackpot | 154 |
| 6 | 1 Bar | 27 |
| 7 | Orange | 16 |
| 8 | Free Shot | 8 |

FIG. 7K

130k

Virtual Map For Third Reel, Stop Position 10

| Stop Position | Symbol | Weight |
|---|---|---|
| 5 | Jackpot | 51 |
| 6 | 1 Bar | 8 |
| 7 | Orange | 27 |
| 8 | Free Shot | 16 |
| 9 | 2 Bar | 154 |

FIG. 7L

130l

Virtual Map For Third Reel, Stop Position 11

| Stop Position | Symbol | Weight |
|---|---|---|
| 6 | 1 Bar | 20 |
| 7 | Orange | 68 |
| 8 | Free Shot | 69 |
| 9 | 2 Bar | 35 |
| 10 | Bonus | 64 |

FIG. 7M

130m

Virtual Map For Third Reel, Stop Position 12

| Stop Position | Symbol | Weight |
|---|---|---|
| 7 | Orange | 59 |
| 8 | Free Shot | 64 |
| 9 | 2 Bar | 39 |
| 10 | Bonus | 56 |
| 11 | 3 Bar | 38 |

FIG. 7N

130n

Virtual Map For Third Reel, Stop Position 13

| Stop Position | Symbol | Weight |
|---|---|---|
| 8 | Free Shot | 78 |
| 9 | 2 Bar | 49 |
| 10 | Bonus | 64 |
| 11 | 3 Bar | 47 |
| 12 | Blue 7 | 18 |

FIG. 7O

130o

Virtual Map For Third Reel, Stop Position 14

| Stop Position | Symbol | Weight |
|---|---|---|
| 9 | 2 Bar | 61 |
| 10 | Bonus | 52 |
| 11 | 3 Bar | 39 |
| 12 | Blue 7 | 56 |
| 13 | Bonus | 48 |

FIG. 7P

130p

Virtual Map For Third Reel,
Stop Position 15

| Stop Position | Symbol | Weight |
|---|---|---|
| 10 | Bonus | 59 |
| 11 | 3 Bar | 38 |
| 12 | Blue 7 | 61 |
| 13 | Bonus | 48 |
| 14 | Free Shot | 50 |

FIG. 7Q

130q

Virtual Map For Third Reel,
Stop Position 16

| Stop Position | Symbol | Weight |
|---|---|---|
| 11 | 3 Bar | 19 |
| 12 | Blue 7 | 67 |
| 13 | Bonus | 23 |
| 14 | Free Shot | 69 |
| 15 | Bell | 78 |

FIG. 7R

130r

Virtual Map For Third Reel,
Stop Position 17

| Stop Position | Symbol | Weight |
|---|---|---|
| 12 | Blue 7 | 38 |
| 13 | Bonus | 28 |
| 14 | Free Shot | 71 |
| 15 | Bell | 68 |
| 16 | 2 Bar | 51 |

FIG. 7S

130s

Virtual Map For Third Reel, Stop Position 18

| Stop Position | Symbol | Weight |
|---|---|---|
| 13 | Bonus | 32 |
| 14 | Free Shot | 55 |
| 15 | Bell | 56 |
| 16 | 2 Bar | 65 |
| 17 | Bonus | 48 |

FIG. 7T

130t

Virtual Map For Third Reel, Stop Position 19

| Stop Position | Symbol | Weight |
|---|---|---|
| 14 | Free Shot | 63 |
| 15 | Bell | 56 |
| 16 | 2 Bar | 40 |
| 17 | Bonus | 56 |
| 18 | Orange | 41 |

FIG. 7U

130u

Virtual Map For Third Reel, Stop Position 20

| Stop Position | Symbol | Weight |
|---|---|---|
| 15 | Bell | 51 |
| 16 | 2 Bar | 57 |
| 17 | Bonus | 61 |
| 18 | Orange | 58 |
| 19 | Free Shot | 29 |

FIG. 7V

Virtual Map For Third Reel, Stop Position 21

| Stop Position | Symbol | Weight |
|---|---|---|
| 16 | 2 Bar | 49 |
| 17 | Bonus | 55 |
| 18 | Orange | 68 |
| 19 | Free Shot | 40 |
| 20 | Red 7 | 44 |

130v

FIG. 9

140

| Symbol Combination | | | Award |
|---|---|---|---|
| Cherry | xx | xx | 1 |
| xx | Cherry | xx | 1 |
| xx | xx | Cherry | 1 |
| Free Shot | Free Shot | Free Shot | Free Spin |
| Cherry | Cherry | xx | 5 |
| Cherry | xx | Cherry | 5 |
| xx | Cherry | Cherry | 5 |
| 1 Bar, 2 Bar, or 3 Bar | 1 Bar, 2 Bar, or 3 Bar | 1 Bar, 2 Bar, or 3 Bar | 5 |
| Cherry | Cherry | Cherry | 10 |
| 1 Bar | 1 Bar | 1 Bar | 10 |
| Orange | Orange | Orange | 20 |
| 2 Bar | 2 Bar | 2 Bar | 25 |
| 3 Bar | 3 Bar | 3 Bar | 40 |
| Bell | Bell | Bell | 50 |
| Blue 7 or Red 7 | Blue 7 or Red 7 | Blue 7 or Red 7 | 60 |
| Blue 7 | Blue 7 | Blue 7 | 100 |
| Red 7 | Red 7 | Red 7 | 200 |
| Jackpot | Jackpot | Jackpot | 1000 |
| Bonus | Bonus | Bonus | 250 |

FIG. 10

| Stop Position Combination | | | Multiplier Table |
|---|---|---|---|
| First Reel | Second Reel | Third Reel | |
| 0 | 0 | 0 | Q |
| . | . | . | . |
| . | . | . | . |
| . | . | . | . |
| 1 | 2 | 3 | S |
| . | . | . | . |
| . | . | . | . |
| . | . | . | . |
| 6 | 9 | 7 | D1 |
| . | . | . | . |
| . | . | . | . |
| . | . | . | . |
| 12 | 20 | 5 | Y |
| . | . | . | . |
| . | . | . | . |
| . | . | . | . |
| 21 | 21 | 21 | . |
| | | | . |

FIG. 11

| Stop Position Combination | | | Payback Percentage Per Credit of Component Paytable | Multiplier Table | Average Multiplier | Adjusted Payback Percentage Per Credit of Component Table |
|---|---|---|---|---|---|---|
| First Reel | Second Reel | Third Reel | | | | |
| 0 | 0 | 0 | 33.13% | Q | 2.55 | 84.49% |
| . . . | . . . | . . . | . . . | . . . | . . . | . . . |
| 1 | 2 | 3 | 42.15% | S | 2.1 | 88.52% |
| . . . | . . . | . . . | . . . | . . . | . . . | . . . |
| 6 | 9 | 7 | 79.72% | D1 | 1.18 | 94.07% |
| . . . | . . . | . . . | . . . | . . . | . . . | . . . |
| 12 | 20 | 5 | 64.04% | Y | 1.4 | 89.65% |
| . . . | . . . | . . . | . . . | . . . | . . . | . . . |
| 21 | 21 | 21 | | | | |
| | | | | | | 89.18% |

FIG. 12

170

| Multiplier Table | Minimum Base Average Expected Payback Percentage | Maximum Base Average Expected Payback Percentage | Average Multiplier |
|---|---|---|---|
| A | 10.00% | 11.00% | 8.3 |
| B | 11.01% | 12.00% | 7.6 |
| C | 12.01% | 13.50% | 6.9 |
| D | 13.51% | 15.00% | 6.15 |
| E | 15.01% | 17.00% | 5.5 |
| F | 17.01% | 19.00% | 4.9 |
| G | 19.01% | 21.00% | 4.4 |
| L | 21.01% | 23.00% | 4 |
| M | 23.01% | 25.00% | 3.65 |
| N | 25.01% | 27.50% | 3.35 |
| O | 27.51% | 30.00% | 3.05 |
| P | 30.01% | 33.00% | 2.8 |
| Q | 33.01% | 36.50% | 2.55 |
| R | 36.51% | 40.00% | 2.3 |
| S | 40.01% | 44.00% | 2.1 |
| T | 44.01% | 48.00% | 1.95 |
| U | 48.01% | 52.00% | 1.8 |
| V | 52.01% | 55.00% | 1.7 |
| W | 55.01% | 58.00% | 1.6 |
| X | 58.01% | 62.00% | 1.5 |
| Y | 62.01% | 66.00% | 1.4 |
| Z | 66.01% | 70.00% | 1.32 |
| A1 | 70.01% | 72.50% | 1.3 |
| B1 | 72.51% | 75.00% | 1.26 |
| C1 | 75.01% | 77.50% | 1.2 |
| D1 | 77.51% | 80.00% | 1.18 |

FIG. 14

150

| | First Payline 52a | | | Second Payline 52b | | | Third Payline 52c | | | Fourth Payline 52d | | | Fifth Payline 52e | | |
|---|---|---|---|---|---|---|---|---|---|---|---|---|---|---|---|
| | First Reel 54a | Second Reel 54b | Third Reel 54c | First Reel 54a | Second Reel 54b | Third Reel 54c | First Reel 54a | Second Reel 54b | Third Reel 54c | First Reel 54a | Second Reel 54b | Third Reel 54c | First Reel 54a | Second Reel 54b | Third Reel 54c |
| Cherry | 0 | 0 | 0 | 0 | 0 | 0 | 0 | 0 | 20 | 0 | 0 | 20 | 0 | 0 | 0 |
| 1 Bar | 64 | 43 | 20 | 0 | 0 | 0 | 19 | 25 | 33 | 0 | 43 | 33 | 19 | 43 | 0 |
| 2 Bar | 0 | 0 | 0 | 0 | 0 | 77 | 0 | 43 | 0 | 0 | 0 | 0 | 0 | 0 | 77 |
| 3 Bar | 0 | 25 | 0 | 0 | 43 | 0 | 0 | 61 | 0 | 0 | 25 | 0 | 0 | 25 | 0 |
| Orange | 59 | 38 | 78 | 19 | 89 | 48 | 132 | 0 | 77 | 19 | 38 | 77 | 132 | 38 | 48 |
| Bell | 0 | 0 | 0 | 0 | 0 | 0 | 0 | 0 | 0 | 0 | 0 | 0 | 0 | 0 | 0 |
| Blue 7 | 0 | 0 | 0 | 46 | 0 | 0 | 0 | 0 | 0 | 46 | 0 | 0 | 0 | 0 | 0 |
| Red 7 | 46 | 0 | 33 | 68 | 38 | 20 | 0 | 0 | 48 | 68 | 0 | 48 | 0 | 0 | 20 |
| Jackpot | 19 | 0 | 0 | 64 | 0 | 0 | 59 | 0 | 0 | 64 | 0 | 0 | 59 | 0 | 0 |
| Free Shot | 68 | 61 | 48 | 59 | 25 | 33 | 46 | 89 | 78 | 59 | 61 | 78 | 46 | 61 | 33 |
| Bonus | 0 | 89 | 77 | 0 | 61 | 78 | 0 | 38 | 0 | 0 | 89 | 0 | 0 | 89 | 78 |
| | 256 | 256 | 256 | 256 | 256 | 256 | 256 | 256 | 256 | 256 | 256 | 256 | 256 | 256 | 256 |

FIG. 15

160

| Symbol Combination | | | Award | First Payline Combined Weight (52a) | Second Payline Combined Weight (52b) | Third Payline Combined Weight (52c) | Fourth Payline Combined Weight (52d) | Fifth Payline Combined Weight (52e) | Probability | Contribution |
|---|---|---|---|---|---|---|---|---|---|---|
| Cherry | xx | xx | 1 | 0 | 0 | 0 | 0 | 0 | 0.000% | 0.000% |
| xx | Cherry | xx | 1 | 0 | 0 | 0 | 0 | 0 | 0.000% | 0.000% |
| xx | xx | Cherry | 1 | 0 | 0 | 1310720 | 1310720 | 0 | 15.625% | 15.625% |
| Free Shot | Free Shot | Free Shot | 0 | 199104 | 48675 | 319332 | 280722 | 92598 | 5.605% | 0.000% |
| Cherry | Cherry | xx | 5 | 0 | 0 | 0 | 0 | 0 | 0.000% | 0.000% |
| Cherry | xx | Cherry | 5 | 0 | 0 | 0 | 0 | 0 | 0.000% | 0.000% |
| xx | Cherry | Cherry | 5 | 0 | 0 | 0 | 0 | 0 | 0.000% | 0.000% |
| 1 Bar, 2 Bar, or 3 Bar | 1 Bar, 2 Bar, or 3 Bar | 1 Bar, 2 Bar, or 3 Bar | 5 | 3200 | 0 | 65208 | 0 | 99484 | 1.172% | 5.862% |
| Cherry | Cherry | Cherry | 10 | 0 | 0 | 0 | 0 | 0 | 0.000% | 0.000% |
| 1 Bar | 1 Bar | 1 Bar | 10 | 55040 | 0 | 15675 | 0 | 0 | 0.421% | 4.215% |
| Orange | Orange | Orange | 20 | 174876 | 81168 | 0 | 55594 | 240768 | 3.293% | 65.852% |
| 2 Bar | 2 Bar | 2 Bar | 25 | 0 | 0 | 0 | 0 | 0 | 0.000% | 0.000% |
| 3 Bar | 3 Bar | 3 Bar | 40 | 0 | 0 | 0 | 0 | 0 | 0.000% | 0.000% |
| Bell | Bell | Bell | 50 | 0 | 0 | 0 | 0 | 0 | 0.000% | 0.000% |
| Blue 7 or Red 7 | Blue 7 or Red 7 | Blue 7 or Red 7 | 60 | 0 | 34960 | 0 | 0 | 0 | 0.208% | 12.503% |
| Blue 7 | Blue 7 | Blue 7 | 100 | 0 | 0 | 0 | 0 | 0 | 0.000% | 0.000% |
| Red 7 | Red 7 | Red 7 | 200 | 0 | 51680 | 0 | 0 | 0 | 0.308% | 61.607% |
| Jackpot | Jackpot | Jackpot | 1000 | 0 | 0 | 0 | 0 | 0 | 0.000% | 0.000% |
| Bonus | Bonus | Bonus | 250 | 0 | 0 | 0 | 0 | 0 | 0.000% | 0.000% |
| | | | | | | | | | | 165.664% |
| | | | | | Average Expected Payback Percentage Per Credit | | Multiplier Table | | Average Multiplier | Adjusted Average Expected Payback Percentage |
| | | | | | 33.133% | | Q | | 2.55 | 84.489% |

FIG. 16A

180

| Multiplier Table | Multiplier | Weight | Probability | Contribution |
|---|---|---|---|---|
| A | 1 | 150 | 1.50% | 0.015 |
| | 2 | 200 | 2.00% | 0.04 |
| | 3 | 500 | 5.00% | 0.15 |
| | 4 | 700 | 7.00% | 0.28 |
| | 5 | 1000 | 10.00% | 0.5 |
| | 6 | 1100 | 11.00% | 0.66 |
| | 7 | 1200 | 12.00% | 0.84 |
| | 8 | 1300 | 13.00% | 1.04 |
| | 9 | 1250 | 12.50% | 1.125 |
| | 10 | 1100 | 11.00% | 1.1 |
| | 15 | 900 | 9.00% | 1.35 |
| | 20 | 600 | 6.00% | 1.2 |
| | | | | |
| | Sum of Weights | 10000 | Average Multiplier | **8.3** |

FIG. 16B

190

| Multiplier Table | Multiplier | Weight | Probability | Contribution |
|---|---|---|---|---|
| Q | 1 | 2995 | 29.95% | 0.2995 |
| | 2 | 3185 | 31.85% | 0.637 |
| | 3 | 2065 | 20.65% | 0.6195 |
| | 4 | 1000 | 10.00% | 0.4 |
| | 5 | 220 | 2.20% | 0.11 |
| | 6 | 150 | 1.50% | 0.09 |
| | 7 | 80 | 0.80% | 0.056 |
| | 8 | 60 | 0.60% | 0.048 |
| | 9 | 50 | 0.50% | 0.045 |
| | 10 | 125 | 1.25% | 0.125 |
| | 15 | 40 | 0.40% | 0.06 |
| | 20 | 30 | 0.30% | 0.06 |
| | | | | |
| | Sum of Weights | 10000 | Average Multiplier | **2.55** |

FIG. 16C

200

| Multiplier Table | Multiplier | Weight | Probability | Contribution |
|---|---|---|---|---|
| S | 1 | 3520 | 35.20% | 0.352 |
| | 2 | 3770 | 37.70% | 0.754 |
| | 3 | 2040 | 20.40% | 0.612 |
| | 4 | 330 | 3.30% | 0.132 |
| | 5 | 130 | 1.30% | 0.065 |
| | 6 | 50 | 0.50% | 0.03 |
| | 7 | 40 | 0.40% | 0.028 |
| | 8 | 30 | 0.30% | 0.024 |
| | 9 | 20 | 0.20% | 0.018 |
| | 10 | 50 | 0.50% | 0.05 |
| | 15 | 10 | 0.10% | 0.015 |
| | 20 | 10 | 0.10% | 0.02 |
| | | | | |
| | Sum of Weights | 10000 | Average Multiplier | **2.1** |

FIG. 16D

210

| Multiplier Table | Multiplier | Weight | Probability | Contribution |
|---|---|---|---|---|
| Y | 1 | 6815 | 68.15% | 0.6815 |
| | 2 | 2775 | 27.75% | 0.555 |
| | 3 | 250 | 2.50% | 0.075 |
| | 4 | 70 | 0.70% | 0.028 |
| | 5 | 40 | 0.40% | 0.02 |
| | 6 | 20 | 0.20% | 0.012 |
| | 7 | 12 | 0.12% | 0.0084 |
| | 8 | 6 | 0.06% | 0.0048 |
| | 9 | 2 | 0.02% | 0.0018 |
| | 10 | 5 | 0.05% | 0.005 |
| | 15 | 3 | 0.03% | 0.0045 |
| | 20 | 2 | 0.02% | 0.004 |
| | | | | |
| | Sum of Weights | 10000 | Average Multiplier | **1.4** |

FIG. 16E

220

| Multiplier Table | Multiplier | Weight | Probability | Contribution |
|---|---|---|---|---|
| D1 | 1 | 8635 | 86.35% | 0.8635 |
| | 2 | 1155 | 11.55% | 0.231 |
| | 3 | 110 | 1.10% | 0.033 |
| | 4 | 50 | 0.50% | 0.02 |
| | 5 | 25 | 0.25% | 0.0125 |
| | 6 | 10 | 0.10% | 0.006 |
| | 7 | 5 | 0.05% | 0.0035 |
| | 8 | 4 | 0.04% | 0.0032 |
| | 9 | 2 | 0.02% | 0.0018 |
| | 10 | 2 | 0.02% | 0.002 |
| | 15 | 1 | 0.01% | 0.0015 |
| | 20 | 1 | 0.01% | 0.002 |
| | | | | |
| | Sum of Weights | 10000 | Average Multiplier | **1.18** |

FIG. 19

230

54a 52a 54b 54c 54a 52b 54b 54c 54a 52c 54b 54c 54a 52d 54b 54c 54a 52e 54b 54c

| Stop | 1 | 2 | 3 | | | | | | | | | | | | |
|---|---|---|---|---|---|---|---|---|---|---|---|---|---|---|---|
| | First Payline | | | Second Payline | | | Third Payline | | | Fourth Payline | | | Fifth Payline | | |
| | First Reel | Second Reel | Third Reel | First Reel | Second Reel | Third Reel | First Reel | Second Reel | Third Reel | First Reel | Second Reel | Third Reel | First Reel | Second Reel | Third Reel |
| Cherry | 0 | 0 | 27 | 0 | 0 | 16 | 0 | 0 | 154 | 0 | 0 | 154 | 0 | 0 | 16 |
| 1 Bar | 19 | 38 | 154 | 98 | 35 | 27 | 28 | 61 | 51 | 98 | 38 | 51 | 28 | 38 | 27 |
| 2 Bar | 0 | 35 | 0 | 0 | 66 | 0 | 0 | 38 | 0 | 0 | 35 | 0 | 0 | 35 | 0 |
| 3 Bar | 0 | 61 | 0 | 0 | 38 | 0 | 0 | 56 | 0 | 0 | 61 | 0 | 0 | 61 | 0 |
| Orange | 124 | 0 | 0 | 28 | 0 | 0 | 104 | 0 | 0 | 28 | 0 | 0 | 104 | 0 | 0 |
| Bell | 0 | 0 | 0 | 0 | 0 | 0 | 0 | 0 | 8 | 0 | 0 | 8 | 0 | 0 | 0 |
| Blue 7 | 0 | 0 | 16 | 0 | 0 | 8 | 0 | 0 | 27 | 0 | 0 | 27 | 0 | 0 | 8 |
| Red 7 | 0 | 0 | 59 | 85 | 0 | 154 | 0 | 0 | 16 | 85 | 0 | 16 | 0 | 0 | 154 |
| Jackpot | 28 | 0 | 0 | 19 | 0 | 0 | 26 | 0 | 0 | 19 | 0 | 0 | 26 | 0 | 0 |
| Free Shot | 85 | 122 | 0 | 26 | 61 | 51 | 0 | 35 | 0 | 26 | 122 | 0 | 0 | 122 | 51 |
| Bonus | 0 | 0 | 0 | 0 | 56 | 0 | 98 | 66 | 0 | 0 | 0 | 0 | 98 | 0 | 0 |
| | 256 | 256 | 256 | 256 | 256 | 256 | 256 | 256 | 256 | 256 | 256 | 256 | 256 | 256 | 256 |

FIG. 20

240

| Symbol Combination | | | Award | First Payline Combined Weight (52a) | Second Payline Combined Weight (52b) | Third Payline Combined Weight (52c) | Fourth Payline Combined Weight (52d) | Fifth Payline Combined Weight (52e) | Probability | Contribution |
|---|---|---|---|---|---|---|---|---|---|---|
| Cherry | xx | xx | 1 | 0 | 0 | 0 | 0 | 0 | 0.000% | 0.000% |
| xx | Cherry | xx | 1 | 0 | 0 | 0 | 0 | 0 | 0.000% | 0.000% |
| xx | xx | Cherry | 1 | 1769472 | 1048576 | 10092544 | 10092544 | 1048576 | 143.359% | 143.359% |
| Free Shot | Free Shot | Free Shot | 0 | 0 | 80886 | 0 | 0 | 0 | 0.482% | 0.000% |
| Cherry | Cherry | xx | 5 | 0 | 0 | 0 | 0 | 0 | 0.000% | 0.000% |
| Cherry | xx | Cherry | 5 | 0 | 0 | 0 | 0 | 0 | 0.000% | 0.000% |
| xx | Cherry | Cherry | 5 | 0 | 0 | 0 | 0 | 0 | 0.000% | 0.000% |
| 1 Bar, 2 Bar, or 3 Bar | 1 Bar, 2 Bar, or 3 Bar | 1 Bar, 2 Bar, or 3 Bar | 5 | 280896 | 275184 | 134232 | 479808 | 72576 | 7.407% | 37.035% |
| Cherry | Cherry | Cherry | 10 | 0 | 0 | 0 | 0 | 0 | 0.000 | 0.000% |
| 1 Bar | 1 Bar | 1 Bar | 10 | 111188 | 92610 | 87108 | 189924 | 28728 | 3.037% | 30.372% |
| Orange | Orange | Orange | 20 | 0 | 0 | 0 | 0 | 0 | 0.000% | 0.000% |
| 2 Bar | 2 Bar | 2 Bar | 25 | 0 | 0 | 0 | 0 | 0 | 0.000% | 0.000% |
| 3 Bar | 3 Bar | 3 Bar | 40 | 0 | 0 | 0 | 0 | 0 | 0.000% | 0.000% |
| Bell | Bell | Bell | 50 | 0 | 0 | 0 | 0 | 0 | 0.000% | 0.000% |
| Blue 7 or Red 7 | Blue 7 or Red 7 | Blue 7 or Red 7 | 60 | 0 | 0 | 0 | 0 | 0 | 0.000% | 0.000% |
| Blue 7 | Blue 7 | Blue 7 | 100 | 0 | 0 | 0 | 0 | 0 | 0.000% | 0.000% |
| Red 7 | Red 7 | Red 7 | 200 | 0 | 0 | 0 | 0 | 0 | 0.000% | 0.000% |
| Jackpot | Jackpot | Jackpot | 1000 | 0 | 0 | 0 | 0 | 0 | 0.000% | 0.000% |
| Bonus | Bonus | Bonus | 250 | 0 | 0 | 0 | 0 | 0 | 0.000% | 0.000% |
| | | | | | | | | | | 210.767% |
| | | | | | Average Expected Payback Percentage Per Credit | | Multiplier Table | | Average Multiplier | Adjusted Average Expected Payback Percentage |
| | | | | | 42.153% | | S | | 2.1 | 88.522% |

FIG. 21

250

| Stop | 6 | 9 | 7 | | | | | | | | | | | | |
|---|---|---|---|---|---|---|---|---|---|---|---|---|---|---|---|
| | First Payline (52a) | | | Second Payline (52b) | | | Third Payline (52c) | | | Fourth Payline (52d) | | | Fifth Payline (52e) | | |
| | First Reel (54a) | Second Reel (54b) | Third Reel (54c) | First Reel (54a) | Second Reel (54b) | Third Reel (54c) | First Reel (54a) | Second Reel (54b) | Third Reel (54c) | First Reel (54a) | Second Reel (54b) | Third Reel (54c) | First Reel (54a) | Second Reel (54b) | Third Reel (54c) |
| Cherry | 0 | 0 | 0 | 0 | 0 | 0 | 0 | 72 | 0 | 0 | 0 | 0 | 0 | 0 | 0 |
| 1 Bar | 0 | 0 | 35 | 0 | 29 | 0 | 0 | 0 | 60 | 0 | 0 | 60 | 0 | 0 | 0 |
| 2 Bar | 0 | 0 | 0 | 0 | 0 | 0 | 0 | 0 | 0 | 0 | 0 | 0 | 0 | 0 | 0 |
| 3 Bar | 16 | 101 | 0 | 59 | 72 | 0 | 102 | 48 | 0 | 59 | 101 | 0 | 102 | 101 | 0 |
| Orange | 0 | 0 | 0 | 102 | 0 | 0 | 69 | 0 | 35 | 102 | 0 | 35 | 69 | 0 | 0 |
| Bell | 10 | 29 | 49 | 69 | 6 | 10 | 59 | 0 | 102 | 69 | 29 | 102 | 59 | 29 | 10 |
| Blue 7 | 0 | 72 | 0 | 0 | 0 | 102 | 0 | 101 | 0 | 0 | 72 | 0 | 0 | 72 | 102 |
| Red 7 | 0 | 0 | 102 | 0 | 0 | 49 | 0 | 0 | 0 | 0 | 0 | 0 | 0 | 0 | 49 |
| Jackpot | 59 | 6 | 60 | 10 | 48 | 35 | 16 | 29 | 10 | 10 | 6 | 10 | 16 | 6 | 35 |
| Free Shot | 69 | 48 | 10 | 0 | 101 | 60 | 10 | 6 | 49 | 0 | 48 | 49 | 10 | 48 | 60 |
| Bonus | 102 | 0 | 0 | 16 | 0 | 0 | 0 | 0 | 0 | 16 | 0 | 0 | 0 | 0 | 0 |
| | 256 | 256 | 256 | 256 | 256 | 256 | 256 | 256 | 256 | 256 | 256 | 256 | 256 | 256 | 256 |

FIG. 22

260

| Symbol Combination | | | Award | First Payline Combined Weight (52a) | Second Payline Combined Weight (52b) | Third Payline Combined Weight (52c) | Fourth Payline Combined Weight (52d) | Fifth Payline Combined Weight (52e) | Probability | Contribution |
|---|---|---|---|---|---|---|---|---|---|---|
| Cherry | xx | xx | 1 | 0 | 0 | 0 | 0 | 0 | 0.000% | 0.000% |
| xx | Cherry | xx | 1 | 0 | 0 | 4718592 | 0 | 0 | 28.125% | 28.125% |
| xx | xx | Cherry | 1 | 0 | 0 | 0 | 0 | 0 | 0.000% | 0.000% |
| Free Shot | Free Shot | Free Shot | 0 | 33120 | 0 | 2940 | 0 | 28800 | 0.387% | 0.000% |
| Cherry | Cherry | xx | 5 | 0 | 0 | 0 | 0 | 0 | 0.000% | 0.000% |
| Cherry | xx | Cherry | 5 | 0 | 0 | 0 | 0 | 0 | 0.000% | 0.000% |
| xx | Cherry | Cherry | 5 | 0 | 0 | 0 | 0 | 0 | 0.000% | 0.000% |
| 1 Bar, 2 Bar, or 3 Bar | 1 Bar, 2 Bar, or 3 Bar | 1 Bar, 2 Bar, or 3 Bar | 5 | 56560 | 0 | 293760 | 357540 | 0 | 4.219% | 21.096% |
| Cherry | Cherry | Cherry | 10 | 0 | 0 | 0 | 0 | 0 | 0.000% | 0.000% |
| 1 Bar | 1 Bar | 1 Bar | 10 | 0 | 0 | 0 | 0 | 0 | 0.000% | 0.000% |
| Orange | Orange | Orange | 20 | 0 | 0 | 0 | 0 | 0 | 0.000% | 0.000% |
| 2 Bar | 2 Bar | 2 Bar | 25 | 0 | 0 | 0 | 0 | 0 | 0.000% | 0.000% |
| 3 Bar | 3 Bar | 3 Bar | 40 | 0 | 0 | 0 | 0 | 0 | 0.000% | 0.000% |
| Bell | Bell | Bell | 50 | 14210 | 4140 | 0 | 204102 | 17110 | 1.428% | 71.395% |
| Blue 7 or Red 7 | Blue 7 or Red 7 | Blue 7 or Red 7 | 60 | 0 | 0 | 0 | 0 | 0 | 0.000% | 0.000% |
| Blue 7 | Blue 7 | Blue 7 | 100 | 0 | 0 | 0 | 0 | 0 | 0.000% | 0.000% |
| Red 7 | Red 7 | Red 7 | 200 | 0 | 0 | 0 | 0 | 0 | 0.000% | 0.000% |
| Jackpot | Jackpot | Jackpot | 1000 | 21240 | 16800 | 4640 | 600 | 3360 | 0.278% | 278.00% |
| Bonus | Bonus | Bonus | 250 | 0 | 0 | 0 | 0 | 0 | 0.000% | 0.000% |
| | | | | | | | | | | 398.612% |
| | | | | | Average Expected Payback Percentage Per Credit | | Multiplier Table | | Average Multiplier | Adjusted Average Expected Payback Percentage |
| | | | | | 79.722% | | D1 | | 1.18 | 94.072% |

FIG. 25A

| Initiating Stop Position Combination | | | Payback Percentage Per Credit of Component Paytable | Designated Percentage Per Credit Wagered | Adjusted Payback Percentage Per Credit of Component Paytable |
|---|---|---|---|---|---|
| First Reel | Second Reel | Third Reel | | | |
| 0 | 0 | 0 | 15% | 80% | 95% |
| . | . | . | . | . | . |
| 0 | 0 | 1 | 50% | 40% | 90% |
| . | . | . | . | . | . |
| 13 | 8 | 20 | 80% | 13% | 93% |
| . | . | . | . | . | . |
| 21 | 21 | 21 | 30% | 64% | 94% |
| | | | | | 93% |

FIG. 25B

| Initiating Stop Position Combination | | | Payback Percentage Per Credit of Component Paytable | Designated Percentage Per Credit Wagered to Bonus Pool A | Designated Percentage Per Credit Wagered to Bonus Pool B | Designated Percentage Per Credit Wagered to Bonus Pool C | Adjusted Payback Percentage Per Credit of Component Paytable |
|---|---|---|---|---|---|---|---|
| First Reel | Second Reel | Third Reel | | | | | |
| 0 | 0 | 0 | 15% | 12% | 28% | 40% | 95% |
| . . . | . . . | . . . | . . . | . . . | . . . | . . . | . . . |
| 0 | 0 | 1 | 50% | 6% | 14% | 20% | 90% |
| . . . | . . . | . . . | . . . | . . . | . . . | . . . | . . . |
| 13 | 8 | 20 | 80% | 1.95% | 4.55% | 6.5% | 93% |
| . . . | . . . | . . . | . . . | . . . | . . . | . . . | . . . |
| 21 | 21 | 21 | 30% | 9.6% | 22.4% | 32% | 94% |
| | | | | | | | 93% |

FIG. 26

54a 54b 54c 400

| Stop Position | First Reel | Second Reel | Third Reel |
|---|---|---|---|
| 0 | Orange | 2 Bar | Cherry |
| 1 | **Bonus** | Free Shot | Blue 7 |
| 2 | 3 Bar | **Bonus** | **Bonus** |
| 3 | Jackpot | 1 Bar | Bell |
| 4 | Bell | Bell | Freeshot |
| 5 | Free Shot | Jackpot | Jackpot |
| 6 | **Bonus** | Free Shot | 1 Bar |
| 7 | Blue 7 | **Bonus** | **Bonus** |
| 8 | 1 Bar | Blue 7 | Free Shot |
| 9 | Red 7 | Cherry | 2 Bar |
| 10 | 2 Bar | Orange | Orange |
| 11 | **Bonus** | Blue 7 | 3 Bar |
| 12 | Bell | **Bonus** | **Bonus** |
| 13 | Blue 7 | 3 Bar | Blue 7 |
| 14 | Cherry | Bell | Free Shot |
| 15 | 2 Bar | Cherry | Bell |
| 16 | **Bonus** | Red 7 | 2 Bar |
| 17 | Red 7 | **Bonus** | **Bonus** |
| 18 | Free Shot | Free Shot | Orange |
| 19 | Orange | **Bonus** | **Bonus** |
| 20 | **Bonus** | 3 Bar | Red 7 |
| 21 | 1 Bar | 1 Bar | 1 Bar |

GAMING DEVICE AND METHOD PROVIDING SLOT GAME HAVING VIRTUAL MAP DRIVEN REEL STOP POSITION DETERMINATIONS

PRIORITY CLAIM

This application is a continuation of, and claims priority to and the benefit of, U.S. patent application Ser. No. 12/617,385, filed on Nov. 12, 2009, which is a continuation-in-part of, and claims priority to and the benefit of, U.S. patent application Ser. No. 12/404,810, filed on Mar. 16, 2009, the entire contents of each of which are incorporated herein by reference.

BACKGROUND

Pachisuro gaming machines are well known. Certain known Pachisuro gaming machines include a housing which supports three mechanical reels and three input buttons. Each input button is associated with a different one of the reels. The housing also supports a protective see-through glass panel in front of the reels. The player can see the spinning reels through the glass and when the reels are stopped, the player can see one or more symbols of each of the reels through the glass.

More specifically, in one such known Pachisuro gaming machine, after placing a wager, a player activates an input device which causes the Pachisuro gaming machine to spin each of the mechanical reels. For each different reel, the Pachisuro gaming machine enables the player to see the reels spinning through the glass and to stop each respective reel by activating the input button associated with the reel. When a respective input button is activated, the mechanical reel associated with the activated input button will not stop instantaneously. Rather, the reel associated with the activated input button moves a designated number of symbol positions (e.g., two, three or four) past the stop position of the reel when the input button is activated trying to stop on a pre-selected symbol combination. If one or more predetermined winning combinations of symbols are displayed on one or more paylines when the reels stop spinning, the Pachisuro gaming machine provides the player one or more awards.

When playing such a known Pachisuro gaming machine, if a player can readily see the symbols on the reels through the glass as the reels are spinning, it is easier for the player to activate the input buttons to cause all three mechanical reels to stop spinning such that they display one or more predetermined winning symbol combinations. Depending on the speed of the reels, highly skilled players are able to identify opportune times to activate each respective input button to improve their chance of receiving an award.

To compensate for this variation in player skill, many known Pachisuro gaming machines are reflexive. Reflexive gaming machines typically increase or decrease the payout associated with a play of the game based on the payout history of the gaming machine. In a simple example for a reflexive gaming machine, the desired payback percentage is 90% and the gaming machine tracks its payback percentage for a defined period such as 100 games or in between bonus events. The game has at least two different payback percentage models in the software. One is below the target percentage (e.g., 90%) and the other is above it. For example, Paytable A may have a return of 70% and Paytable B may have a return of 125%. If the actual payback percentage after the first ten tracked games is 150%, the game will use Paytable A until the actual payback percentage is less than the target 90%. Once the actual payback percentage goes below 90%, the game will 'reflex' and switch to Paytable B to move the actual payback percentage back towards 90%. In such case, for a determined number of spins, the gaming machine causes the reels to stop spinning such that it is more or less likely (depending on which paytable is active) that predetermined winning symbol combinations are displayed when the reels stop spinning, regardless of when the player presses the input buttons of each of the reels. In this type of reflexive gaming machine, the gaming machine determines whether or not to provide an award for one or more plays of the game based in part on the actual awards provided for previous plays of the game.

Such known reflexive Pachisuro gaming machines create multiple issues in the field. First, reflexive gaming machines are not allowed in many gaming jurisdictions, including most United States gaming jurisdictions. In these jurisdictions, regulations mandate that the probability of generating game outcomes for certain types of games be the same for each play of the game. For example, for a slot type gaming machine, the probability of receiving a jackpot must be the same for all plays of the game, and must be completely independent of any prior outcome or award. Reflexive gaming machines take prior outcomes and their awards into account for subsequent plays of the game. Thus, the probability of a winning outcome being displayed is not the same for each play of the game. Accordingly, reflexive gaming machines do not comply with such regulations.

Second, when playing such known reflexive Pachisuro gaming machines, depending on when players play the game, they may not be rewarded for their skill. For example, a non-skilled player could receive a very high payback by simply playing immediately after a player who has been on a losing streak. Likewise, a highly skilled player could receive a very low payback, by playing after a player who was on a winning streak.

Third, traditionally Pachisuro style games do not offer a very large jackpot. Due to the player's influence in stopping the reels and the reflexive nature, the jackpots are typically 15 credits, or a bonus round may pay out up to 400 credits for a 3 credit bet. This is typically true with other payback skill games such as AWP machines from Europe and the United Kingdom. Players would find Pachisuro and skill slot machines more desirable if they had larger jackpots like most casino style slot machines.

Accordingly, a need exists for a non-reflexive Pachisuro-style gaming device which enables players of all skill levels to enjoy Pachisuro-style gaming, and offers a limited skill component which rewards highly skill players with the potential for higher awards.

SUMMARY

Various embodiments of the disclosed gaming device include a housing which supports a plurality of mechanical reels and a plurality of stop input devices which are configured to provide a Pachisuro-style slot game. Each of the plurality of reels is associated with a different one of the plurality of stop input devices. Each stop input device enables a player to stop the respective reel when the reel is spinning by activating the stop input device. Each reel includes a plurality of stop positions and each stop position includes a symbol. The gaming device also includes a processor and a memory device. For each reel, the processor randomly determines the stop position at which the reel ultimately stops based on a virtual map stored in the memory device for an initiating stop position of that reel which is selected by the player's activation of the stop input device for that reel. More specifically, the initiating stop position of the reel is used herein to describe the stop position of the respective reel that is at or the first to be at a predetermined area, position or reference point when the player activates the stop input device for that reel. In one embodiment, the predetermined area, position or reference point is in one of the symbol display areas. The symbol display areas are the positions at which the symbols are displayed to or visible to the player. Thus, each time a reel spins and the player activates the stop input device for that reel, one of the stop positions of the reel becomes the initiating stop position for that spin of the reel, and the virtual map for that stop position is used to determine where the reel will stop.

More specifically, in various embodiments, each reel has a plurality of stop positions. Each stop position of each reel has an associated virtual map for that stop position which is stored in the memory device. The virtual map for a stop position enables the processor to randomly determine which of the following stop positions the reel will stop at when the input device for that reel is activated when the reel is indicating that stop position. In one embodiment, the virtual maps for each stop position on each reel are different; however, as discussed below, one or more, of the virtual maps may be the same.

In various embodiments, each virtual map includes a range of stop positions and for each stop position in the range, an associated weight. The range of stop positions in each virtual map includes less than all of the stop positions of its respective reel (e.g., 5 out of 22 stop positions) in various embodiments, although it should be appreciated that that one or more of the virtual maps may include all of the stop positions of its respective reel. The processor uses the respective virtual map for the initiating stop position of the reel to randomly determine a stop position for the reel based on the weights associated with the stop positions in the range of the virtual map. It should be appreciated that each of the stop positions of the reel may be the initiating stop position for the reel.

In a very simple example, a virtual map includes a first stop position having a weight of 10, a second stop position having a weight of 20, and a third stop position having a weight of 30. The initiating stop position for the reel is associated with that virtual map, and the processor uses a randomly generated number between 1 and 60 (the sum of the weights 10, 20 and 30) to determine the stop position at which to stop the reel based on that virtual map. If the processor randomly generates a number between 1 and 10, the processor causes the reel to stop at the first stop position. If the processor randomly generates a number between 11 and 30, the processor causes the reel to stop at the second stop position. If the processor randomly generates a number between 31 and 60, the processor causes the reel to stop at the third stop position. In this example, although the processor randomly determines a number, it should be appreciated that by adjusting the weights assigned to each stop position, a gaming device designer can adjust the probability of the processor randomly selecting each respective stop position in the virtual map as further discussed below.

The Pachisuro-style gaming device includes an overall paytable including a plurality of predetermined winning symbol combinations and awards associated with the respective predetermined winning symbol combinations. The overall paytable has an average payback percentage (which is also sometimes called the average expected payback percentage). The average payback percentage of the overall paytable is the average expected percentage of each credit wagered on the Pachisuro-style game provided back to the player over a designated number of plays of the game.

In one embodiment, the gaming device designer ensures the overall paytable of the Pachisuro-style game has a designated average expected payback percentage by constructing a component paytable for each possible combination of virtual maps such that the average expected payback percentage of each of these respective component paytables is in a designated range of average expected payback percentages (e.g., 80% to 95%) which includes the designated payback percentage of the overall paytable. Thus, in various embodiments, the designated average expected payback percentage of the overall paytable is the average of the payback percentages of each of the respective component paytables, which would be the result if the player randomly stopped all of the reels for each of the games.

More specifically, each possible combination of virtual maps (based on each one of the possible initiating stop positions of each respective reel) has its own component paytable. In an example embodiment of the Pachisuro gaming device including three reels each having 22 stop positions, the memory devices stores 66 virtual maps (i.e., one for each of the 22 stop positions on each of the three reels), and the game designer uses 10,648 (i.e., 22×22×22) component paytables to create these 66 virtual maps. The 10,648 component paytables are configured so each one of them results in an average expected payback percentage within the desired range and to achieve a designated average expected payback percentage for the overall paytable of the game.

In various embodiments, each component paytable includes: (a) the plurality of predetermined winning symbol combinations of the overall paytable; (b) the respective awards associated with each predetermined winning symbol combination; (c) a probability of each respective predetermined winning symbol combination being displayed when all of the reels stop spinning (based on the combination of virtual maps associated with the component paytable); and (d) a payback percentage for the component paytable.

In the above embodiment, the gaming device designer modifies the overall payback percentage of the Pachisuro-style game by adjusting the weights assigned to respective stop positions in the virtual maps. Adjusting a weight associated with a stop position in a virtual map effects the probability of each of the plurality of predetermined winning symbol combinations being displayed for all of the combinations of virtual maps which include that virtual map. This effects the payback percentages of the component paytables for the combinations of virtual maps including that stop position's virtual map, which in turn effects the average payback percentage of the overall paytable for the Pachisuro-style game.

Configuring the virtual maps such that the payback percentages of the component paytables are within a designated range of payback percentages makes Pachisuro-style gaming entertaining and exciting for players of all levels. No matter how poorly a player plays, or when the player plays the gaming device relative to another player, the player is guaranteed at least the lowest payback percentage of the designated range of payback percentages for the component paytables.

The present disclosure contemplates that the (a) number of reels, (b) number of stop positions on each reel, (c) number of symbols, (d) number of different symbols, (e) number of paylines associated with the reels, (f) number of winning symbol combinations, (e) number of symbols required for each winning symbol combination, and (f) number of special or functional symbols (such as wild or bonus symbols), can make it mathematically very difficult to configure a component paytable for every combination of stop positions to provide an average expected payback percentage within the designated range of average expected payback percentages for the component paytables (e.g., 80% to 95%). In various embodiments, to solve this difficulty, the present disclosure provides one or more multipliers which are associated with one, a plurality of or all of the combinations of stop positions or component paytables.

Specifically, in one such embodiment, the memory device stores a multiplier look-up table including a plurality of multiplier tables, and for each multiplier table, one or more of the combinations of stop positions associated with the multiplier table. In this embodiment, each multiplier table includes a plurality of different multipliers which each have a different weight. The processor randomly selects a multiplier (based on the weights) to apply to any determined award for a play of the game. For each multiplier table, each multiplier has a contribution to an average multiplier value including the weight of the multiplier multiplied by the value of multiplier. The sum of the contributions of the multipliers equals the average multiplier value for the multiplier table.

In this embodiment, each multiplier table is configured such that the payback percentage of the component paytable associated with the multiplier table multiplied by the average multiplier value of the multiplier table results in an adjusted average expected payback percentage for the component paytable that is within the designated range of payback percentages (e.g., 80% to 95%).

For example, in one such embodiment, after the reels stop spinning (via player activation of the stop input devices), the processor determines if any predetermined winning symbol combinations are displayed and determines any awards associated with those respective predetermined winning symbol combinations. The processor also determines if the combination of stop positions displayed when the player activated the respective stop input devices is associated with a multiplier table using the multiplier look-up table stored in the memory device. If the combination of stop positions is associated with a multiplier table, the processor randomly selects a multiplier from the respective multiplier table taking into account the respective weights of the multipliers in the multiplier table. The processor applies the determined multiplier to any determined award and provides the award to the player.

In various additional embodiments, instead of using multipliers to keep the adjusted payback percentage of component paytables associated with certain combinations of initiating stop positions within the designated range of payback percentages (e.g., 80% to 95%), the gaming device employs a designated quantity of bonus pools to keep the adjusted payback percentage of component paytables associated with certain combinations of initiating stop positions within the designated range of payback percentages (e.g., 80% to 95%). For each play of the game, if the player selects a designated combination of initiating stop positions (via player activation of the stop input devices), the bonus pool(s) receive or accumulate credits based on a designated percentage of the player's wager on that play of the game. The reels include a plurality of bonus symbols. For each play of the game, if the gaming device displays any designated combination of the bonus symbols when the reels stop spinning, the gaming device determines at least one of the bonus pools from which to provide credits to the player and provides the player with some or all of the credits from the determined bonus pool.

More specifically, in one embodiment, the gaming device uses a bonus pool addition look-up table stored in a memory device to determine the percentage of the player's wager on a play of the game to add to the appropriate bonus pools if the player selects a designated combination of initiating stop positions (via player activation of the stop input devices) for that play of the game.

The bonus pool addition look-up table includes: (a) one or more combinations of initiating stop positions, and (b) a designated percentage associated with each respective combination of initiating stop positions. In this embodiment, the bonus pool addition look-up table is configured such that for each combination of initiating stop positions in the bonus pool addition look-up table, the sum of: (i) the average payback percentage of the component paytable associated with the combination of initiating stop positions and (ii) the designated percentage associated with the combination of initiating stop positions equals a percentage within the designated range of payback percentages (e.g., 80% to 95%). It should be appreciated that in various embodiments, instead of the memory device storing a bonus pool addition look-up table, the memory device stores a predetermined algorithm and the gaming device calculates a designated percentage associated with each respective combination of initiating stop positions in real time using the predetermined algorithm.

In certain embodiments, the gaming device employs a single bonus pool, and for each play of the game, if the player selects a designated combination of initiating stop positions (via player activation of the stop input devices), the gaming device adds the designated percentage of the player's wager on that play of the game to the single bonus pool.

In other embodiments, the gaming device employs a plurality of bonus pools and for each play of the game, if the player selects a designated combination of initiating stop positions (via player activation of the stop input devices), the gaming device determines how much of the designated percentage of the player's wager on the play of the game to add to each of the plurality of bonus pools and adds the designated percentage of the player's wager on the play of the game to the plurality of bonus pools. In one such embodiment, the gaming device determines how much of the designated percentage of the player's wager on the play of the game to add to each of the plurality of bonus pools based on a predetermined percentage allocation.

The bonus symbols are positioned on the reels of the game such that for each spin of each reel, there is a probability greater than 0% and less than 100% that the gaming device will display a bonus symbol when the reel stops spinning no matter what initiating stop position the player selects for the reel (e.g., at least one bonus symbol within each increment of five stop positions on the reel strip for each reel as further discussed below).

It should be appreciated that in various embodiments, instead of using one or more designated combinations of bonus symbols as a triggering event, the gaming device determines at least one of the bonus pools from which to provide credits to the player and provides the player with some or all of the credits from the determined bonus pool upon an occurrence of a mystery trigger, discussed in more detail below (e.g., based on a predefined variable reaching a defined parameter threshold).

In one embodiment employing a single bonus pool, if the gaming device displays a designated combination of the bonus symbols when the reels stop spinning, the gaming device provides the player with some or all of the credits from the single bonus pool.

In another embodiment employing a plurality of bonus pools, if the gaming device displays a designated combination of the bonus symbols when the reels stop spinning, the gaming device determines which of the plurality of bonus pools to use to provide credits to the player and provides the player with some or all of the credits from the determined bonus pool. In various such embodiments, the gaming device determines which of the designated quantity of bonus pools from which to provide credits to the player: (a) randomly, with or without player interaction, (b) in a predetermined manner, with or without player interaction, (c) based on player skill or (d) any combination of two or more of the above.

Additional features and advantages are described herein, and will be apparent from, the following Detailed Description and the figures.

BRIEF DESCRIPTION OF THE FIGURES

FIG. 3 shows a table illustrating for each of three reel strips, the symbol on the reel strip associated with each stop position of a reel.

FIGS. 5A, 5B, 5C, 5D, 5E, 5F, 5G, 5H, 5I, 5J, 5K, 5L, 5M, 5N, 5O, 5P, 5Q, 5R, 5S, 5T, 5U and 5V illustrate the respective virtual map associated with each stop position of a first reel.

FIGS. 6A, 6B, 6C, 6D, 6E, 6F, 6G, 6H, 6I, 6J, 6K, 6L, 6M, 6N, 6O, 6P, 6Q, 6R, 6S, 6T, 6U and 6V illustrate the respective virtual map associated with each stop position of a second reel.

FIGS. 7A, 7B, 7C, 7D, 7E, 7F, 7G, 7H, 7I, 7J, 7K, 7L, 7M, 7N, 7O, 7P, 7Q, 7R, 7S, 7T, 7U and 7V illustrate the respective virtual map associated with each stop position of a third reel.

FIG. 9 illustrates an overall paytable for an embodiment of the Pachisuro-style game disclosed herein.

FIG. 10 illustrates a multiplier look-up table for an embodiment of the Pachisuro-style game disclosed herein.

FIG. 11 illustrates a table summarizing the calculation of an adjusted payback percentage for a plurality of component paytables and an average payback percentage for an overall paytable for an embodiment of the Pachisuro-style game disclosed herein.

FIG. 12 illustrates a working table used by a gaming device designer to associate one or more component paytables with a respective multiplier table, in accordance with one embodiment of the Pachisuro-style game disclosed herein.

FIG. 14 illustrates a weight table for an example combination of stop positions including the weight associated with each of a plurality of symbols relative to each of five paylines for a play of the Pachisuro-style game.

FIG. 15 illustrates a component paytable constructed by a gaming device designer according to the weight table illustrated in FIG. 14.

FIGS. 16A, 16B, 16C, 16D and 16E illustrate multiplier tables associated with one or more component paytables in accordance with one embodiment of the Pachisuro-style game disclosed herein.

FIG. 19 illustrates a weight table for an example combination of stop positions including the weight associated with each of a plurality of symbols relative to each of five paylines for a play of the Pachisuro-style game.

FIG. 20 illustrates a component paytable constructed by a gaming device designer according to the weight table illustrated in FIG. 19.

FIG. 21 illustrates a weight table for an example combination of stop positions including the weight associated with each of a plurality of symbols relative to each of five paylines for a play of the Pachisuro-style game.

FIG. 22 illustrates a component paytable constructed by a gaming device designer according to the weight table illustrated in FIG. 21.

FIG. 25A shows a table illustrating for each of a plurality of initiating stop position combinations a payback percentage per credit of the component paytable associated with the combination of initiating stop positions, a designated percentage of the wager to be added to the bonus pool(s) and the adjusted payback percentage per credit of the component paytable for one embodiment of the Pachisuro-style game disclosed herein.

FIG. 25B shows a table illustrating for each of a plurality of initiating stop position combinations a payback percentage per credit of the component paytable associated with the combination of initiating stop positions, a designated percentage per credit wagered to be added to each of a plurality of bonus pools and the adjusted payback percentage per credit of the component paytable for one embodiment of the Pachisuro-style game disclosed herein.

FIG. 26 shows a table illustrating for each of three reel strips, the symbol on the reel strip associated with each stop position of a reel for one embodiment of the Pachisuro-style game disclosed herein.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
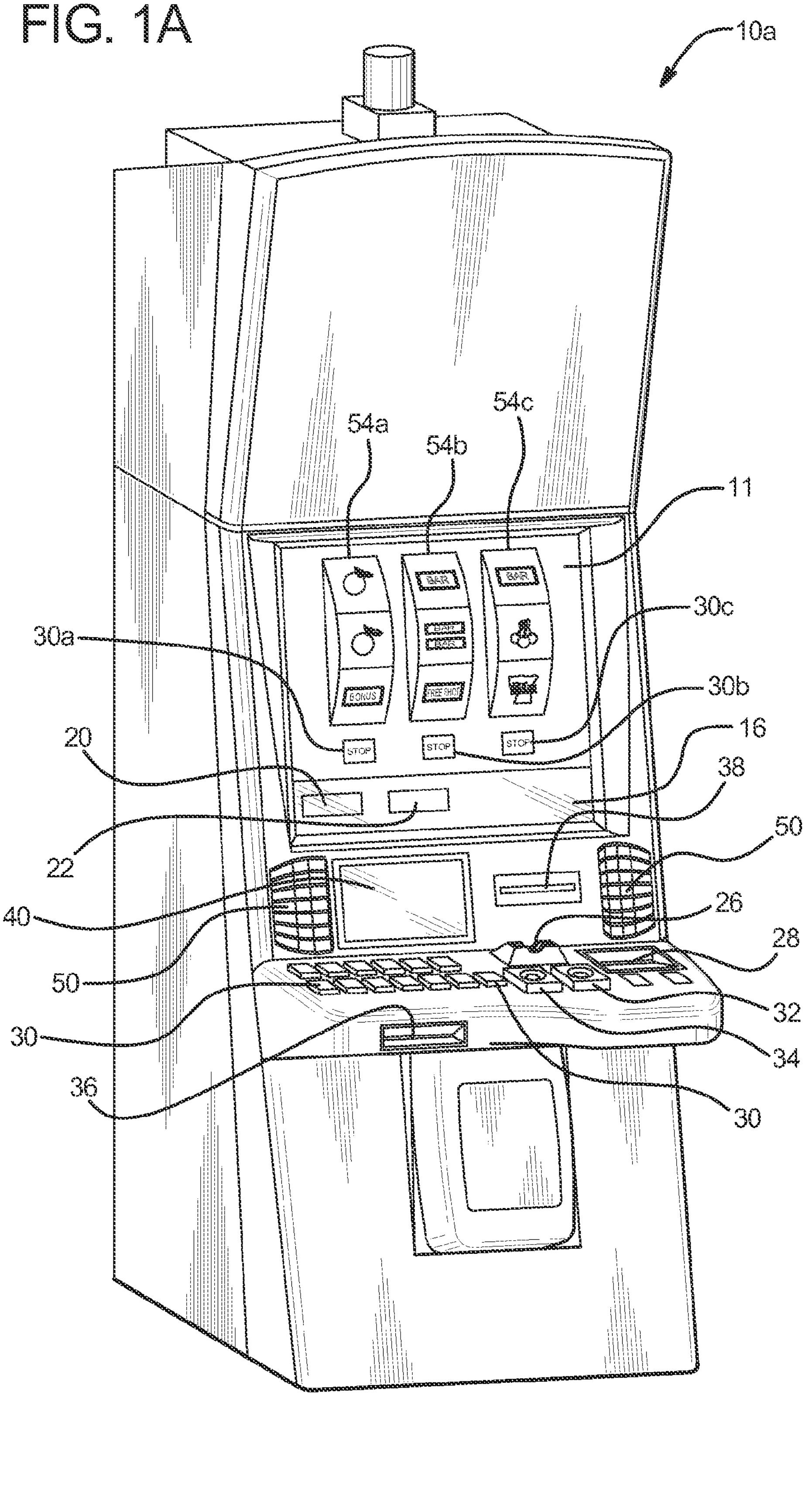
FIGS. 1A and 1B are front perspective views of alternative embodiments of gaming devices disclosed herein.
Figure 1B:
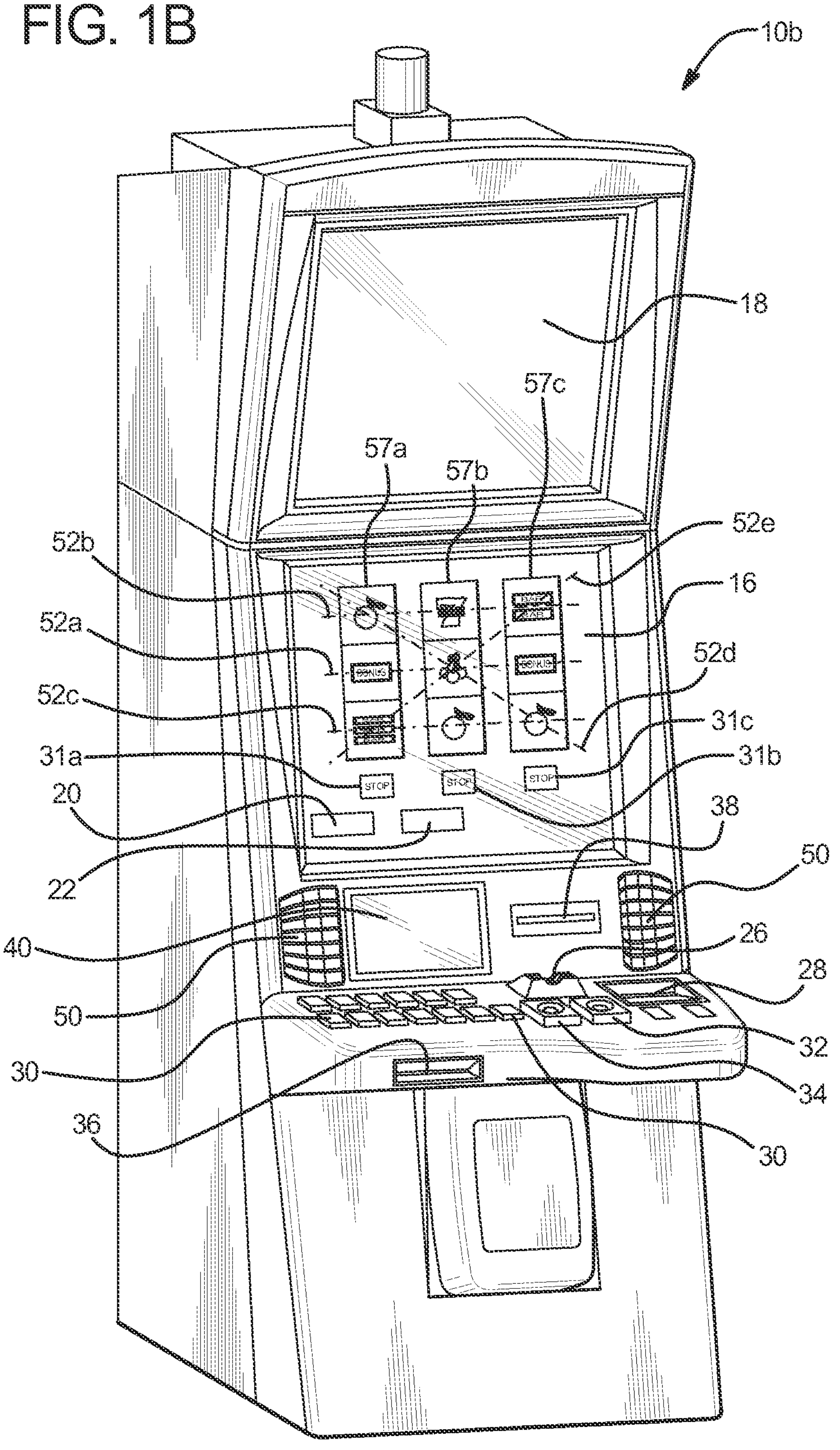

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
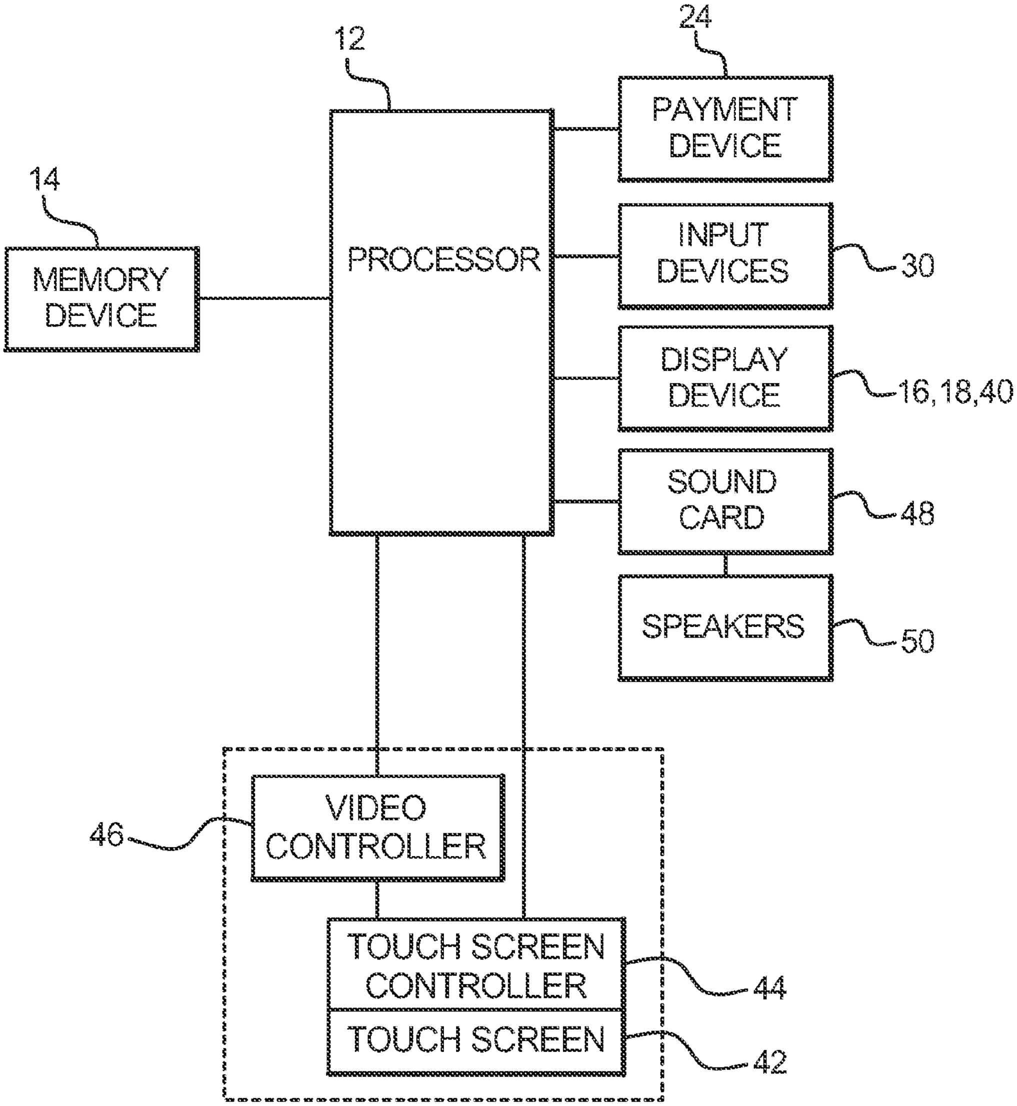
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

In one embodiment, the display device includes a first reel 54*a*, a second reel 54*b* and a third reel 54*c*, wherein the reels are mechanical reels. In this embodiment, each of the reels 54*a*, 54*b* and 54*c* include a plurality of stop positions. In one such embodiment, each reel is associated with a step motor (not shown) controlled by the processor 12. The step motors are driven by short digital pulses of electricity controlled by the processor. The step motors are designed to rotate a constant angle per drive pulse. The processor is thus enabled to move a reel a designated number of positions because a game designer is enabled to program a designated number of drive pulses to correspond to a stop position. Thus, for example, the processor 12 may cause the first reel 54*a* to move two stop positions by sending a number of drive pulses corresponding to two stop positions to the step motor associated with the first reel 54*a*.

Step motors enable the processor to control how many stop positions a reel spins from a reference position. However, in various other embodiments in which the first reel 54*a*, second reel 54*b* and third reel 54*c* are mechanical reels, the processor tracks the exact stop position of each reel as it is spinning and is enabled to control what specific stop position a reel stops at, not just how many stop positions from a reference position the reel stops. In such embodiments, if the processor is to stop a reel at a specific position, the processor must have data indicating the current stop position of the reel to determine how many further stop positions to cause the step motor to move the reel.

In one embodiment, the processor 12 receives inputs from photoelectric diodes (not shown), which generate a current when exposed to light, to track the movement of the reel and its current stop position. In this embodiment, each of the first reel 54*a*, second reel 54*b* and third reel 54*c* define a series of holes around its side, each hole associated with a stop position of its respective reel. The photoelectric diode of each reel is positioned on the side of the reel such that as the reel turns it receives light from a light source configured to shine through the holes on the side of the reel each time the reel moves a stop position. In this embodiment, when the reel is installed, a designated stop position is calibrated as a first stop position. Since a mechanical reel has a fixed number of stop positions in a designated order, the processor is enabled to track exactly what stop positions are displayed at various display areas because each time the photodiode receives light, it sends an electric signal to the processor 12 indicating the reel has moved a stop position.

In another embodiment, the processor 12 keeps track of what stop positions are displayed at various display areas associated with a respective reel by counting drive pulses of the step motor. In this embodiment, drive pulses sent to a respective step motor (each drive pulse corresponding to a stop position) by the processor 12 are cumulatively counted by the processor 12. In this embodiment, the processor 12 resets the count to zero every one rotation of the respective reel. In this embodiment, the processor 12 resets the drive pulse count upon receipt of a signal indicating a complete rotation of the reel. In various embodiments, a complete rotation of the reel could be indicated by a photo diode arrangement as discussed above, or another suitable electromechanical device know in the art.

It should be appreciated that although the above example describes an embodiment in which the first reel 54*a*, second reel 54*b* and third reel 54*c* are mechanical reels, in various other embodiments, the reels are video reels displayed at display device 16. In one such embodiment, the memory device 14 stores a plurality of virtual reel strips and the gaming device simulates the spinning of a mechanical reel, enabling the player to see the symbols of the reel strip associated with the virtual reel as the reel spins.

In another embodiment, the gaming device includes a multi-layer display, or multiple display devices arranged in a common line of sight. The common line of sight passes through a portion of an exterior display device and to a portion of an interior display device. In some cases, an intermediate display device or light filter is also included between the exterior display device and the interior display device and the common line of sight passes through a portion of the intermediate display device as well. A touch screen may also be added outside the exterior display device to facilitate player input and gaming machine interaction. The common line of sight arrangement permits a player to view video output on all the display devices simultaneously or without substantially changing their position or line of sight.

In one embodiment, the interior display device includes a digital display device that includes a curved surface. The curved surface may be used to show virtual video reels that resemble mechanical reels. The digital display device, however, permits the number of reels and the symbols on each reel to be changed, as desired.

The multiple display devices may be used in many ways. In one embodiment, a single game is output using all the display devices, which cooperate to form a single coordinated visual presentation. Different depths provided by the multiple display devices improve presentation of three-dimensional graphics.

In another embodiment, the multiple display devices output video for different games or purposes. For example, the interior display device may output a game, while the intermediate display device outputs a bonus game or pay table associated with the interior display, while the exterior and foremost display device provides a progressive game or is reserved for player interaction and video output with the touch screen.

In one embodiment, the exterior display device has a screen that has the capacity to be completely or partially translucent or transparent at controlled times and/or at controlled portions and locations on the screen. An intermediate display device can have the same see-through capacity. When one of the proximate display screens is transparent or translucent, a player can see images displayed on one of the distal display devices.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, the base or primary game is a Pachisuro-style game discussed in detail below. In various other embodiments, the gaming device may provide any slot game as a primary or secondary game and also provide the Pachisuro-style game as a primary or secondary game.

In both the Pachisuro-style game and other slot games, the game includes one or more paylines 52. The paylines may be horizontal, vertical, circular, diagonal, angled or any combination thereof. In one embodiment, an electromechanical slot machine includes a plurality of adjacent, rotatable reels which may be combined and operably coupled with an electronic display of any suitable type. In another embodiment, if the reels are in video form, one or more of the display devices, as described above, displays the plurality of simulated video reels. Each reel displays a plurality of indicia or symbols, such as bells, hearts, fruits, numbers, letters, bars, or other images which preferably correspond to a theme associated with the gaming device.

In an alternative embodiment, in the Pachisuro-style game or an additional slot game, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, for the Pachisuro-style game or an additional slot-type game, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
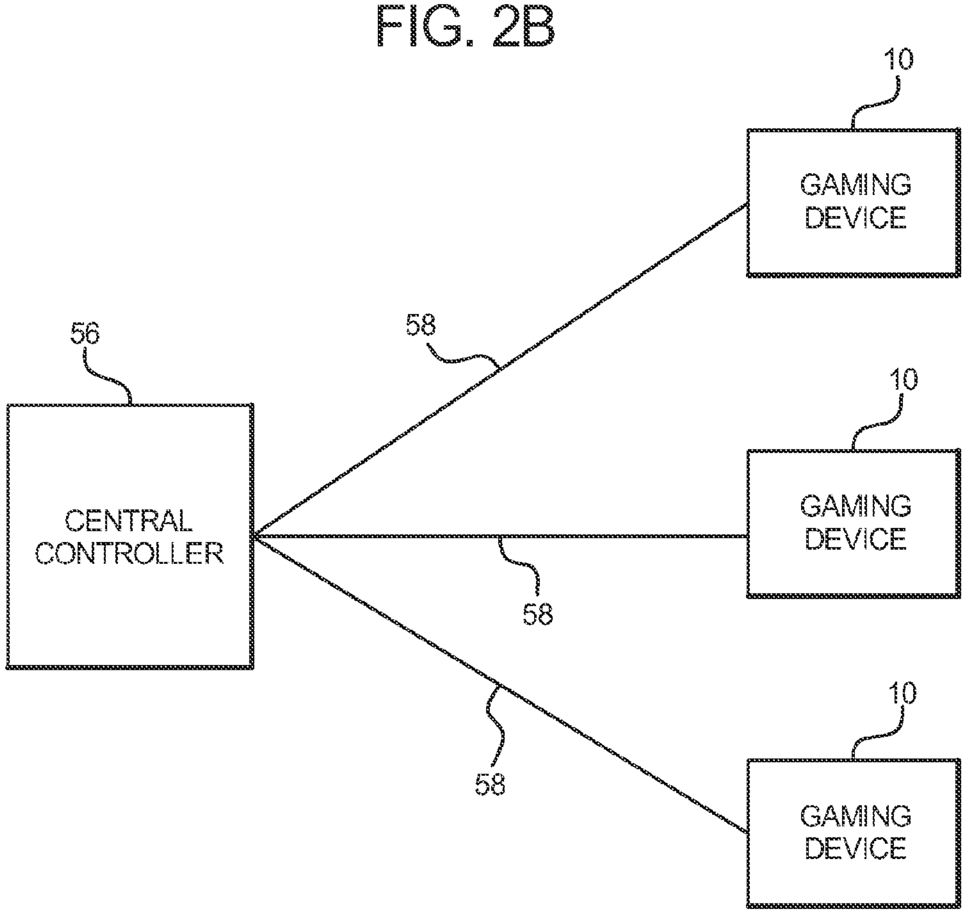
FIG. 2B is a schematic diagram of the central controller in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome of one or more primary or secondary games is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device (s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Virtual Map Driven Reel Stop Position Determination

Various embodiments of the disclosed gaming device and method of operating a gaming device provide a Pachisuro-style slot game. Referring specifically to FIG. 1A, one embodiment of the gaming device of the present disclosure includes a housing 11 which supports a first reel 54*a*, a second reel 54*b*, and a third reel 54*c*. Each reel includes 22 stop positions (numbered 0 to 21), wherein each stop position is associated with a suitable symbol which can, but does not have to include one or more blank symbols.

FIGS. 3 to 16 help illustrate the steps and components entailed in the design of one embodiment of the Pachisuro-style game. Specifically, FIG. 3 illustrates a table 100 showing the symbols on respective reel strips for the first reel 54*a*, the second reel 54*b*, and the third reel 54*c*. Table 100 illustrates the symbol associated with each stop position for each reel. In this embodiment each stop position of each reel is associated with a symbol on a reel strip.

It should be appreciated that in various embodiments, the Pachisuro-style gaming device and game may include any suitable type of reel, any suitable number of reels, such as three to five reels, each reel may include any suitable number of stop positions and the stop positions of each reel may be numbered in any suitable fashion. Thus, although in FIG. 1A, the first reel 54*a*, second reel 54*b*, and third reel 54*c* are mechanical reels, it should be appreciated that in other embodiments, the reels are video reels. For example, FIG. 1B illustrates video reels including first reel 57*a*, second reel 57*b*, and third reel 57*c*.

Referring back to FIG. 1A, the housing 11 of the gaming device also supports a plurality of stop input devices 30*a*, 30*b*, and 30*c*. Each of the plurality of reels is associated with a different one of the plurality of stop input devices. The first reel 54*a* is associated with first stop input device 30*a*. The second reel 54*b* is associated with second stop input device 30*b*. The third reel 54*c* is associated with third stop input device 30*c*. Each stop input device enables a player to stop the respective reel when the reel is spinning by activating the stop input device. In FIG. 1A, first stop input device 30*a*, second stop input device 30*b*, and third stop input device 30*c* are separate electromechanical input devices or buttons. In various other embodiments, the stop input devices are selections on a touch screen or other suitable video-based selections. For example, FIG. 1B illustrates touch screen selection stop input devices including first stop input device 31*a*, second stop input device 31*b*, and third stop input device 31*c*. It should also be appreciated that in various other embodiments, the gaming device can include a single stop input device which serves the function of each of first stop input device 30*a*, second stop input device 30*b* and third stop input device 30*c* by being pressed sequentially three different times or selected in another suitable manner.

In this example embodiment, the gaming device also includes one or more processors 12 and one or more memory devices 14. For each reel, the processor 12 randomly determines the stop position at which the reel ultimately stops based on a virtual map stored in the memory device 14 for an initiating stop position of that reel which is determined by the player's activation of the stop input device for that reel as defined above.

More specifically, in this illustrated embodiment, the first reel 54*a* has 22 stop positions and 22 virtual maps, the second reel 54*b* has 22 stop positions and 22 virtual maps, and the third reel 54*c* has 22 stop positions and 22 virtual maps. The virtual map for the initiating position enables the processor to randomly determine which of the following stop positions the reel will stop at based on a randomly generated number. It should be appreciated that in one embodiment, the processor 12 randomly generates the number after the player activates the stop input device associated with the respective reel. In other embodiments, the processor 12 randomly generates the number before the player activates the stop input device for the reel.

Each virtual map includes a range of stop positions and for each stop position in the range, an associated weight. The processor 12 randomly determines a stop position based on the weights associated with the stop positions in the range of the virtual map. FIGS. 5A to 5V illustrate one embodiment of the virtual maps 110*a* to 110*v* for each respective stop position of the first reel 54*a*.

More specifically, referring to FIG. 5A for illustrative purposes, virtual map 110*a* is associated with stop position 0 of the first reel 54*a*. Virtual map 110*a* includes a range of five stop positions including stop positions 17 to 21 of the first reel 54*a*. Stop position 21 follows directly behind stop position 0 as the reel spins, and stop position 17 is 5 symbol positions away from stop position 0. Stop position 17 is associated with a weight of 46, stop position 18 is associated with a weight of 68, stop position 19 is associated with a weight of 59, stop position 20 is associated with a weight of 19, and stop position 21 is associated with a weight of 64.

Figure 4:
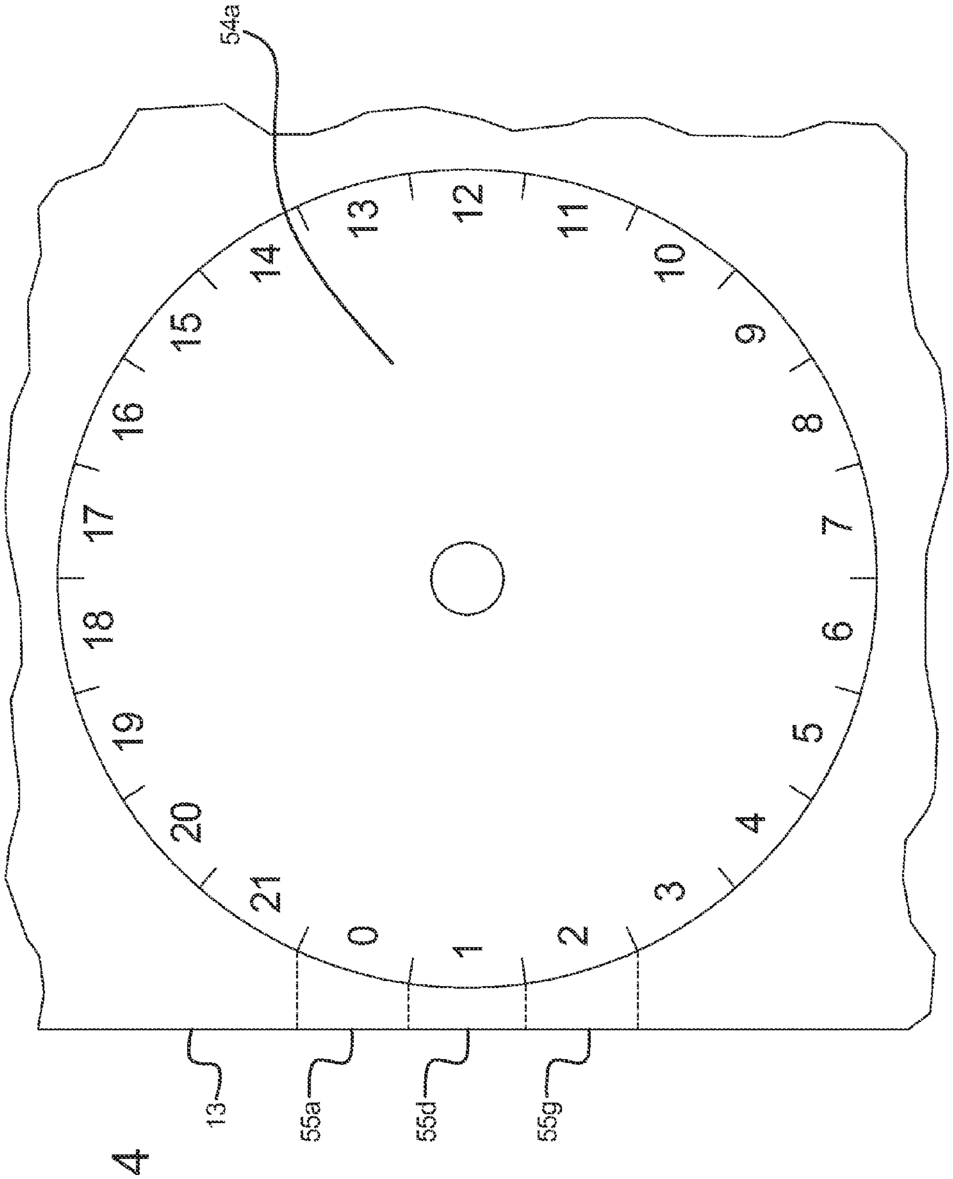
FIG. 4 shows a side view of a reel relative to certain symbol display areas of a gaming device disclosed herein.

In this embodiment, during a play of the Pachisuro-style game, when the first reel 54*a* is spinning, if the initiating stop position is stop position 0 of the first reel 54*a*, the gaming device will stop the first reel 54*a* at a stop position between stop position 17 and stop position 21. FIG. 1A and FIG. 4 are discussed below to provide examples of selection of the initiating stop position. In FIG. 1A, the reels 54*a*, 54*b* and 54*c* are mechanical reels. The housing 11 is configured to support a glass or plastic panel 13. The panel 13 defines a plurality of symbol display areas (see symbol display areas 55*a* to 55*i* in FIG. 18A). In this embodiment, three stop positions of each reel are visible at respective symbol display areas defined by the panel 13.

More specifically, referring to FIG. 4, the symbol associated with stop position 0 is displayed at symbol display area 55*a*, the symbol associated with stop position 1 is displayed at symbol display area 55*d* and the symbol associated with stop position 2 is displayed at symbol display area 55*g*. (See FIG. 18A for a front view of these symbol display areas). Referring to FIG. 4, the predetermined position in this embodiment is defined by symbol display area 55*d*. Use of the term initiating stop position is discussed above. In this embodiment, a stop position is at the predetermined symbol display area 55*d* if the symbol associated with the stop position is within the area defined by symbol display area 55*d* when the player activates stop input device 30*a*. However, a symbol may not be perfectly aligned with symbol display area 55*d* at the time the player activates stop input device 30*a* (e.g., a symbol could be half positioned at symbol display area 55*a* and half positioned at symbol display area 55*d*). In such a scenario, in this embodiment, the stop position associated with the symbol after such symbol on the reel strip for the first reel 54*a* would be the first to be at the predetermined position when the player activates stop input device 30*a*.

It should be appreciated that in various other embodiments, a different symbol display area associated with each reel could be used as a point of reference for determining the initiating stop position for each reel for each spin of that reel. For example, the top symbol display area of a reel or bottom symbol display area may be the point of reference for the reels for determining the initiating stop positions in various other embodiments.

It should be appreciated that in various other embodiments, instead of a symbol display area, the location of a stop position relative to a predetermined reference line may be determinative of the initiating stop position for the reel when the player activates the stop input device associated with the reel.

In various other embodiments, the initiating stop position is determined based on a step count of a step motor associated with a mechanical reel. For example, in one embodiment, the step motor of a reel includes 132 steps, 6 for each stop position of the 22 stop position reel. Thus, stop position 0 is associated with steps 1 to 6, stop position 1 is associated with steps 7 to 12, and so on. In this embodiment, if the player activates the stop input device associated with the reel when the step motor is at step 9, stop position 1 is the initiating stop position. It should be appreciated that in such embodiments, the step motor may include any suitable number of steps. Further, it should be appreciated that the initiating stop position for each reel may be determined in any other suitable manner in various other embodiments.

Specifically, for example, if the player activates stop position 30a associated with the first reel 54*a* when the symbol associated with stop position 0 is positioned within display area 55*d* in FIG. 4, stop position 0 is the initiating stop position and the processor 12 uses virtual map 110*a* illustrated in FIG. 5A (stored in memory device 14) to randomly determine which of stop position 17 to stop position 21 the first reel 54*a* will stop at, subject to the weight associated with each stop position. The sum of the weights associated with each of the stop positions in virtual map 110*a* is 256. Thus, in one example embodiment, the processor 12 would randomly generate a number between 1 and 256. If the randomly generated number is between 1 and 46, the processor 12 causes the first reel 54*a* to stop at stop position 17. If the randomly generated number is between 47 and 114, the processor 12 causes the first reel 54*a* to stop at stop position 18. If the randomly generated number is between 115 and 173, the processor 12 causes the first reel 54*a* to stop at stop position 19. If the randomly generated number is between 174 and 192, the processor 12 causes the first reel 54*a* to stop at stop position 20. If the randomly generated number is between 193 and 256, the processor 12 causes the first reel 54*a* to stop at stop position 21. These stops would be for the selected symbol to stop at symbol display area 55*d*.

The above is an example of a random number generation method which could be implemented by the processor 12 to randomly determine a stop position according to the weights in virtual map 110*a*. It should be appreciated that in any of the embodiments herein, any suitable random number generation technique utilizing the weights or different probabilities in the virtual maps may be used to randomly determine stop positions. For example, in various other embodiments, the processor 12 randomly generates a number larger than the sum of the weights for a virtual map and the number is scaled down to a number within the sum of the weights for the virtual map based on a suitable mathematical conversion.

In this example, although the processor 12 randomly determines a number, it should be appreciated that by adjusting the weights assigned to each stop position, a gaming device designer can adjust the likelihood of the processor 12 randomly selecting each respective stop position in the virtual map. For example, according to virtual map 110*a*, if the player activates stop input device 30*a* when stop position 0 (an "Orange" symbol) is displayed, the first reel 54*a* is most likely to stop at stop position 18 (associated with a "Free Shot" symbol). A gaming device designer can change this likelihood by shifting the weights associated with the stop positions in virtual map 110*a*, as discussed in more detail below.

It should be appreciated that although in virtual map 110*a*, each stop position is associated with a different weight, in various other embodiments, a plurality of stop positions in a virtual map are associated with a same weight. In various other embodiments, all of the stop positions in one or more virtual maps are associated with a same weight. In yet another embodiment, each stop position of each virtual map of one or more, but not all, of a plurality of reels is associated with a same weight.

It should be appreciated that in various other embodiments, a plurality of stop positions of one or more reels are associated with a same virtual map. Thus, in such embodiments, each stop position of each reel is not associated with a different virtual map.

It should also be appreciated that in various other embodiments, the sum of the weights in one or more virtual maps of one or more reels is different. It should be further appreciated that in various other embodiments, one or more virtual maps of one or more reels may include a range of stop positions including a different number of stop positions.

FIGS. 6A to 6V illustrate one embodiment of the virtual maps 120*a* to 120*v* for each respective stop position of the second reel 54*b*. The processor 12 uses virtual maps 120*a* to 120*v* to determine which of a respective range of stop positions the second reel 54*b* stops at after the player activates second stop input device 30*b* when the second reel 54*b* is spinning.

FIGS. 7A to 7V illustrate one embodiment of the virtual maps 130*a* to 130*v* for each respective stop position of the third reel 54*c*. The processor 12 uses virtual maps 130*a* to 130*v* to determine which of a respective range of stop positions the third reel 54*c* stops at after the player activates third stop input device 30*c*.

Figure 8:
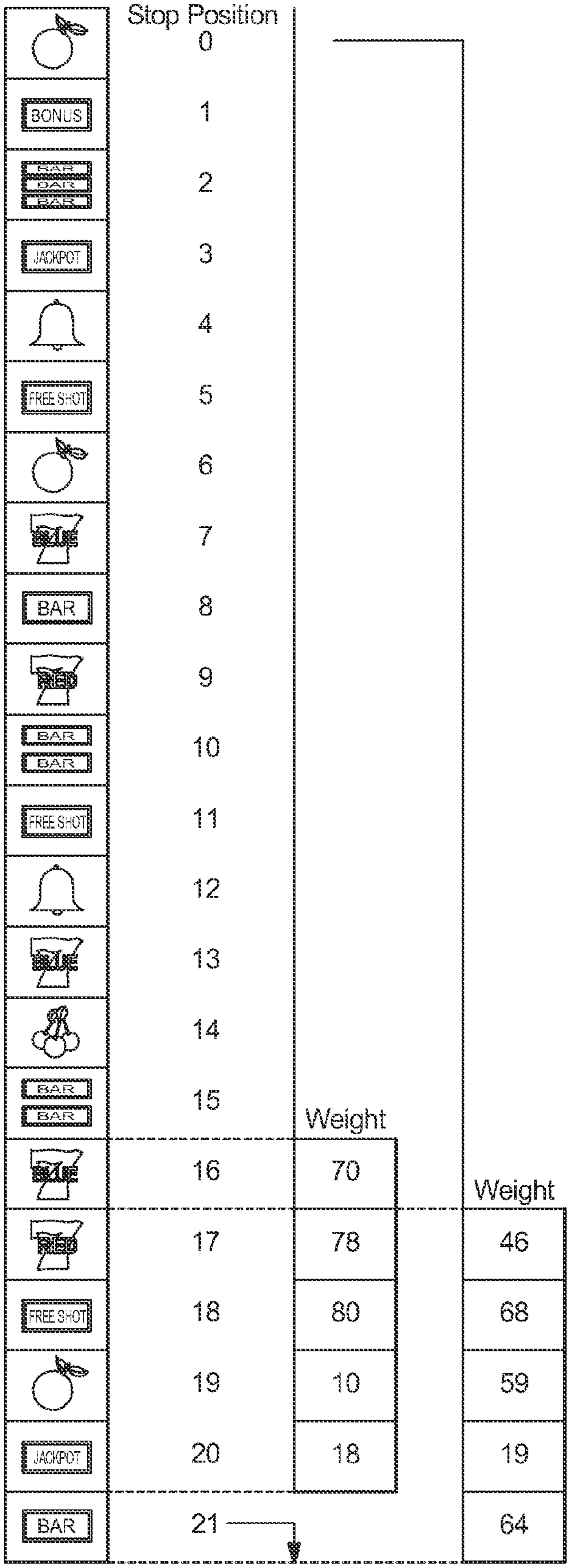
FIG. 8 illustrates the reel strip associated with a first reel in relation to the stop positions of the first reel and the weights and stop positions of certain virtual maps associated with the first reel.

FIG. 8 provides an alternative illustrative partial representation of the relationship between the range of the respective stop positions and their weights of virtual maps 110*a* and 110*v* and the respective stop positions of the first reel 54*a*. In this embodiment, if stop position 21 of the first reel 54*a* is the initiating stop position for the first reel 54*a*, the processor 12 causes the first reel 54*a* to spin at least one but no more than five stop positions before coming to a stop at one of stop positions 16 to 20. The lag of at least one stop position is because of mechanical limitations due to the laws of physics and because based on the exact portion of the symbol associated with the stop position located at the predetermined location (e.g., symbol display area) being indicated (top ¼ of the symbol versus whole symbol), the symbol may no longer be available when the player activates the stop input device (e.g., too much of the symbol may have progressed to the next symbol display area or out of view). If stop position 0 is the initiating stop position for the first reel 54*a*, the processor 12 causes the first reel 54*a* to spin at least one but no more than five stop positions before coming to a stop at one of stop positions 17 to 21. It should be appreciated that in various other embodiments, the number of stop positions after the initiating stop position for a reel before the first stop position in the range of stop positions for the virtual map associated with the initiating stop position may be any suitable number of stop positions.

It should be appreciated that in various embodiments, a plurality of variables influence the ability of a mechanical reel to stop at a desired number of stop positions (e.g., one or two) following an initiating stop position including: (a) the size of the mechanical reel; (b) the size of the symbols on the reel strip associated with the mechanical reel; and (c) the speed of the mechanical reel when the respective stop input device is activated. In various embodiments, the number of stop positions past the initiating stop position a reel is able to stop at and the number of stop positions in the range of one or more virtual maps may vary based on variations in these variables.

Additionally, in various other embodiments, the number of stop positions after the initiating stop position for a respective reel before the first stop position in the range of stop positions for the virtual map associated with the initiating stop position may be different for different reels.

FIG. 9 illustrates an overall paytable 140 for one embodiment of the Pachisuro-style game, the overall paytable 140 having an average expected payback percentage. In this embodiment, the game designer arrives at the average expected payback percentage of the overall paytable 140 by constructing a component paytable for each of the 10,648 possible combinations of virtual maps for this embodiment. The average expected payback percentage (or adjusted average expected payback percentage, a concept discussed in more detail below) of each respective component paytable in this embodiment is between 80% and 95%. Thus, the average expected payback percentage of the overall paytable 140 is between 80% and 95%. More specifically, in this embodiment, the average expected payback percentage of the overall paytable 140 is the average of the average expected payback percentages of the respective component paytables. It should be appreciated that in various embodiments, the range of average expected payback percentages for each respective component paytable may be any suitable range.

It should also be appreciated that in this embodiment, the upper range of the average expected payback percentage stops at 95% to enable the gaming provider to receive funds to ultimately provide back to players in the form of progressive awards, bonus awards, or any other suitable form.

This embodiment of the Pachisuro-style game enables highly skilled players to achieve higher payback percentages than unskilled players. If the player can identify the stop positions as the player activates respective stop input devices, the player can target certain combinations of stop positions. For example, over time, a highly skilled player may recognize that when they activate the stop input devices when certain symbols are displayed, they repeatedly receive high awards, even if not frequently (a high volatility experience), or receive low awards frequently (a low volatility experience). Thus, the player may try to repeatedly activate the stop input devices when these symbols are displayed. In this example, the highly skilled player has identified a combination of stop positions associated with a component paytable that has a high payback percentage. As a simple example, a component paytable is associated with stop position 5 of the first reel 54*a*, stop position 5 of the second reel 54*b* and stop position 5 of the third reel 54*c* and has an average expected payback percentage of 95%. Thus, if a highly skilled player repeatedly activates the stop input devices when stop position 5 of the first reel 54*a* is located at the first payline 52*a*, stop position 5 of the second reel 54*b* is located at the first payline 52*a* and stop position 5 of the third reel 54*c* is located at the first payline 52*a*, the highly skilled player will achieve a theoretical payback percentage of 95% a large number of plays of the game.

In various embodiments, the memory device 14 also stores a multiplier look-up table including a plurality of multiplier tables, and for each multiplier table, one or more of the combinations of stop positions associated with the multiplier table. FIG. 10 illustrates a multiplier look-up table 142 for this embodiment of the Pachisuro-style game. In multiplier look-up table 142, stop position combination including stop position 12 of the first reel 54*a*, stop position 20 of the second reel 54*b* and stop position 5 of the third reel 54*c* is associated with multiplier table Y, discussed in more detail below. It should be appreciated that although FIG. 10 does not illustrate multiplier tables for each respective combination of stop positions, the memory device 14 can store multiplier table data for each of the 10,648 combinations of stop positions in this example. In this embodiment, each multiplier table includes a plurality of different multipliers, which each have a different weight. The processor 12 randomly selects a multiplier (based on the weights) to apply to any determined award for a play of the Pachisuro-style game.

In this embodiment, the gaming device designer configures each multiplier table such that the average expected payback percentage of the component paytable associated with the multiplier table multiplied by the average multiplier value of the multiplier table results in an adjusted average expected payback percentage for the component paytable that is within the desired payback range, such as 80% to 95%. This range of average expected payback percentages for the component paytables may vary by gaming jurisdiction. In embodiments in which this range is more narrow (e.g., 84% to 95%), the multiplier tables are configured to bring the average expected payback percentage of the component paytables associated with multiplier tables into the narrower range.

FIG. 11 shows an illustrative table 144 including certain stop position combinations and for each stop position combination, the average expected payback percentage of the component paytable associated with the stop position combination, the multiplier table associated with the component paytable by the game designer, the average multiplier of the multiplier table associated with the component paytable and the adjusted average expected payback percentage of the component paytable after application of the average multiplier of the multiplier table. For example, the component paytable of the combination of stop positions including stop position 6 at the first reel 54*a*, stop position 9 at the second reel 54*b* and stop position 7 at the third reel 54*c* is associated with multiplier table D1. This component paytable has an average expected payback percentage of 79.72%. Multiplier D1 has an average multiplier of 1.18. Thus, the adjusted average expected payback percentage of the component paytable associated with the above stop position combination is 94.07%. The average of the average expected payback percentages in FIG. 11 is 89.18%. This would be the theoretical average expected payback percentage for a player not exercising any skill, or essentially, randomly activating the stop input devices for each of the reels for a designated number of plays of the game. The relationship between component paytables and multiplier tables is discussed in more detail in specific examples below.

In one embodiment, the gaming device designer associates one or more component paytables with a respective multiplier table based on a range of average expected payback percentages within which the average expected payback percentage of the component paytable is located. FIG. 12 illustrates a table 170 constructed by a game designer including a plurality of ranges of component paytable average expected payback percentages and a respective multiplier chart associated with each range of component table average expected payback percentages. For example, the gaming device designer associates component paytables having an average expected payback percentage between 10% and 11% with multiplier table A. Multiplier table A has an average multiplier value of 8.3. Likewise, the gaming device designer associates component paytables having an average expected payback percentage between 77.51% and 80% with multiplier table D1. Multiplier table A has an average multiplier value of 1.18. Note that as the range of payback percentages in table 170 increases, the average multiplier value of the multiplier table associated with the respective range decreases. This illustrates the function of the multiplier tables well—to give component paytables having a low average expected payback percentage an adjusted average expected payback percentage within 80% to 95%. It should be appreciated that in various embodiments, the range of average expected payback percentages for the component paytables may be any suitable range.

Figure 13:
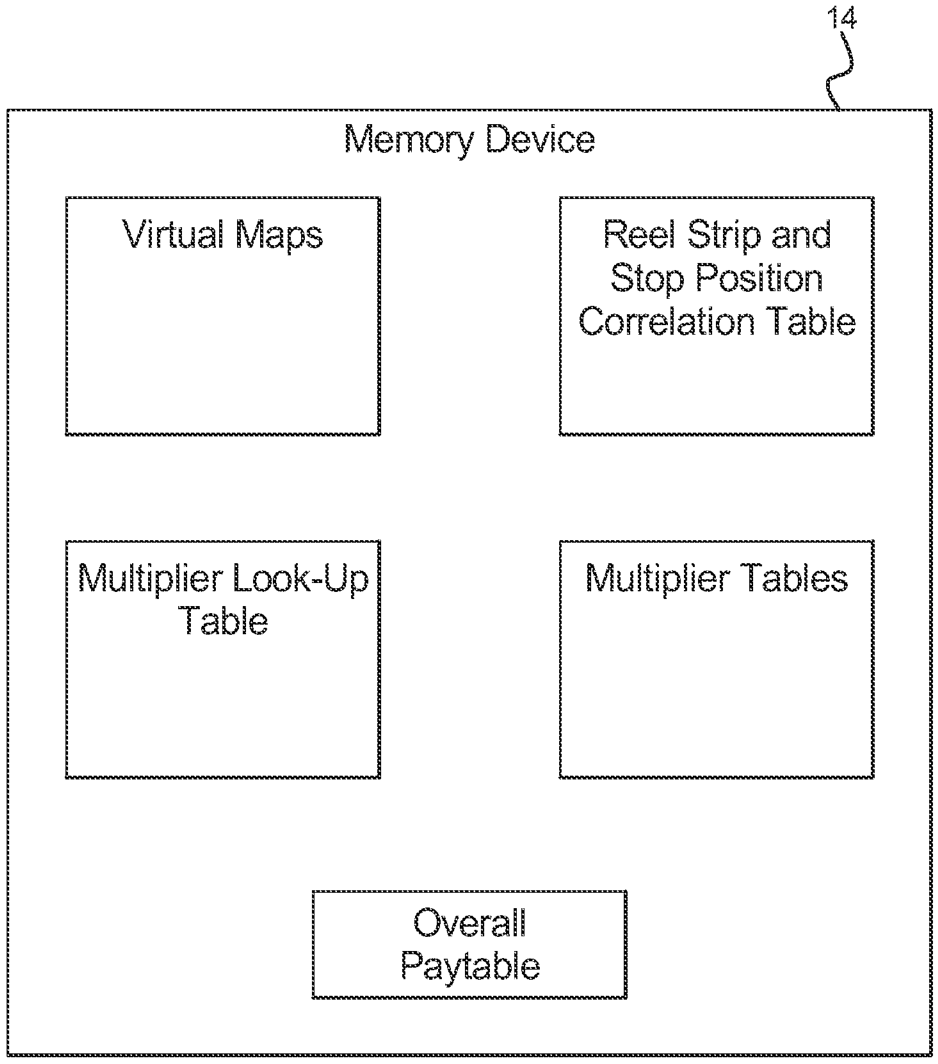
FIG. 13 illustrates certain information stored in the memory device of the gaming device used for a play of the Pachisuro-style game disclosed herein.

FIG. 13 very generally illustrates, for this embodiment of the Pachisuro-style gaming device, certain files or data stored in the memory device 14. As illustrated in FIG. 13, the memory device 14 stores the virtual maps of each of the stop positions of each of the reels (as illustrated in FIGS. 5A to 5V, 6A to 6V and 7A to 7V), the reel strip and stop position correlation table (as illustrated in FIG. 3), the multiplier look-up table (as illustrated in part in FIG. 10), the multiplier tables (as illustrated in part in FIGS. 16A to 16E) and the overall paytable for the Pachisuro style game (as illustrated in FIG. 9). It should be appreciated that the other tables discussed such as table 170 discussed above and the component paytables and respective weight tables associated therewith that are discussed below are working tables used for game development and do not need to be stored in memory device 14.

FIG. 14 illustrates a weight table associated with the combination of stop position 0 of the first reel 54*a*, stop position 0 of the second reel 54*b* and stop position 0 of the third reel 54*c* which aids a game developer in developing component paytable 160. Component paytable 160, associated with the combination of stop position 0 of the first reel 54*a*, stop position 0 of the second reel 54*b* and stop position 0 of the third reel 54*c*, is illustrated in FIG. 15.

Figure 18A:
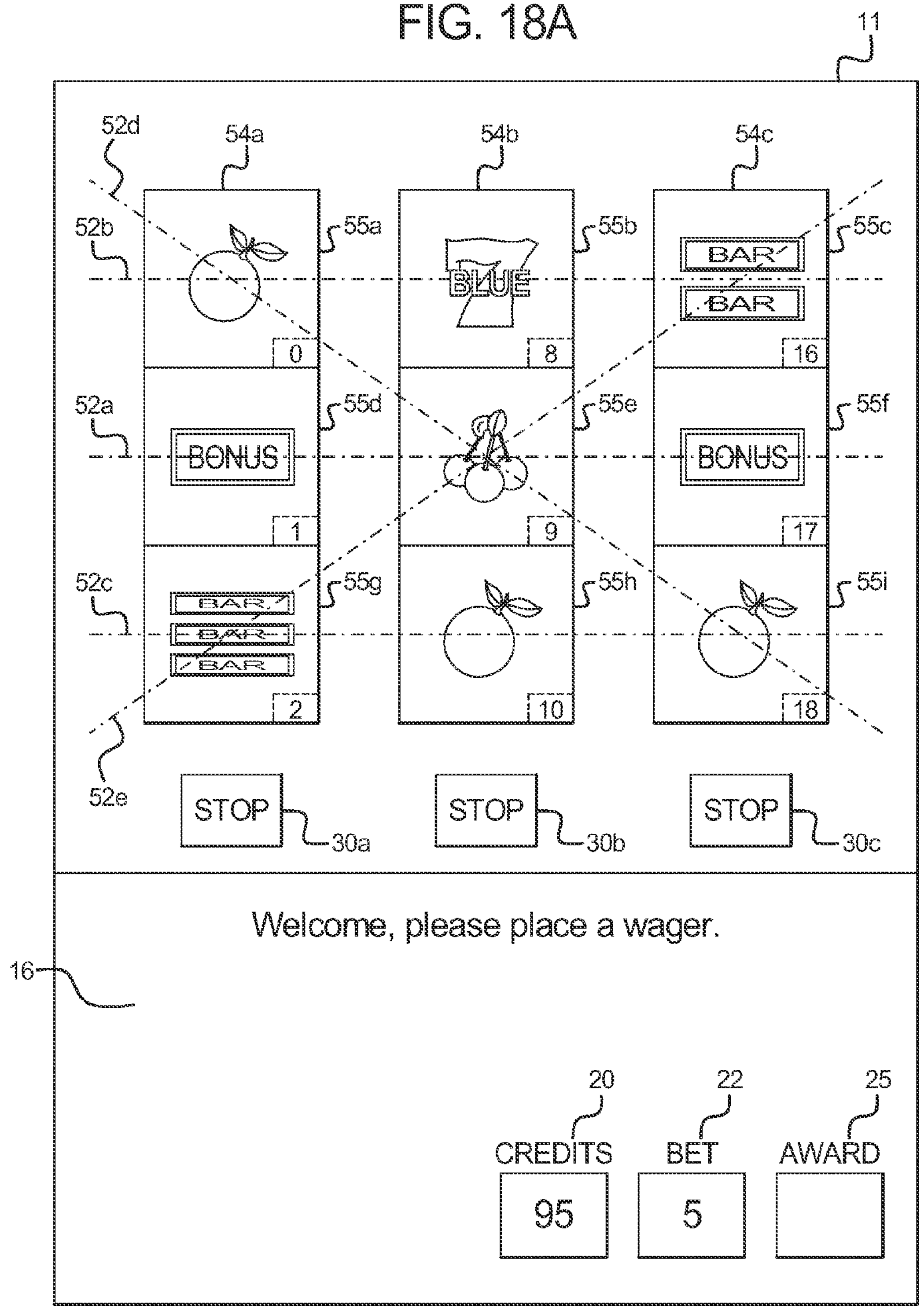
FIGS. 18A, 18B, 18C and 18D include front views of a gaming device enabling a play of one embodiment of the Pachisuro-style game disclosed herein.

FIG. 18A, as discussed in further detail below, illustrates the first payline 52*a*, the second payline 52*b*, the third payline 52*c*, the fourth payline 52*d*, and the fifth payline 52*e*. The first payline 52*a* includes symbol display areas 55*d*, 55*e*, and 55*f*. The second payline 52*b* includes symbol display areas 55*a*, 55*b*, and 55*c*. The third payline 52*c* includes symbol display areas 55*g*, 55*h*, and 55*i*. The fourth payline 52*d* includes symbol display areas 55*a*, 55*e*, and 55*i*. The fifth payline 52*e* includes symbol display areas 55*c*, 55*e*, and 55*g*.

In the embodiments disclosed herein, the player is required to wager at least 5 credits on a play of the game (one credit for each of the five paylines). Also, players may be able to wager multiple credits on each payline. It should be appreciated that in various other embodiments, the player does not need to wager on each of the paylines in the game and may wager on more or less than five paylines. It should also be appreciated that in various other embodiments, the player may make other types of wagers on a play of the game in addition to wagering on one or more paylines, including side wagers on one or more game outcomes or events occurring.

Weight table 150 and component paytable 160, as in the case of other examples discussed below, appear complicated due to the inclusion of five paylines in the probability analysis. It should be appreciated that in various other embodiments including a single payline, or fewer paylines than five, the methodology used in building these tables would be the same, but the tables would be smaller.

FIG. 15 illustrates the weights, based on virtual map 110*a* (associated with stop position 0 of the first reel 54*a*), virtual map 120*a* (associated with stop position 0 of the second reel 54*b*) and virtual map 130*a* (associated with stop position 0 of the third reel 54*c*), of each respective symbol relative to various symbol display areas on the paylines when each of the first reel 54*a*, the second reel 54*b* and the third reel 54*c* stop spinning after the player activates respective stop input devices 30*a*, 30*b* and 30*c*.

For example, as illustrated in FIG. 14, the "Free Shot" symbol has the highest probability of being randomly selected as the symbol displayed at symbol display area 55*d* (of the first payline), the "Bonus" symbol has the highest probability of being randomly selected as the symbol displayed at symbol display area 55*e* and the "Orange" symbol has the highest probability of being randomly selected as the symbol displayed at symbol display area 55*f*.

Still referring to FIG. 14, certain symbols have no chance of being displayed at one or more paylines based on this combination of virtual maps. Thus, any symbol combinations including those symbols do not contribute to the payback percentage of component paytable 160 in FIG. 15, as further discussed below.

Component paytable 160, associated with the combination of stop position 0 of the first reel 54*a*, stop position 0 of the second reel 54*b* and stop position 0 of the third reel 54*c*, includes the plurality of predetermined winning symbol combinations from overall paytable 140 and the awards associated with those winning symbol combinations.

The predetermined winning symbol combination "Red 7-Red 7-Red 7" in component paytable 160 is analyzed below for illustrative purposes. The probability of "Red 7-Red 7-Red 7" being displayed at the first payline 52*a* is 0% ([46×0×33]/[256×256×256]). The probability of "Red 7-Red 7-Red 7" being displayed at the second payline 52*b* is 0.308% ([68×38×20]/[256×256×256]). The probability of "Red 7-Red 7-Red 7" being displayed at the third payline 52*c* is 0% ([0×0×48]/[256×256×256]). The probability of "Red 7-Red 7-Red 7" being displayed at the fourth payline 52*d* is 0% ([68×0×48]/[256×256×256]). The probability of "Red 7-Red 7-Red 7" being displayed at the fifth payline 52*e* is 0% ([0×0×20]/[256×256×256]). This results in a total probability (for all five paylines) of 0.308% of the combination "Red 7-Red 7-Red 7" being displayed at any of the first payline 52*a*, the second payline 52*b*, the third payline 52*c*, the fourth payline 52*d* and the fifth payline 52*e*.

In component paytable 160, the contribution of each respective predetermined winning symbol combination to the average expected payback percentage of component paytable 160 is the probability of the symbol combination being generated at any of the five paylines multiplied by the award associated with the predetermined winning symbol combination. Thus, in component paytable 160, the contribution of the predetermined winning symbol combination "Red 7-Red 7-Red 7" is 61.607%.

The above methodology also applies to determining the contribution of each of the other predetermined winning symbol combinations in component paytable 160 to the average expected payback percentage of component paytable 160.

Note that paytable 160 illustrates for this combination of stop positions, the player has a chance at receiving a free spin resulting from the symbol combination "Free Shot-Free Shot-Free Shot." This award does not contribute to the average expected payback percentage of the paytable. In various embodiments of the Pachisuro-style game, the gaming device may require the player to place an additional wager to be eligible for a free spin associated with the symbol combination "Free Shot-Free Shot-Free Shot." In various other embodiments, the player is eligible to receive a free spin for this symbol combination when the game is offered as a bonus game.

The average expected payback percentage per credit of component paytable 160 is 33.13% (the sum of the probability of displaying each respective predetermined winning symbol combination at any of the five paylines multiplied by the award associated with each respective predetermined winning symbol combination, divided by five since there are five paylines). It should be appreciated that each payline also has its own average expected payback percentage (although the specific math is not shown).

In this embodiment, 33.13% is not within the designated range of payback percentages for the component paytables of 80% to 95%. Thus, the gaming device designer associates component paytable 160 with a multiplier table in accordance with table 170. Specifically, the average expected payback percentage of component paytable 160 is 33.13%. Thus, referring to table 170 in FIG. 12, the gaming device designer associates component paytable 160 with multiplier table Q 190, illustrated in FIG. 16B.

Multiplier table Q 190 includes a plurality of multiplier values, ranging from one to twenty. Each multiplier value is associated with a weight. When multiplier table Q 190 is used for a play of the game (if the combination of stop positions activated by the player is associated with a component paytable having a payback percentage between 33.01 and 36.5%), the gaming device randomly selects a multiplier from the plurality of multipliers in table 190. The processor 12 randomly determines a multiplier from table 190 based on the weights accorded each of the respective multipliers. As illustrated in table 190, each multiplier multiplied by its respective weight, divided by the sum of the weights (10, 000) indicates the contribution of each respective multiplier to an average multiplier for the multiplier table 190. The average multiplier of multiplier table 190 is 2.55, as indicated in FIG. 16B. Thus, referring to FIG. 15, the adjusted average expected payback percentage of component paytable 160 is 84.489% (average expected payback percentage per credit of 33.133%× average multiplier of 2.55).

FIGS. 16A, 16C, 16D and 16E illustrate certain other multiplier tables including multiplier table A 180, multiplier table S 200, multiplier Y 210 and multiplier table D1 220.

The use of such multiplier tables not only increases the adjusted average expected payback percentage of component paytables constructed for certain combinations of virtual maps, but also creates two levels of randomization when a player activates the stop input devices at a combination of stop positions (or virtual maps) associated with a multiplier table. In other words, the processor first randomly selects a stop position for each reel from the virtual map associated with the initiating stop position, which is determined based on the player's activation of the stop input device associated with the reel. Then, if the combination of virtual maps is associated with a multiplier table, the gaming device randomly determines a multiplier from the multiplier table based on a randomly generated number to apply to any award resulting from the combination of symbols displayed when all of the reels stop spinning. It should be appreciated that as in the case of the randomly determined numbers used for the virtual maps, the randomly determined number used for a multiplier table may be generated by the processor 12 at any suitable time. For example, in various embodiments, the processor generates the random number before the player activates any stop input devices. In various other embodiments, the processor 12 randomly generates the number after the player has activated each of the stop input devices associated with the reels.

Figure 17:
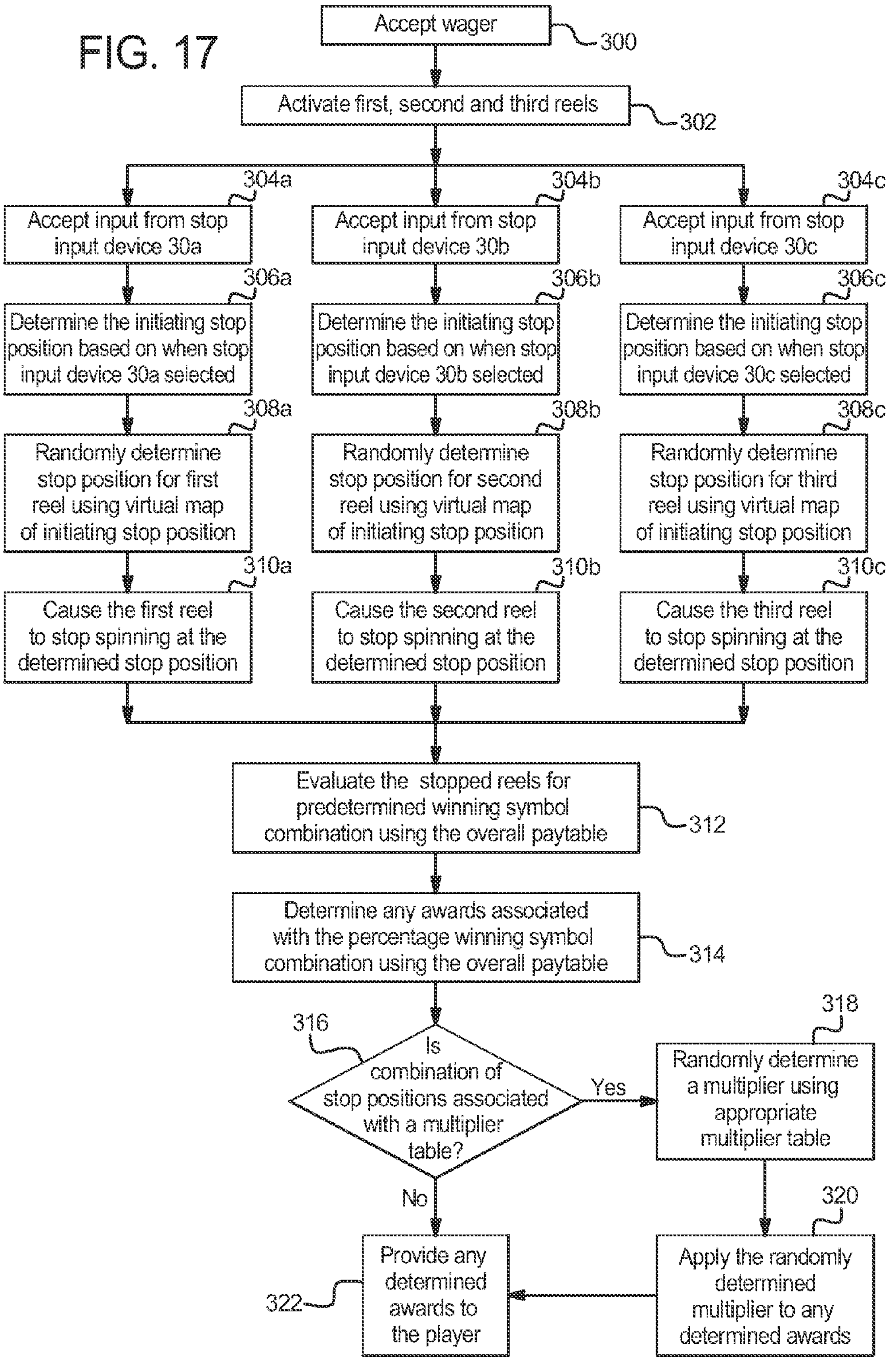
FIG. 17 includes a flowchart illustrating the steps performed by the processor for a play of one embodiment of the Pachisuro-style game disclosed herein.

The flowchart of FIG. 17 illustrates an example of the steps the processor 12 takes for a play of one embodiment of the Pachisuro-style game. The processor receives a signal that a player input a wager for a play of the game, as illustrated in block 300. The processor then causes the activation (e.g, spinning) of each of the first reel 54*a*, the second reel 54*b*, and the third reel 54*c*, as illustrated in block 302.

The processor accepts an input from stop input device 30*a* associated with reel 54*a*, determines the initiating stop position for the first reel 54*a* based on when stop input device 30*a* is activated and randomly determines a stop position for the first reel 54*a* based on the virtual map associated with the initiating stop position, as illustrated in blocks 304*a*, 306*a* and 308*a*. The processor then causes the first reel 54*a* to stop spinning at the determined stop position, as illustrated in block 310*a*.

The processor accepts an input from stop input device 30*b* associated with the second reel 54*b*, determines the initiating stop position for the second reel 54*b* based on when stop input device 30*b* is activated and randomly determines a stop position for the second reel 54*b* based on the virtual map associated with the initiating stop position, as illustrated in blocks 304*b*, 306*b* and 308*b*. The processor then causes the second reel 54*b* to stop spinning at the determined stop position, as illustrated in block 310*b*.

The processor accepts an input from stop input device 30*c* associated with the third reel 54*c*, determines the initiating stop position for the third reel 54*c* based on when stop input device 30*c* is activated and randomly determines a stop position for the third reel 54*c* based on the virtual map associated with the initiating stop position, as illustrated in blocks 304*c*, 306*c* and 308*c*. The processor then causes the third reel 54*c* to stop spinning at the determined stop position, as illustrated in block 310*c*.

After the first reel 54*a*, second reel 54*b*, and third reel 54*c* have stopped spinning, the processor evaluates the symbols displayed at the symbol display areas for predetermined winning symbol combinations using the overall paytable 140 for the Pachisuro-style game, as illustrated in block 312. The processor then determiners any awards associated with the predetermined winning symbol combinations using the overall paytable 140, as illustrated in block 314.

The processor then checks the multiplier look-up table 142 stored in the memory device to determine if the combination of stop positions selected by the player is associated with a multiplier table, as illustrated in diamond 316. If the stop position combination is associated with a multiplier table, the processor randomly determines a multiplier from the multiplier table and applies the randomly determined multiplier to any determined awards, as illustrated in blocks 318 and 320. Finally, the processor causes the gaming device to provide any determined awards to the player, as illustrated in block 322.

FIGS. 18A to 18D illustrate an example of a play of one embodiment of the Pachisuro-style game according to the virtual maps illustrated in FIGS. 5A to 5V, 6A to 6V and 7A to 7V. The stop position of each reel is illustrated in the lower right corner of each of symbol display areas 55*a* to 55*i* in FIGS. 18A to 18D for illustrative purposes to explain the determination of the stop positions of the reels. The stop positions of the reels are not actually displayed to the player during the play of the game. The gaming device requests that the player make a wager, as illustrated in FIG. 18A. The player places a wager of five credits as illustrated in bet display 22.

In this embodiment, the Pachisuro-style game is a primary game. However, it should be appreciated that in various other embodiments, the Pachisuro-style game is a bonus game and the player need not input a wager to play the game.

Figure 18B:
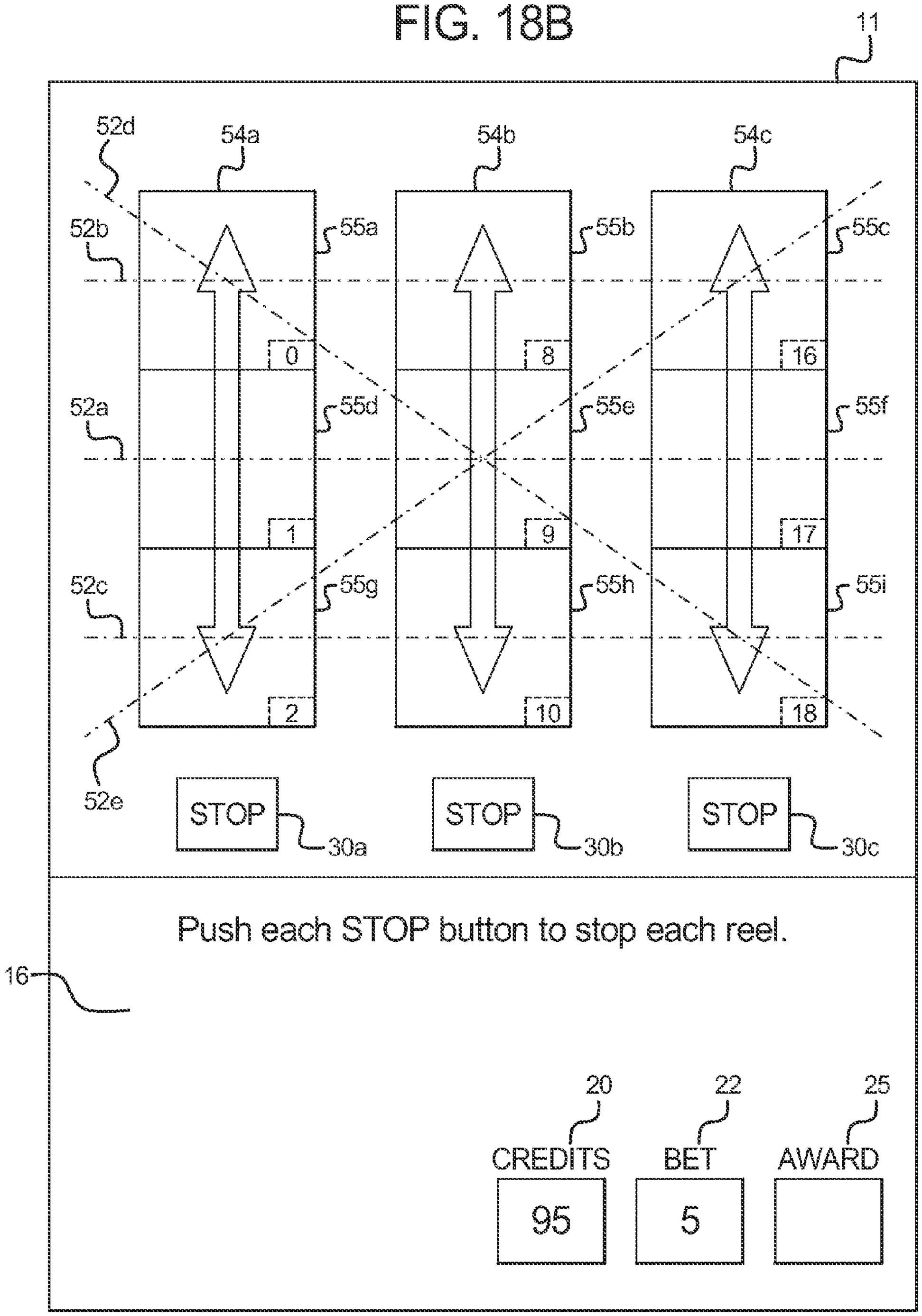
Figure 18C:
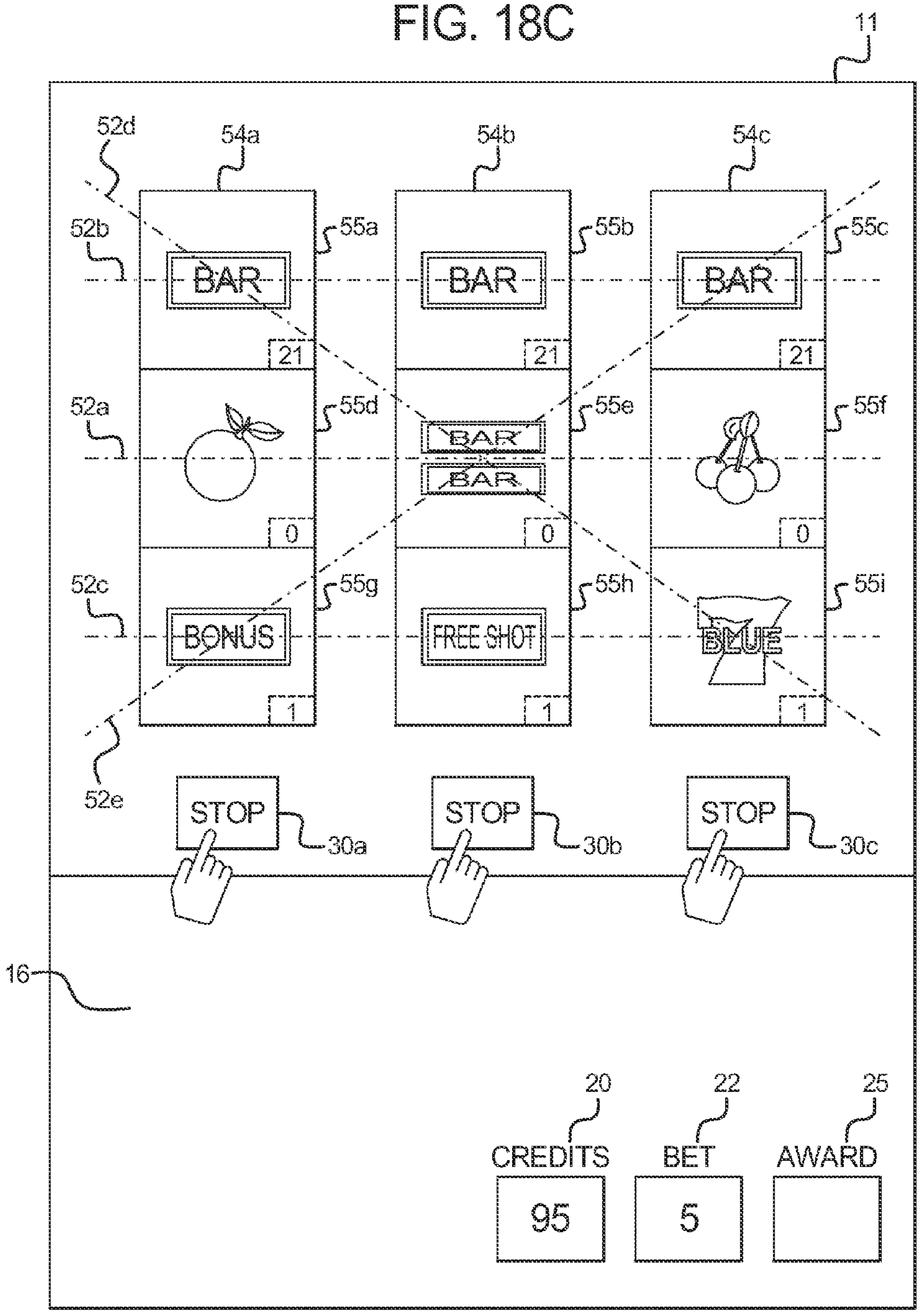

In this embodiment, after the player inputs the wager, each of the first reel 54*a*, the second reel 54*b* and the third reel 54*c* begin spinning as illustrated in FIG. 18B. The gaming device then instructs the player to stop the reels by activating the respective stop input device associated with each reel. Thus, the player would stop the first reel 54*a* by activating the first stop input device 30*a*, stop the second reel 54*b* by activating the second stop input device 30*b* and stop the third reel 54*c* by activating the third stop input device 30*c*.

It should be appreciated that in this embodiment, the player is not required to activate the stop input devices in any particular order. However, in various other embodiments, the player may be required to activate stop input device 30*a* first, then stop input device 30*b*, and finally stop input device 30*c*. In various other embodiments, the player may be required to activate the stop input devices in any suitable order or simultaneously.

In this embodiment, the stop position associated with the center position (55*d*, 55*e* or 55*f*, respectively) when a respective stop input device is activated is used to determine the virtual map the processor 12 uses to randomly determine a stop position at which to stop the reel.

Referring to FIG. 18B, the player activates stop input device 30*a* when stop position 0 of the first reel 54*a* is displayed at symbol display area 55*d*. Thus, the processor selects virtual map 110*a* illustrated in FIG. 5A and randomly determines which of the stop positions following stop position 0 at which to stop the reel using virtual map 110*a*.

Figure 18D:
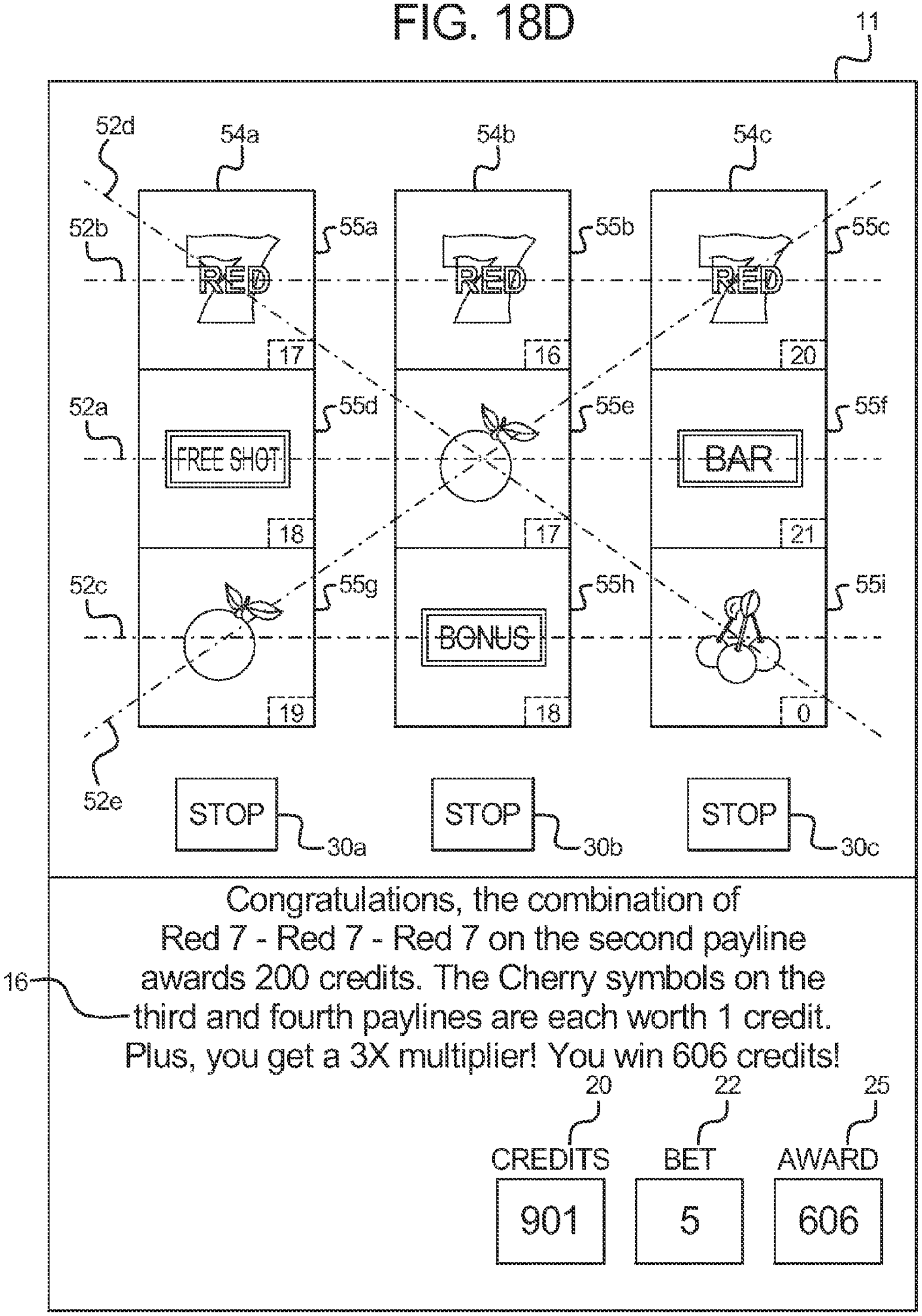

In this example, the processor 12 randomly selects stop position 18 and thus, the processor 12 causes first reel 54*a* to stop spinning such that stop position 18 (associated with a "Free Shot" symbol) is displayed at symbol display area 55*d*, as illustrated in FIG. 18D. Stop position 18 of the first reel 54*a* is associated with a weight of 68 out of 256 in virtual map 110*a*, as illustrated in FIG. 5A. Thus, although stop position 18 was randomly selected by the processor 12, there was a better than one in four chance that the processor 12 would randomly select stop position 18. As a result of this random determination, when the first reel 54*a* stops spinning, stop position 17 (associated with a "Red 7" symbol) is displayed at symbol display area 55*a* and stop position 19 (associated with an "Orange" symbol) is displayed at symbol display area 55*g*.

The player activates stop input device 30*b* when stop position 0 of the second reel 54*b* is displayed at symbol display area 55*e*. Thus, the processor 12 selects virtual map

120*a* illustrated in FIG. 6A and randomly determines which of the stop positions following stop position 0 at which to stop the reel using virtual map 120*a*.

In this example, the processor 12 randomly selects stop position 17 and thus, the gaming device stops spinning the second reel 54*b* such that stop position 17 (associated with an "Orange" symbol) is displayed at symbol display area 55*e*, as illustrated in FIG. 18D. Stop position 17 of the second reel 54*b* is associated with a weight of 38 out of 256 in virtual map 120*a*, as illustrated in FIG. 6A. Thus, although stop position 17 was randomly selected by the processor 12, there was about a 15% chance that stop position 17 would be randomly selected. As a result of this random determination, when the second reel 54*b* stops spinning, stop position 16 (associated with a "Red 7" symbol) is displayed at symbol display area 55*b* and stop position 18 (associated with a "Bonus" symbol) is displayed at symbol display area 55*h*.

The player activates stop input device 30*c* when stop position 0 of the third reel 54*c* is displayed at symbol display area 55*f*. Thus, the gaming device selects virtual map 130*a* illustrated in FIG. 7A and randomly determines which of the stop positions following stop position 0 at which to stop the third reel 54*c* using virtual map 130*a*.

In this example, the processor 12 randomly selects stop position 21 and thus, the processor 12 causes the third reel 54*c* to stop spinning such that stop position 21 (associated with a "1 Bar" symbol) is displayed at symbol display area 55*f*, as illustrated in FIG. 18D. Stop position 21 of the third reel 54*c* is associated with a weight of 20 out of 256 in virtual map 130*a*, as illustrated in FIG. 7A. Thus, although stop position 21 was randomly selected by the processor 12, there was less than a 10% chance that stop position 21 would be randomly selected. As a result of this random determination, when the third reel 54*c* stops spinning, stop position 20 (associated with a "Red 7" symbol) is displayed at symbol display area 55*c* and stop position 0 (associated with a "Cherry" symbol) is displayed at symbol display area 55*i*.

After all of the reels stop spinning, the gaming device determines if at least one of the plurality of predetermined winning symbol combinations of overall game paytable 140 is displayed at any of the paylines. Referring to overall paytable 140 in FIG. 9, the symbol combination "Red 7-Red 7-Red 7" is associated with an award of 200 credits on the first payline 52*a*, and the symbol combination "any-any-Cherry" is associated with an award of one credit on the third payline 52*c* and the fourth payline 52*d*. Additionally, as illustrated in multiplier look-up table 142 in FIG. 10, for this combination of stop positions, the processor 12 randomly selects a multiplier from multiplier table Q 190 to apply to the award. In this example, the processor 12 randomly selects a multiplier of three from multiplier table Q 190 (which has a weight of 3185 out of 10,000) and applies the multiplier to the award. Accordingly, the gaming device provides the player with an award of 606 credits, as illustrated in FIG. 18D.

Additional examples of working weight tables and component paytables developed by a gaming device designer for the embodiment discussed above are discussed below. FIG. 19 illustrates a weight table 230 associated with the combination of stop position 1 of the first reel 54*a*, stop position 2 of the second reel 54*b* and stop position 3 of the third reel 54*c* which aids a gaming device designer in developing component paytable 240. Component paytable 240, associated with the combination of stop position 1 of the first reel 54*a*, stop position 2 of the second reel 54*b* and stop position 3 of the third reel 54*c*, is illustrated in FIG. 20.

In this example, the combination of the virtual maps associated with these stop positions provides a relatively high probability of a player receiving an award for a predetermined winning symbol combination associated with a relatively low award. This combination of the stop positions, if selected repeatedly, could appeal to a low volatility player that would rather receive lower awards more frequently than receive higher awards less frequently. Other combinations may provide high volatility and similar combinations may be grouped in close proximity so that players learn that one area of the reel tends to produce frequent, low wins while another area produces rare, high wins.

In this embodiment, the player is required to wager at least five credits on a play of the game (one credit for each of the five paylines). Table 230 in FIG. 19 illustrates the weights used to calculate a probability, based on virtual map 110*b* (associated with stop position 1 of the first reel 54*a*), virtual map 120*c* (associated with stop position 2 of the second reel 54*b*) and virtual map 130*d* (associated with stop position 3 of the third reel 54*c*), of each respective symbol being displayed at various symbol display areas when each of the first reel 54*a*, the second reel 54*b* and the third reel 54*c* stop spinning after the player activates respective stop input devices 30*a*, 30*b* and 30*c*.

For example, as illustrated in FIG. 19, the "Orange" symbol has the highest probability of being randomly selected as the symbol displayed at symbol display area 55*d* (of the first payline), the "Free Shot" symbol has the highest probability of being of being randomly selected as the symbol displayed at symbol display area 55*e* and the "1 Bar" symbol has the highest probability of being of being randomly selected as the symbol displayed at symbol display area 55*f*.

Still referring to FIG. 19, it should be appreciated that certain symbols have no chance of being generated on one or more of the paylines based on this combination of virtual maps. Thus, any symbol combinations including those symbols do not contribute to the average expected payback percentage of component paytable 240 in FIG. 20.

Component paytable 240, associated with the combination of stop position 1 of the first reel 54*a*, stop position 2 of the second reel 54*b* and stop position 3 of the third reel 54*c*, includes the plurality of predetermined winning symbol combinations from overall paytable 140 and the awards associated with those respective predetermined winning symbol combinations.

The predetermined winning symbol combination "xx-xx-Cherry" (in other words, the display of a "Cherry" symbol anywhere on the third reel 54*c*) in paytable 240 is analyzed below for illustrative purposes. The probability of "xx-xx-Cherry" being displayed at the first payline 52*a* is 10.547% ([(19+124+28+85)×(38+35+61+122)×27]/[256×256×256]). The probability of "xx-xx-Cherry" being displayed at the second payline 52*b* is 6.25% ([(98+28+85+19+26)×(35+66+38+61+56)×16]/[256×256×256]). The probability of "xx-xx-Cherry" being displayed at the third payline 52*c* is 60.156% ([(28+104+26+98)×(61+38+56+35+66)×154]/[256×256×256]). The probability of "xx-xx-Cherry" being displayed at the fourth payline 52*d* is 60.156% ([(98+28+85+19+26)×(38+35+61+122)×154]/[256×256×256]). The probability of "xx-xx-Cherry" being displayed at the fifth payline 52*e* is 6.25% ([(98+28+85+19+26)×(35+66+38+61+56)×16]/[256×256×256]). This results in a total probability (for all five paylines) of 143.36% of the combination "xx-xx-Cherry" being displayed at any of the first payline 52*a*, the second payline 52*b*, the third payline 52*c*, the fourth payline 52*d* and the fifth payline 52*e*.

In component paytable 240, the contribution of each respective predetermined winning symbol combination to the average expected payback percentage of component paytable 240 is the probability of the symbol combination being generated at any of the five paylines multiplied by the award associated with the predetermined winning symbol combination. Thus, in component paytable 240, the contribution of the predetermined winning symbol combination "xx-xx-Cherry" is 143.36%.

It should also be appreciated that the above methodology also applies to determining the contribution of each of the other predetermined winning symbol combinations in component paytable 240.

The average expected payback percentage of component paytable 240 is thus 42.153% (the sum of the probability of displaying each respective predetermined winning symbol combination on any of the five paylines multiplied by the award associated with each respective predetermined winning symbol combination, divided by five since there are five paylines).

In this embodiment, 42.153% is not within the designated range of average expected payback percentages for the component paytables of 80% to 95%. Thus, the gaming device designer associates the component paytable 240 with multiplier table S 200, according to table 170. The average multiplier of multiplier table S 200 is 2.1, as indicated in FIG. 16C. Thus, referring to FIG. 20, the adjusted average expected payback percentage of component paytable 240 is 88.522% (average expected payback percentage per credit of 42.153%× average multiplier of 2.1).

FIG. 21 illustrates a weight table 250 associated with the combination of stop position 6 of the first reel 54*a*, stop position 9 of the second reel 54*b* and stop position 7 of the third reel 54*c* which aids a gaming device designer in configuring component paytable 260. Component paytable 260, associated with the combination of stop position 6 of the first reel 54*a*, stop position 9 of the second reel 54*b* and stop position 7 of the third reel 54*c*, is illustrated in FIG. 22.

In this example, the combination of the virtual maps associated with these stop positions provides a relatively low probability of a player receiving an award, but when it does occur it is a relatively high award for a predetermined winning symbol combination including three "Jackpot" symbols. A skilled player seeking a higher volatility gaming experience may try to repeatedly stop the reels such that three Jackpot symbols are displayed at a payline.

In this embodiment, the player is required to wager at least five credits on a play of the game (one credit for each of the five paylines). Table 250 in FIG. 21 illustrates the weights used to calculate a probability, based on virtual map 110*g* (associated with stop position 6 of the first reel 54*a*), virtual map 120*j* (associated with stop position 9 of the second reel 54*b*) and virtual map 130*h* (associated with stop position 7 of the third reel 54*c*), of each respective symbol being displayed at various symbol display areas when each of the first reel 54*a*, the second reel 54*b* and the third reel 54*c* stop spinning after the player activates respective stop input devices 30*a*, 30*b* and 30*c*.

For example, as illustrated in FIG. 21, the "Bonus" symbol has the highest probability of being randomly selected as the symbol displayed at symbol display area 55*d* (of the first payline), the "3 Bar" symbol has the highest probability of being of being randomly selected as the symbol displayed at symbol display area 55*e* and the "Red 7" symbol has the highest probability of being of being randomly selected as the symbol displayed at symbol display area 55*f*.

Component paytable 260, associated with the combination of stop position 6 of the first reel 54*a*, stop position 9 of the second reel 54*b* and stop position 7 of the third reel 54*c*, includes the plurality of predetermined winning symbol combinations from overall paytable 140 and the awards associated with those winning symbol combinations.

The predetermined winning symbol combination "Jackpot-Jackpot-Jackpot" in paytable 260 is analyzed below for illustrative purposes. The probability of "Jackpot-Jackpot-Jackpot" being displayed at the first payline 52*a* is 0.127% ([59×6×60]/[256×256×256]). The probability of "Jackpot-Jackpot-Jackpot" being displayed at the second payline 52*b* is 0.058% ([10×48×35]/[256×256×256]). The probability of "Jackpot-Jackpot-Jackpot" being displayed at the third payline 52*c* is 0.028% ([16×29×10]/[256×256×256]). The probability of "Jackpot-Jackpot-Jackpot" being displayed at the fourth payline 52*d* is 0.004% ([10×6×10]/[256×256×256]). The probability of "Jackpot-Jackpot-Jackpot" being displayed at the fifth payline 52*e* is 0.020% ([16×6×35]/[256×256×256]). This results in a total probability (for all five paylines) of 0.278% of the combination "Jackpot-Jackpot-Jackpot" being displayed at any of the first payline 52*a*, the second payline 52*b*, the third payline 52*c*, the fourth payline 52*d* and the fifth payline 52*e*.

In component paytable 260, the contribution of each respective predetermined winning symbol combination to the average expected payback percentage of component paytable 260 is the probability of the symbol combination being generated at any of the five paylines multiplied by the award associated with the predetermined winning symbol combination. Thus, in component paytable 260, the contribution of the predetermined winning symbol combination "Jackpot-Jackpot-Jackpot" is 278%.

The above methodology also applies to determining the contribution of each of the other predetermined winning symbol combinations in component paytable 260.

The average expected payback percentage of component paytable 260 is 79.722% (the sum of the probability of displaying each respective predetermined winning symbol combination on any of the five paylines multiplied by the award associated with each respective predetermined winning symbol combination, divided by five since there are five paylines).

In this embodiment, 79.722% is not within the designated range of average expected payback percentages for the component paytables of 80% to 95%. Thus, the gaming device designer associates the component paytable 260 with multiplier table D1 220, according to table 170. The average multiplier of multiplier table D1 220 is 1.18, as indicated in FIG. 16E. Thus, referring to FIG. 22, the adjusted average expected payback percentage of component paytable 260 is 94.072% (average expected payback percentage per credit of 79.722%× average multiplier of 1.18).

Figure 23:
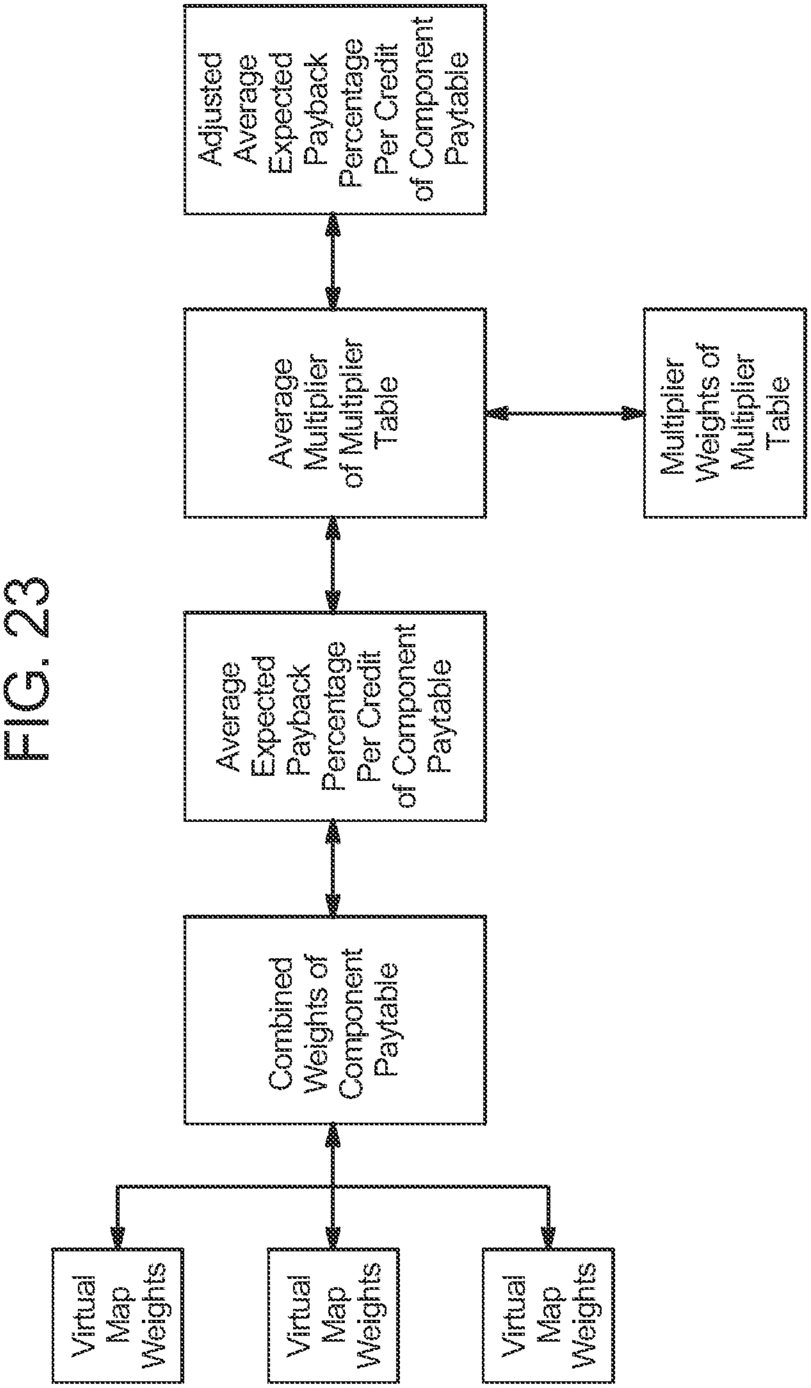
FIG. 23 illustrates a chart showing the relationship for a combination of stop positions, between the virtual maps associated with the stop positions, the combined weights in the component paytable associated with the stop positions, the payback percentage of the component paytable, the average multiplier of a multiplier table associated with the component paytable, the multiplier weights of the multiplier table and the adjusted payback percentage of the component paytable, in accordance with one embodiment of the Pachisuro-style game disclosed herein.

FIG. 23 shows a chart illustrating, in summary, the interrelationship between the virtual map weights, combined weights of a component paytable, average expected payback percentage per credit of the component paytable, average multiplier of any multiplier table associated with the component paytable, multiplier weights of the multiplier table and adjusted average expected payback percentage per credit of the component paytable. A gaming device designer may iteratively adjust various weights to achieve desired adjusted component average expected paytable payback percentages and thus, a desired overall average expected payback percentage for the Pachisuro-style gaming device.

Changing one weight in one virtual map will impact the adjusted average expected payback percentage of any component paytable constructed using the virtual map. More specifically, as illustrated in FIG. 23, change a weight in one virtual map effects the combined weights in the component paytable, which changes the average expected payback percentage of the component paytable (and may even change the multiplier table associated with the component paytable), which after application of the average multiplier from the multiplier table, ultimately changes the adjusted average expected payback percentage of the component paytable.

Likewise, adjusting a multiplier weight in the multiplier table changes the average multiplier of the multiplier table, which changes the adjusted average expected payback percentage of the component paytable (and possibly even the component paytables the gaming device designer associates the multiplier table with).

In various additional embodiments, instead of using multipliers to keep the adjusted payback percentage of component paytables associated with certain combinations of initiating stop positions within the designated range of payback percentages (e.g., 80% to 95%) as discussed above, the gaming device employs a designated quantity of bonus pools to keep the adjusted payback percentage of component paytables associated with certain combinations of initiating stop positions within the designated range of payback percentages (e.g., 80% to 95%) as discussed in more detail below.

For each play of the game, if the player selects a designated combination of initiating stop positions by activating the stop input devices associated with the respective reels, the gaming device adds a designated percentage of the player's wager on the play of the game to the appropriate bonus pools.

The reels of the game include a plurality of bonus symbols. For each play of the game, if the gaming device displays any designated combination of the bonus symbols when the reels stop spinning, the gaming device determines at least one of the bonus pools from which to provide credits to the player and provides the player with some or all of the credits from the determined bonus pool. It should be appreciated that in various embodiments, the designated combination of bonus symbols may include any suitable combination of bonus symbols (e.g., three bonus symbols on a payline).

Figure 24:
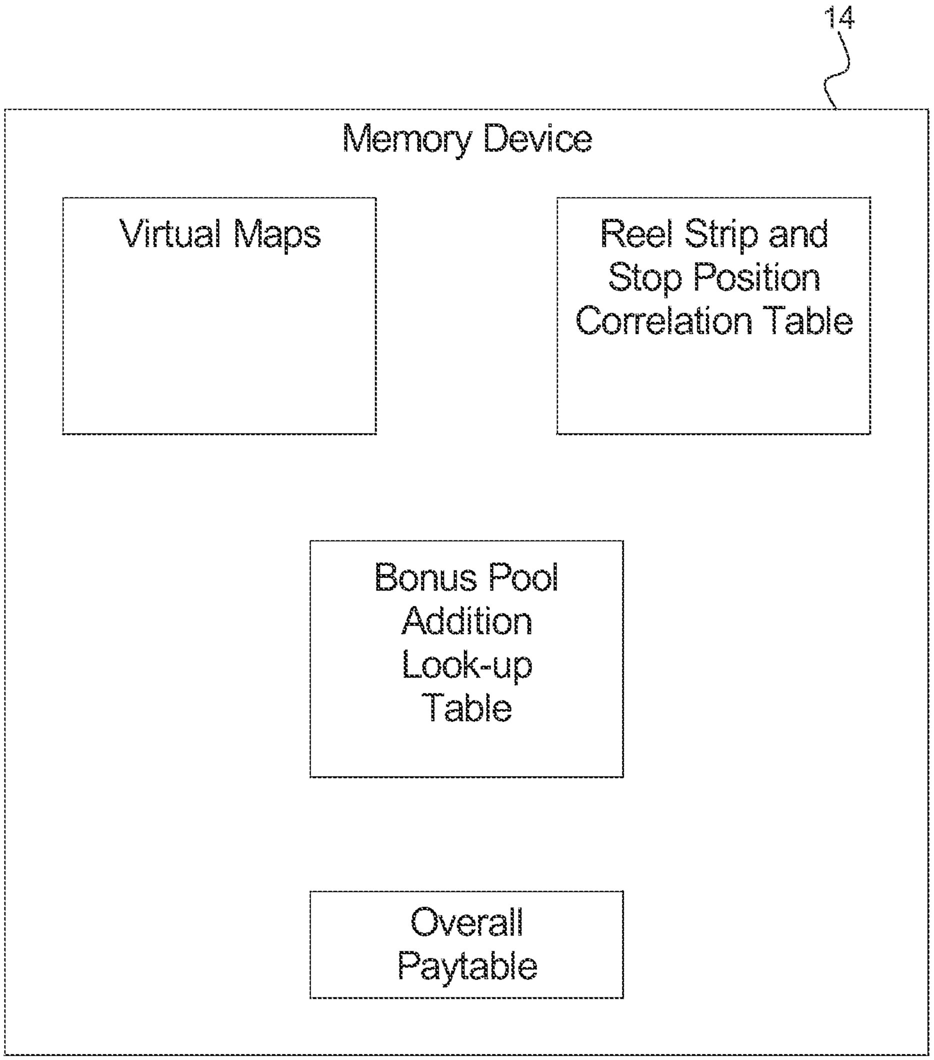
FIG. 24 illustrates certain information stored in the memory device of the gaming device used for a play of one embodiment of the Pachisuro-style game disclosed herein.

In one embodiment, the gaming device uses a bonus pool addition look-up table stored in a memory device, as generally illustrated in FIG. 24, to determine the percentage of the player's wager on a play of the game to add to the appropriate bonus pools if the player selects a designated combination of initiating stop positions for that play of the game by activating the stop input devices associated with the respective reels.

The bonus pool addition look-up table includes: (a) one or more combinations of initiating stop positions, and (b) a designated percentage per credit wagered associated with each respective combination of initiating stop positions. In this embodiment, the bonus pool addition look-up table is configured such that for each combination of initiating stop positions in the bonus pool addition look-up table, the sum of: (i) the average payback percentage of the component paytable associated with the combination of initiating stop positions, and (ii) the designated percentage per credit wagered associated with the combination of initiating stop positions equals a percentage within the designated range of payback percentages (e.g., 80% to 95%). The designated percentage per credit wagered associated with each respective combination of initiating stop positions in the bonus pool addition look-up table takes account for the amount by which the average payback percentage of the component paytable associated with the combination of initiating stop positions is below the designated range of payback percentages.

For example, referring to FIG. 25A, the payback percentage of the component paytable associated with the initiating stop position combination “0-0-0” is 15% and the designated percentage per credit wagered which is added to the designated quantity of bonus pools is 80%, bringing the adjusted payback percentage of the component paytable to 95%. The payback percentage of the component paytable associated with the initiating stop position combination “0-0-1” is 50% and the designated percentage per credit wagered which is added to the designated quantity of bonus pools is 40%, bringing the adjusted payback percentage of the component paytable to 90%. The payback percentage of the component paytable associated with the initiating stop position combination “13-8-20” is 80% and the designated percentage per credit wagered which is added to the designated quantity of bonus pools is 13%, bringing the adjusted payback percentage of the component paytable to 93%. The payback percentage of the component paytable associated with the initiating stop position combination “21-21-21” is 30% and the designated percentage per credit wagered which is added to the designated quantity of bonus pools is 64%, bringing the adjusted payback percentage of the component paytable to 94%.

In the specific example embodiment of the gaming device employing a plurality of bonus pools discussed below, the gaming device determines how much of the designated percentage of the player's wager on the play of the game to add to each of the plurality of bonus pools based on a predetermined percentage allocation (e.g., 15% to a first bonus pool, 35% to a second bonus pool and 50% to a third bonus pool).

FIG. 25B includes an illustrative table having the same initiating stop position combinations and respective designated percentages per credit wagered for each of the combinations of initiating stop positions, but illustratively breaks down the percentage per credit wagered added to each of Bonus Pool A, Bonus Pool B and Bonus Pool C (according to the illustrative allocation 15% of the designated percentage per credit wagered to Bonus Pool A, 35% of the designated percentage per credit wagered to Bonus Pool B and 50% of the designated percentage per credit wagered to Bonus Pool C). For example, the designated percentage per credit wagered for initiating stop position combination “0-0-0” which is added to Bonus Pool A, Bonus Pool B and Bonus Pool C is 80% (12% per credit wagered to Bonus Pool A, 28% per credit wagered to Bonus Pool B and 40% per credit wagered to Bonus Pool C). The designated percentage per credit wagered for initiating stop position combination “0-0-1” which is added to Bonus Pool A, Bonus Pool B and Bonus Pool C is 40% (6% per credit wagered to Bonus Pool A, 14% per credit wagered to Bonus Pool B and 20% per credit wagered to Bonus Pool C). The designated percentage per credit wagered for initiating stop position combination “13-8-20” which is added to Bonus Pool A, Bonus Pool B and Bonus Pool C is 13% (1.95% per credit wagered to Bonus Pool A, 4.55% per credit wagered to Bonus Pool B and 6.5% per credit wagered to Bonus Pool C). The designated percentage per credit wagered for initiating stop position combination “21-21-21” which is added to Bonus Pool A, Bonus Pool B and Bonus Pool C is 64% (9.6% per credit wagered to Bonus Pool A, 22.4% per credit wagered to Bonus Pool B and 32% per credit wagered to Bonus Pool C). It should be appreciated that these percentage allocations are for illustrative purposes and in various embodiments, may be any suitable percentages.

The bonus symbols are positioned on the reels of the game such that for each spin of each reel, there is a probability greater than 0% and less than 100% that the gaming device will display a bonus symbol when the reel stops spinning no matter what initiating stop position the player selects for the reel (e.g., at least one bonus symbol within each increment of five stop positions on the reel strip for each reel, as illustrated in the reel strip and stop position correlation table 410 in FIG. 26). It should be appreciated that in various other embodiments, the reels may include any suitable number of bonus symbols (e.g., "BONUS" symbols). It should be further appreciated that in various embodiments, the bonus symbols may be any suitable symbols. It should also be appreciated that in various embodiments, the designated combination of bonus symbols may include the same bonus symbol or different bonus symbols.

FIGS. 27A to 27E illustrate an example play of the game for an embodiment wherein the designated quantity of bonus pools is three. In this embodiment, the bonus pools include: bonus pool A, bonus pool B and bonus pool C. In this embodiment, the credits in the bonus pool A meter 412, bonus pool B meter 414 and bonus pool C meter 416 accumulate over multiple plays of the game by multiple players until a player receives the credits in the respective bonus meter. In other words, the credit accumulation in the bonus pools is a persistent game feature. Accordingly, when a player approaches the gaming device the bonus pools may already have credits in them. It should be appreciated that in various other embodiments, the bonus pools may be specific to the player, resetting when a new player plays the game. It should be further appreciated that in various other embodiments, when a player changes their wager, the bonus pools are reset.

Figure 27A:
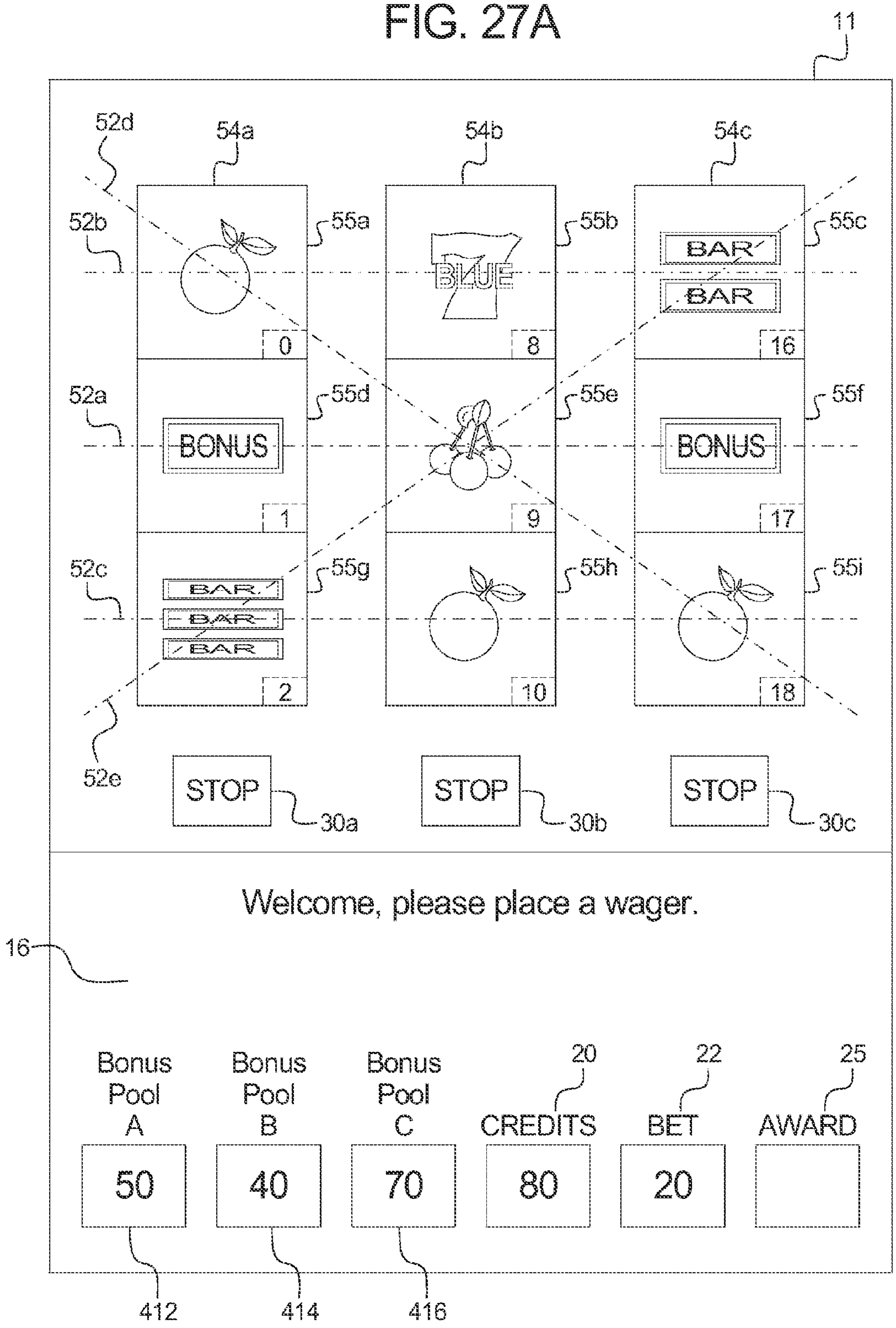
FIGS. 27A, 27B, 27C, 27D, 27E and 27F include front views of a gaming device enabling a play of one embodiment of the Pachisuro-style game disclosed herein.

The gaming device requests that the player make a wager, as illustrated in FIG. 27A. The player places a wager of twenty credits as illustrated in bet display 22.

Figure 27B:
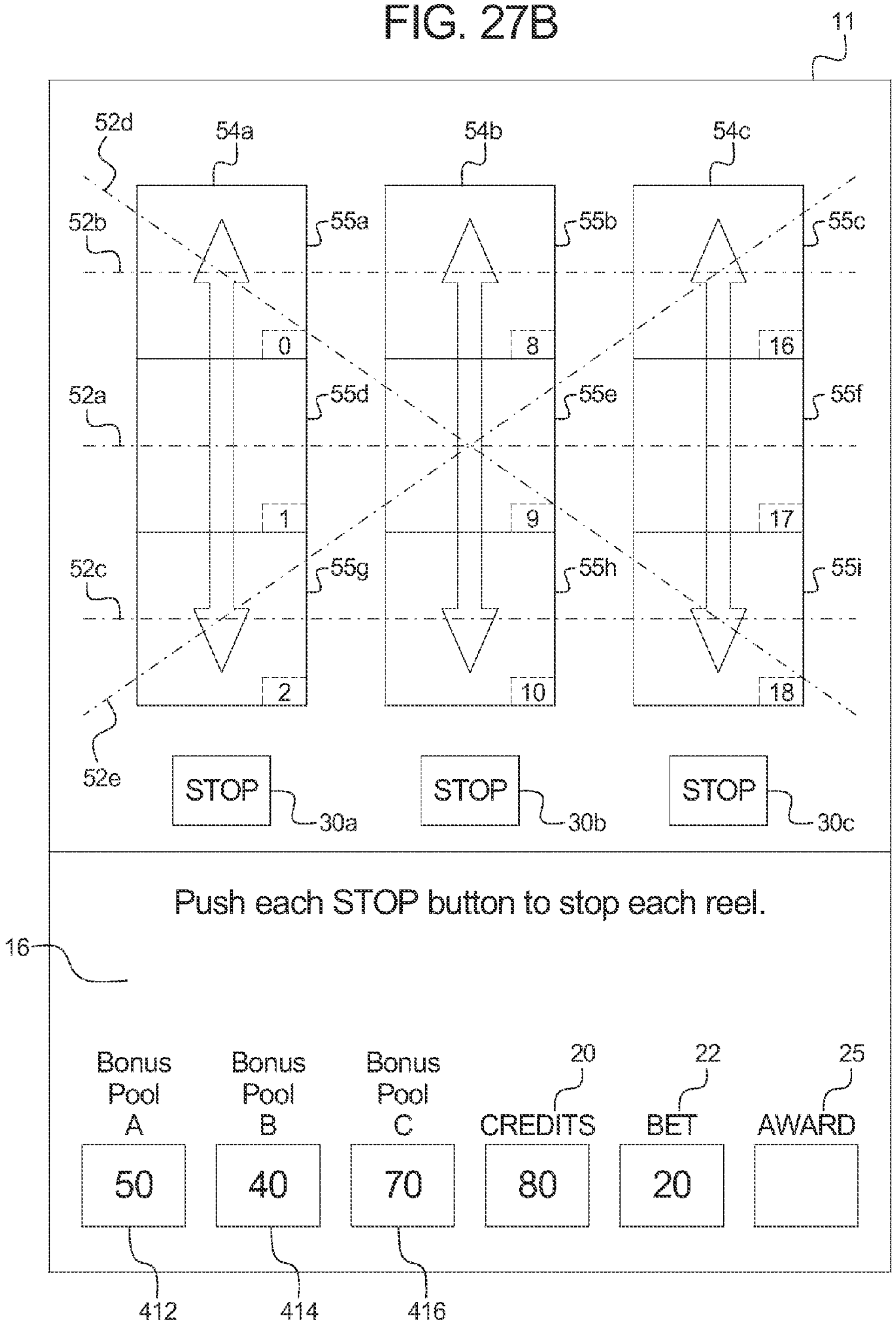

In this embodiment, after the player inputs the wager, each of the first reel 54*a*, the second reel 54*b* and the third reel 54*c* begin spinning as illustrated in FIG. 27B. The gaming device then instructs the player to stop the reels by activating the respective stop input device associated with each reel.

Figure 27C:
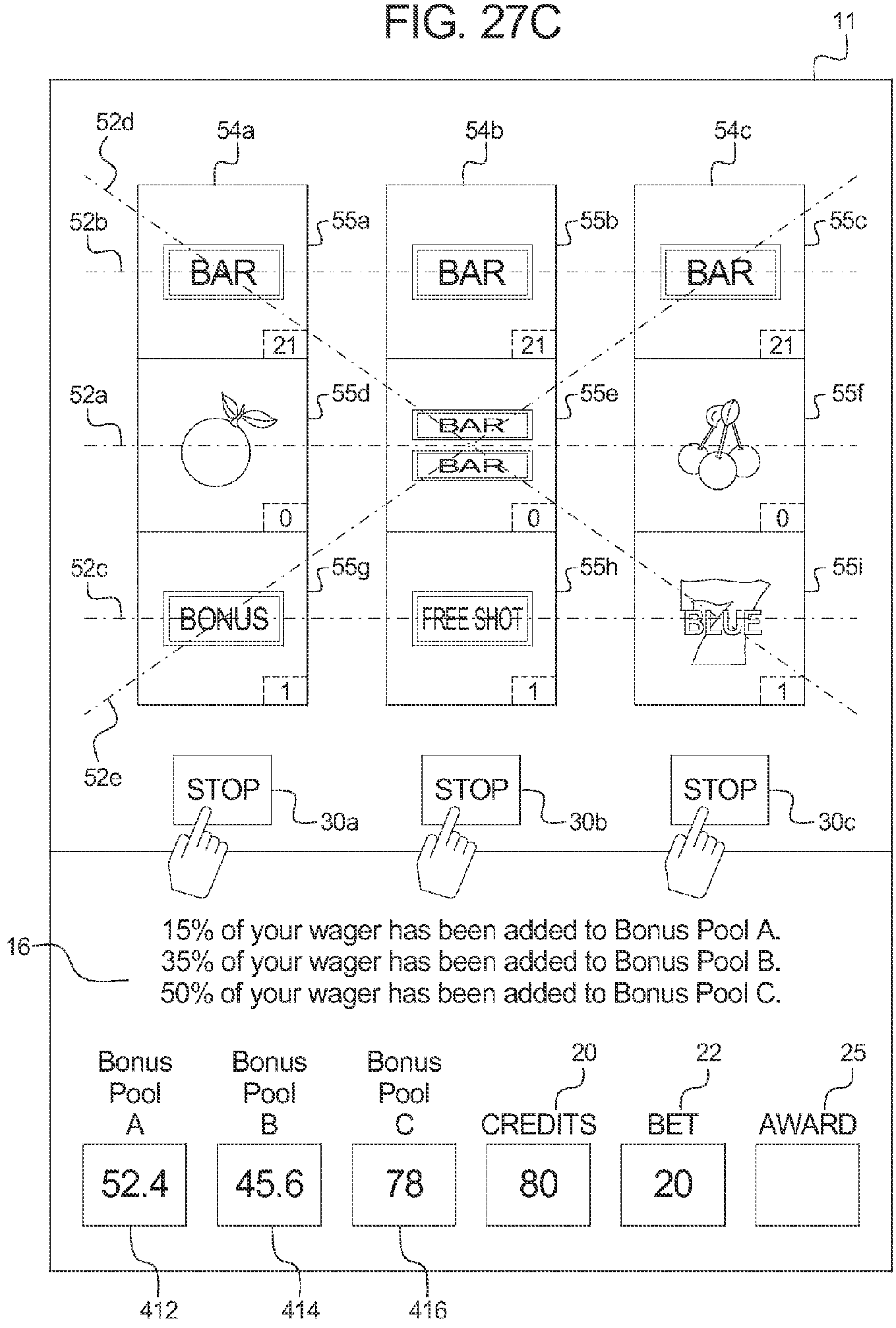

Referring to FIG. 27C, the player activates stop input device 30*a* when stop position 0 of the first reel 54*a* is displayed at symbol display area 55*d*, activates stop input device 30*b* when stop position 0 of the second reel 54*b* is displayed at symbol display area 55*e* and activates stop input device 30*c* when stop position 0 of the third reel 54*c* is displayed at symbol display area 55*f*. It should be appreciated that the stop position indications in the lower right corner of each of the symbol display areas are for illustrative purposes and are not actually visible to a player.

After the player selects each of the initiating stop positions, the processor determines if the combination of initiating stop positions is in the bonus pool addition look-up table. The combination of stop position 0 of the first reel 54*a*, stop position 0 of the second reel 54*b* and stop position 0 of the third reel 54*c* is associated with an addition of 80% of the players wager to Bonus Pool A, Bonus Pool B and Bonus Pool C, as illustrated in FIG. 25B. The gaming device then determines that 80% of the players wager of 20 credits is 16 credits. It should be appreciated that the processor determines whether the combination of initiating stop positions is in the bonus pool addition look-up table and adds any credits to the bonus pools if appropriate regardless of whether the ultimate combination of displayed stop positions includes a winning symbol combination. In other words, credits may be added to the bonus pools even if the player does not win an award for a respective play of the game. On the other hand, credits may also be added to the bonus pools if the player wins an award in the game (because the determination of whether credits are added to the bonus pools is based on the initiating stop positions selected rather than being dependent on when each of the reels stop spinning).

Accordingly, the gaming device adds 15% of the 16 credits (2.4 credits) to Bonus Pool A, 35% of the 16 credits (5.6 credits) to Bonus Pool B and 50% of the 16 credits (8 credits) to Bonus Pool C, as illustrated at display 16 and the Bonus Pool A meter 412, Bonus Pool B meter 414 and Bonus Pool C meter 416 in FIG. 27C. It should be appreciated that although in the example illustrated in FIG. 27C, the gaming device calculates and adds fractions of credits to the bonus pools, in various other embodiments, the gaming device does not add fractions of credits to bonus pools (e.g., the gaming device rounds up credit amounts, rounds down credit amounts or configures the math of the game such that no fractions result from a calculation of bonus pool percentage allocations). It should be appreciated that in various embodiments in which the gaming device allows fractions to be placed in the bonus pools, the fractions of credits could extend to any suitable number of decimal places. It should be further appreciated that in various embodiments in which the gaming device allows fractions to be placed in the bonus pools, if a player's determined award includes a fraction of a credit, the player may only receive the next lowest whole number of credits, with the remaining fraction of a credit remaining in the bonus pool. For example, if the player is to receive the contents of Bonus Pool A and Bonus Pool A includes 40.5 credits, the gaming device would provide the player 40 credits and instead of resetting to zero credits, 0.5 credits would remain in Bonus Pool A at the beginning of the next play of the game. It should be appreciated that although in the example illustrated in FIGS. 27A to 27F the bonus pools include fractions of credits, fractions of credits may not be displayed to the player in the bonus pools or provided to the player, as explained above.

Figure 27D:
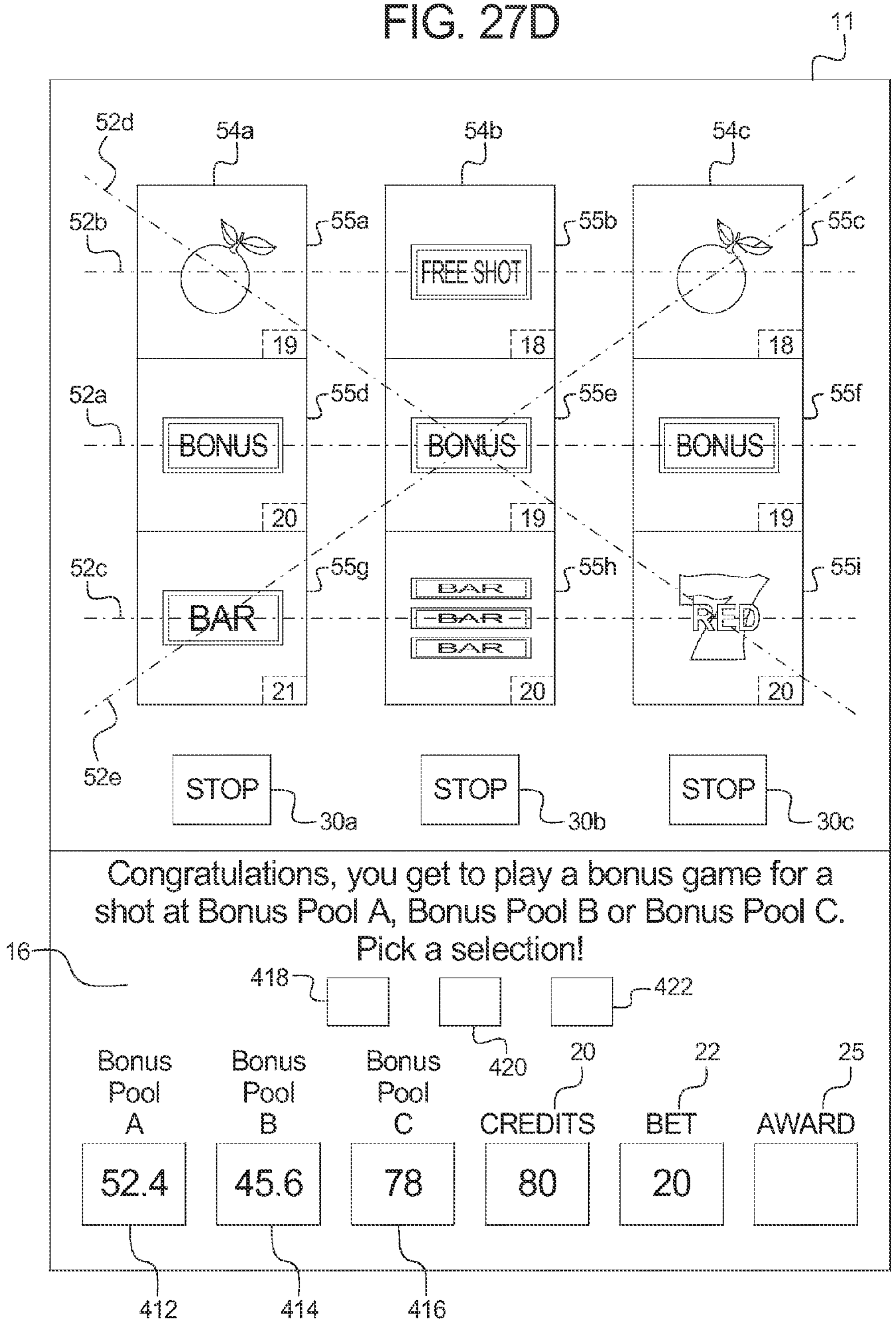

The processor uses the virtual map associated with stop position 0 of the first reel 54*a*, as discussed above, to randomly determine which of the stop positions following stop position 0 at which to stop the first reel 54*a*. In this example, the processor 12 randomly selects stop position 20 and thus, the processor 12 causes first reel 54*a* to stop spinning such that stop position 20 (associated with a "Bonus" symbol) is displayed at symbol display area 55*d*, as illustrated in FIG. 27D. As a result of this random determination, when the first reel 54*a* stops spinning, stop position 19 (associated with a "Orange" symbol) is displayed at symbol display area 55*a* and stop position 21 (associated with an "1 Bar" symbol) is displayed at symbol display area 55*g*.

The processor uses the virtual map associated with stop position 0 of the second reel 54*b*, as discussed above, to randomly determine which of the stop positions following stop position 0 at which to stop the second reel 54*b*. In this example, the processor 12 randomly selects stop position 19 and thus, the gaming device stops spinning the second reel 54*b* such that stop position 19 (associated with an "Bonus" symbol) is displayed at symbol display area 55*e*, as illustrated in FIG. 27D. As a result of this random determination, when the second reel 54*b* stops spinning, stop position 18

(associated with a "Free Shot" symbol) is displayed at symbol display area 55*b* and stop position 20 (associated with a "3 Bar" symbol) is displayed at symbol display area 55*h*.

The processor uses the virtual map associated with stop position 0 of the third reel 54*c*, as discussed above, to randomly determine which of the stop positions following stop position 0 at which to stop the third reel 54*c*. In this example, the processor 12 randomly selects stop position 19 and thus, the processor 12 causes the third reel 54*c* to stop spinning such that stop position 19 (associated with a "Bonus" symbol) is displayed at symbol display area 55*f*, as illustrated in FIG. 27D. As a result of this random determination, when the third reel 54*c* stops spinning, stop position 18 (associated with an "Orange" symbol) is displayed at symbol display area 55*c* and stop position 0 (associated with a "Red 7" symbol) is displayed at symbol display area 55*i*.

After all of the reels stop spinning, the gaming device determines if at least one of the plurality of predetermined winning symbol combinations of the overall game paytable is displayed at any of the paylines. In this embodiment, the symbol combination "Bonus-Bonus-Bonus" causes the gaming device to enable the player to play a bonus selection game in which the player may receive the credits of one of Bonus Pool A, Bonus Pool B and Bonus Pool C. It should be appreciated that in this embodiment, the symbol combination "Bonus-Bonus-Bonus" (or other suitable symbol combination which causes the gaming device to provide the player some or all of the credits of at least one of the bonus pools) and its association with the bonus selection game is part of the overall paytable of the game.

Figure 27E:
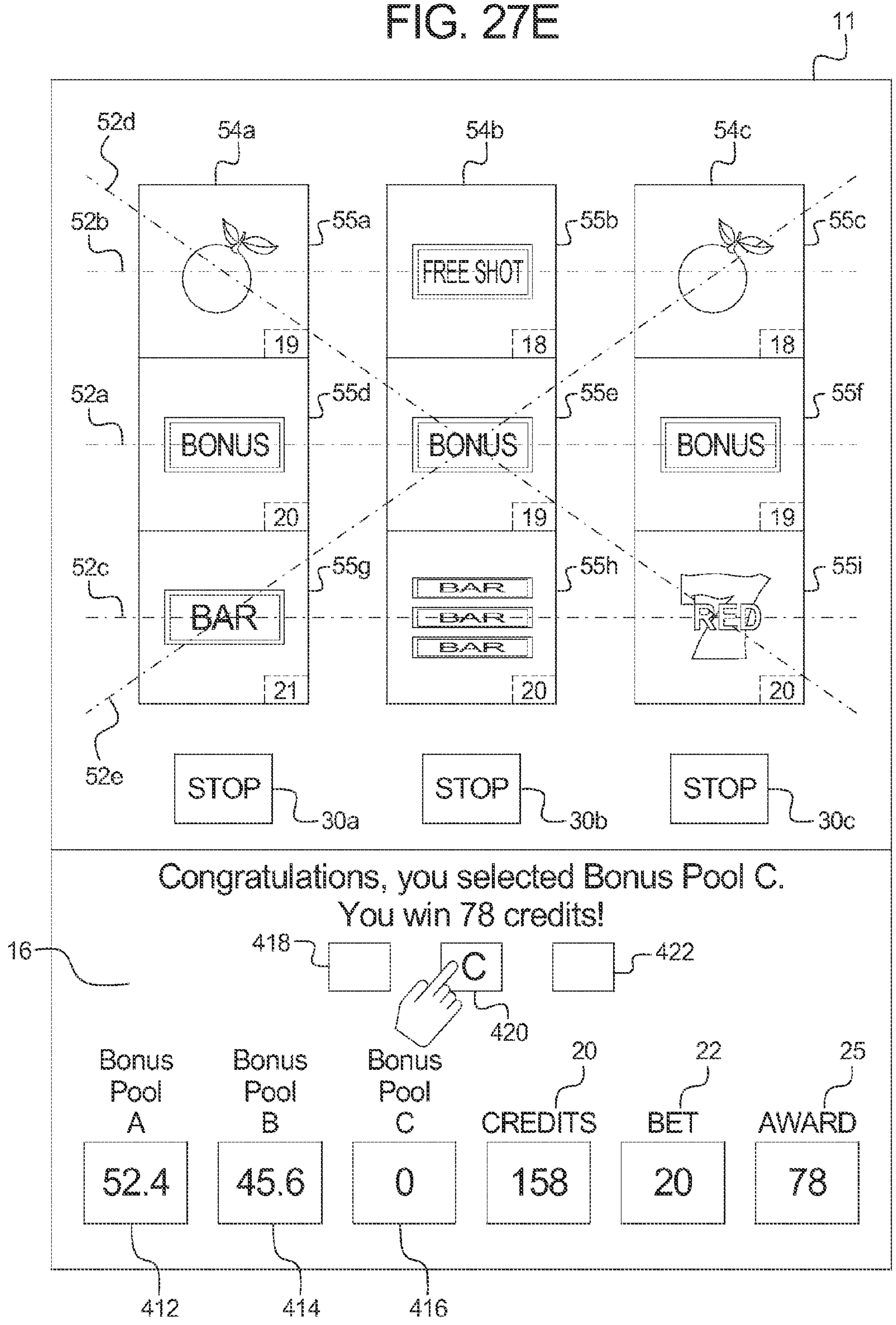

The gaming device randomly associates each of selections 418, 420 and 422 illustrated in FIG. 27D with a respective one of Bonus Pool A, Bonus Pool B and Bonus Pool C, such that the player cannot tell what bonus pool is associated with each selection. The gaming device instructs the player to select one of selections 418, 420 and 422. The player selects selection 420, which is associated with Bonus Pool C, as illustrated in FIG. 27E. Accordingly, the gaming device provides the player with the 78 credits from Bonus Pool C and Bonus Pool C resets to 0 credits, as also illustrated in FIG. 27E.

It should be appreciated that although in this embodiment, the designated quantity of bonus pools is three, in various other embodiments, the game may be associated with any suitable number of bonus pools.

It should also be appreciated that although in this embodiment, the bonus selection game includes three selections, in various other embodiments, the bonus selection game may include any suitable number of selections. It should also be appreciated that although in this embodiment, each selection in the bonus selection game is associated with a bonus pool, in various other embodiment, not all of the selections in the bonus selection game are associated with a bonus pool.

Figure 27F:
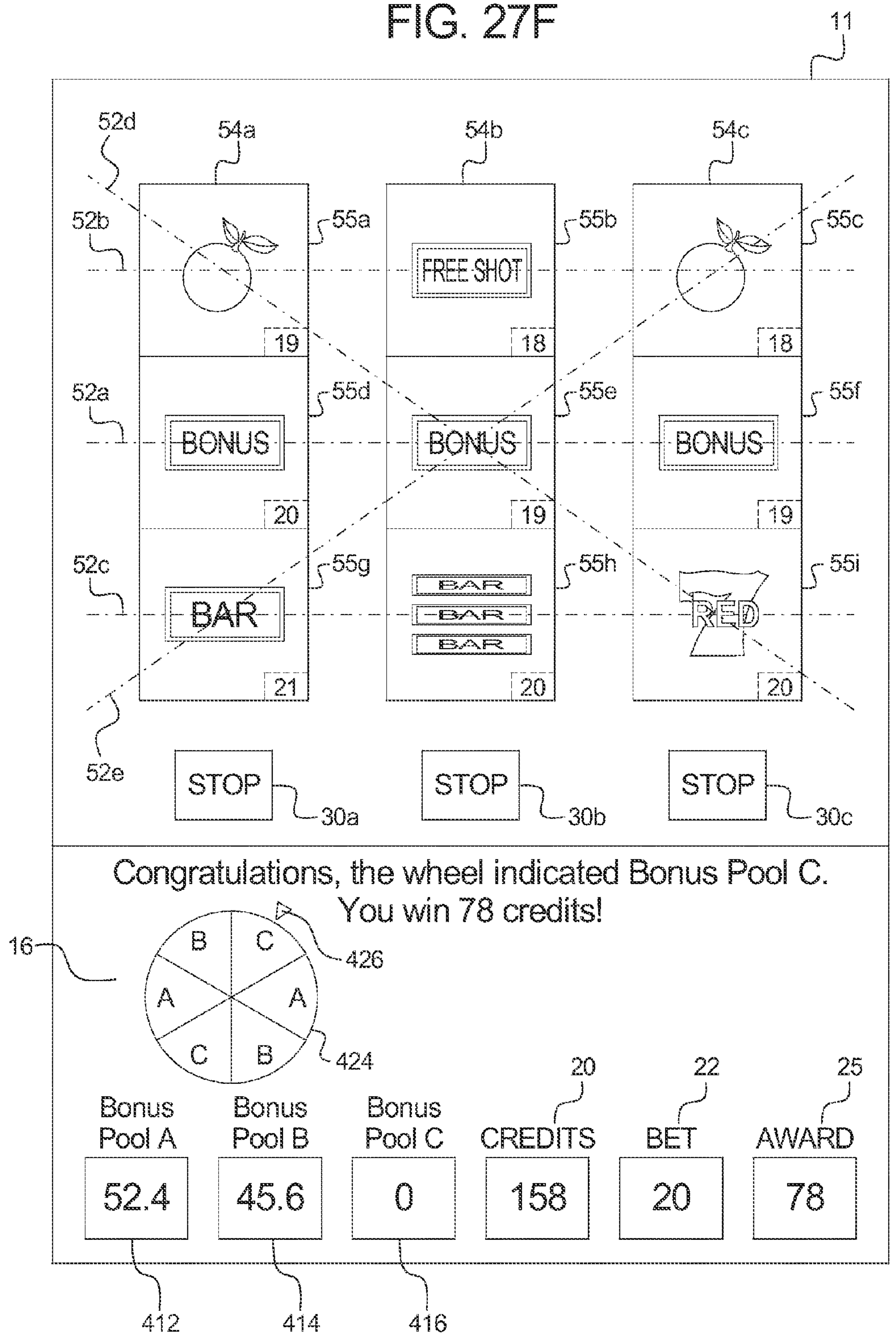

It should also be appreciated that although in this embodiment the player selects a selection to select a bonus pool, in various other embodiments, the bonus pool to provide to the player may be determined in any suitable manner. For example, in various embodiments, the gaming device randomly determines a bonus pool from which to provide credits to the player by causing the spinning of a displayed or mechanical wheel, as illustrated in the alternative game ending in FIG. 27F. In the example illustrated in FIG. 27, the gaming device automatically displays the spinning of the wheel 424 including portions associated with each of Bonus Pool A, Bonus Pool B and Bonus Pool C. When the wheel 424 stops spinning, the gaming device provides the player with the credits in the bonus pool indicated by indicator 426. When the wheel 424 stops spinning, the indicator 426 is indicating a portion of the wheel 424 associated with Bonus Pool C. Accordingly, the gaming device provides the player with the 78 credits from Bonus Pool C and Bonus Pool C resets to 0 credits, as also illustrated in FIG. 27F.

In various other such embodiments instead of automatically spinning the wheel 424, the gaming device enables the player to initiate the spin of the wheel 424. It should be appreciated that in various other embodiments, a wheel may be used to determine a portion of the credits in one or more of the bonus pools.

It should be appreciated that in various embodiments, instead of the memory device storing a bonus pool addition look-up table, the memory device stores a predetermined algorithm and the gaming device calculates a designated percentage associated with each respective combination of initiating stop positions in real time using the predetermined algorithm. For example, in one such embodiment, if the player selects a designated combination of initiating stop positions, the gaming device processor executes an algorithm which determines a designated percentage per credit wagered to add to the bonus pools.

It should be appreciated that in various embodiments, the gaming device instead of using a designated combination of bonus symbols as a triggering event, the gaming device determines at least one of the bonus pools from which to provide credits to the player and provides the player with some or all of the credits from the determined bonus pool upon an occurrence of a mystery trigger.

In one embodiment, the mystery trigger occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes the mystery trigger to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In another embodiment of the gaming system disclosed herein, the mystery trigger occurs based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes the mystery trigger to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In another embodiment of the gaming system disclosed herein, the mystery trigger occurs based on a predefined variable reaching a defined parameter threshold. For example, when the 500,000$^{th}$ player has played a gaming machine of the gaming system (ascertained from a player tracking system), the mystery trigger occurs. In different embodiments, the predefined parameter thresholds include a length of time, a length of time after a certain dollar amount is hit, a wager level threshold for a specific gaming device (which gaming device is the first to contribute $250,000), a number of gaming devices active, or any other parameter that defines a suitable threshold.

In another embodiment of the gaming system disclosed herein, a the mystery trigger occurs based on time. In this embodiment, a time is set for when the mystery trigger will occur. In one embodiment, such a set time is based on historic data.

In another embodiment of the gaming system disclosed herein, the mystery trigger occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming device. The central server/gaming device processor determines the player tracking level of the player and if the current player tracking level defined by the gaming system operator is eligible for the mystery trigger. In one embodiment, the gaming system operator defines minimum bet levels required for the mystery trigger to occur based on the player's card level.

In another embodiment of the gaming system disclosed herein, a the mystery trigger occurs based on a system determination, including one or more random selections by the central controller. In one embodiment, as described above, the central controller tracks all active gaming machines and the wagers they placed. Each gaming machine has its own entry defining its state as either active or inactive and also defining the values of the wagers from that gaming machine. In one embodiment, active status means that the gaming device is being actively played by a player and enrolled/inactive status means that the gaming device is not being actively played by a player. The active status requirements can be based on any suitable number of satisfied criteria or defined in any suitable manner by the implementer of the gaming system. In one such embodiment, based on the gaming device's state as well as one or more wager pools associated with the gaming device, the central controller determines whether the mystery trigger will occur. In one such embodiment, the player who consistently places a higher wager is more likely to be associated with an occurrence of the bonus sequence triggering event than a player who consistently places a minimum wager. It should be appreciated that the criteria for determining whether a player is in active status or inactive status for determining if the mystery trigger will occur may be the same as, substantially the same as, or different than the criteria for determining whether a player is in active status or inactive status for another mystery trigger to occur.

In another embodiment of the gaming system disclosed herein, the mystery trigger occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, the mystery trigger will occur. It should be appreciated that any suitable manner of causing the mystery trigger to be provided may be implemented in accordance with the gaming system and method disclosed herein.

In another embodiment, the mystery trigger occurs independent of any displayed event in any play of any game of any of the gaming devices in the gaming system. That is, the mystery trigger is based on a trigger that is unknown to the player. In another embodiment, the gaming system tracks the occurrences of one or more suitable events occurring at or in association with one or more players and/or one or more gaming devices in the gaming system and determines, based on these tracked events, whether the mystery trigger has occurred. In another embodiment, the gaming system defines one or more game play parameters, wherein each time a player's tracked game play activity satisfies the defined parameter, the mystery trigger occurs.

In various other embodiments, each of the reels is associated with one of a plurality of bonus pools. In one such embodiment, a player receives some or all of the credits of a bonus pool associated with a respective reel after a bonus symbol has been generated at that respective reel a designated number of times. For example, in one embodiment, the first reel 54*a* is associated with Bonus Pool A, the second reel 54*b* is associated with Bonus Pool B and the third reel 54*c* is associated with Bonus Pool C. If a "Bonus" symbol is generated on any of the specific reels five times (or any other suitable number of times), the player receives the credits of the Bonus Pool associated with the reel. In this example, each reel has its own "count." For example, if the "Bonus" symbol is generated at the first reel five times, the player receives the credits in Bonus Pool A and the count associated with the first reel 54*a* resets to zero. However, the second reel 54*b* may have had the "Bonus" symbol generated 4 times. Accordingly, the player could receive the credits in Bonus Pool B after the next spin if the "Bonus" symbol is generated at the second reel 54*b*.

It should be appreciated that in various other embodiments, each of a plurality of bonus pools is associated with a designated bonus symbol. For example, Bonus Pool A is associated with bonus symbol "Bonus A," Bonus Pool B is associated with bonus symbol "Bonus B" and Bonus Pool C is associated with bonus symbol "Bonus C." In various such embodiments, if a designated combination of a respective set of bonus symbols is generated at the reels (e.g., three "Bonus A" symbols on a payline), the player receives the credits in that respective bonus pool.

It should be further appreciated that in various other embodiments, each of the plurality of bonus pools is associated with a different payline. In one such embodiment, if a plurality of bonus symbols are generated at a payline associated with a certain bonus pool, the gaming device provides the player with some or all of the credits in the bonus pool associated with that payline.

It should also be appreciated that in various embodiments, each of the plurality of bonus pools is associated with a different "way to win" (discussed above). In one such embodiment, if the player wins a certain "way," the gaming device provides the player with some or all of the credits in the bonus pool associated with that "way to win."

In the above embodiments, there is no need for the above-discussed multiplier tables. Instead of the multipliers ensuring the adjusted average payback percentage of certain component paytables is within a designated range of payback percentages (e.g., 80% to 95%), the disclosed bonus pools fulfill the same objective, as explained above.

It should be appreciated that in various other embodiments, the evaluation of the symbols for predetermined winning symbol combinations may be a multi-way evaluation, as discussed in detail above. It should be appreciated that in various such embodiments, to construct an overall paytable for the game, suitable component paytables, as discussed above, based on a multi-way symbol evaluation (as described above) as opposed to a payline-based evaluation would be constructed by the game designer.

It should be appreciated that in various embodiments, the game may include one or more wild or other suitable functional symbols that improve the player's chance at receiving an award. It should be appreciated that in such embodiments, the component paytables constructed by the gaming device designer take such symbols into account.

It should be appreciated that in various other embodiments, the game may utilize symbol stacking. Symbol stacking is implemented by forming stacks of one or more identical symbols in adjacent symbol positions of a reel strip utilized by a single reel. The identical symbols on the same single reel are adjacent to each other, and thus "stacked." For example, in a slot game with three rows of symbols, three cherry symbols may appear adjacent to each other on a reel to form a stack of three cherry symbols. When a gaming device generates stacks of symbols that are identical on three or more adjacent reels, multiple winning symbol combinations can be formed and the gaming machine can provide large payouts to the player if portions of one or more stacks of symbols are displayed.

It should be appreciate the various other embodiments of the game incorporate a cascading symbol feature. In one such embodiment, the gaming device stops the plurality of reels after the stop input devices are activated. Then, the gaming device evaluates the displayed symbols and provides an award for each winning symbol combination formed. The gaming device (in a video reel embodiment) then removes the displayed symbols that form the winning symbol combination(s) to create one or more empty symbol positions. The gaming machine shifts zero, one, or more of the remaining displayed symbols downward into zero, one, or more of the empty symbol positions and generates and displays a symbol for each remaining empty symbol position. The gaming machine re-evaluates the displayed symbols, provides an award for any displayed winning symbol combinations and repeats the steps of removing symbols, shifting symbols, generating new symbols, and evaluating symbol combinations until no winning symbol combination is displayed.

In various embodiments, if the player does not activate any of the stop input devices within a predetermined amount of time, the processor will randomly select a stop position for each of the reels. In various such embodiments, each stop position of each reel is associated with a weight and the processor randomly selects a stop position for each reel, subject to the weight associated with each stop position.

In other such embodiments, the processor may immediately cause all the reels to stop spinning if the player does not activate any stop input devices within a designated amount of time. In such embodiments, the reel spin speed may be randomized such that the position of one reel relative to another varies as the reels spin.

In various embodiments in which a plurality of reels in the Pachisuro-style game stop if a player has not activated a respective stop input device within a predetermined amount of time, each of the reels may stop after a different predetermined amount of time.

In another embodiment, for one or more of the reels, if the player has not selected the stop input device associated with a reel after a predetermined amount of time, the processor uses the virtual map of the stop position displayed at the time of the time-out to randomly select one of the following stop positions. In various embodiments, a random factor is added to the predetermined amount of time or to reel spin speed.

It should be appreciated that in various embodiments, the processor randomly selects a stop position for one or more, but not all, of the plurality of reels independent of any player action and the player causes the stopping of one or more, but not all, of the plurality of reels based on the initiating stop position for the reel selected by the player's activation of the stop input device. For example, in an embodiment including three reels, the gaming device randomly determines respective stop positions for the first two reels, as in traditional slot machines. After the first two reels have stopped spinning, the player causes the selection of an initiating stop position and ultimate stopping of the third reel by activating the stop input device associated with the third reel. This creates an additional element of player strategy, in that the player may attempt to stop the third reel to achieve certain predetermined winning symbol combinations based on the symbols randomly determined and already displayed at the first and second reels.

In another such embodiment, the processor randomly selects one of the predetermined combinations of stop positions (10,648 in the above detailed exampled). This stopping method may be similar or identical to existing slot machines.

In various other embodiments, the gaming device enables a player to buy a skill advantage for one or more plays of the game for a designated amount of credits. In various embodiments, the skill advantage includes at least one of: (a) illuminating or emphasizing one or more symbols, reels or input devices to indicate when the player should stop one or more reels; (b) spinning one or more of the reels slower than during normal game play; (c) spinning one or more of the reels at a constant rate; and (d) audio tones that correlate to the best time to stop a reel. These skill advantages provide the player a better opportunity to obtain higher awards. For example, if the player has identified an ideal combination of initiating stop positions, slowing down the reels enables the player to better control the timing of the activation of the stop input devices relative to the symbols displayed.

In various other embodiments, the skill advantage is triggered by a game outcome or event and is effective for a predetermined number of games or until the player wins or loses a predetermined number of games.

In various embodiments, certain combinations of initiating stop positions provide the player with a higher probability of receiving relatively higher awards than other combinations of initiating stop positions.

In various such embodiments, the gaming device may assist the player in selecting such an optimal combination of initiating stop positions by automatically providing the player with a hint (e.g., by backlighting the stop position or otherwise) regarding when to select the initiating stop position for at least one of the reels in order to optimize their award.

In various embodiments, the gaming device may dynamically provide one or more hints, meaning for each reel for which the gaming device provides a hint, the gaming device provides the hint based on the displayed stop positions of any reels which have already stopped spinning.

In one such embodiment, the gaming system does not provide the player with any hint when the first reel is spinning. In one example, the player activates the stop input device associated with the first reel 54*a* and the first reel stops spinning. Based on the symbols displayed when the first reel stops spinning, the gaming device provides the player with a hint regarding the optimal stop position to have displayed at the center symbol display area of the second reel 54*b* when the player selects the stop input device 30*b*. In other words, the gaming device indicates to the player when to activate the stop input device associated with the second reel 54*b* in order to maximize their probability of receiving the highest possible award. After the second reel stops spinning, the gaming device determines the highest possible award the player could receive (based on the stop positions displayed by the first reel 54*a* and the second reel 54*c*) and provides the player with a hint regarding the optimal point at which to stop the third reel 54*b*.

It should be appreciated that in various embodiments, the hint may be provided to the player in any other suitable manner (e.g., emphasizing the border of one or more symbol display areas, indicating one or more symbols by text on display 16 or audibly).

It should be appreciated that although in the foregoing embodiment, the gaming device does not provide a hint regarding an optimal point at which to activate the stop input device associated with the first reel 54*a*, in various other such embodiments, the gaming device does provide a hint for the first reel (e.g., for stopping the first reel such that it is most likely that a bonus symbol or other high value symbol is displayed on a payline).

It should also be appreciated that in various other embodiments, the foregoing dynamic hint feature is not automatic, but rather, is: (a) provided upon the occurrence of a designated triggering event; (b) provided upon the placement of a designated wager; (c) provided after a designated number of plays of the game by the player; (d) provided after the player has been playing the game a designated amount of time; (e) provided based on a player's status in a player rewards program; (f) provided based on any combination of the foregoing; or (g) provided based on any other suitable criteria.

In various other embodiments, the player is provided with the potential for higher awards based on how quickly the player plays the game (how quickly the player activates each of the respective stop input devices). In one such embodiment, the game includes a first paytable and a second paytable. The first paytable is used to determine awards if the player plays the game in a first designated amount of time (e.g., greater than or equal to 5 seconds) and the second paytable is used to determine awards if the player plays the game in a second designated amount of time which is less than the first designated amount of time (e.g., less than 5 seconds), wherein the awards are relatively higher in the second paytable than in the first paytable.

In this embodiment, the gaming device also includes a first bonus pool addition look-up table associated with the first paytable and a second bonus pool addition look-up table associated with the second paytable. The respective designated percentages of a player's wager to add to the bonus pools associated with particular combinations of initiating stop positions are relatively lower in the second bonus pool addition look-up table than in the first bonus pool addition look-up table because due to the higher awards in the second paytable, the average expected payback percentage of the component paytables created using the second paytable are higher than those in the component paytables created using the first paytable (because the contributions of the respective awards are higher). Accordingly, not as much of the player's total wager needs added to the bonus pool(s) to bring the adjusted average expected payback percentage associated with the component paytables of certain combinations of initiating stop positions into the designated range of payback percentages (e.g., 80% to 95%) when the player plays the game in the second designated amount of time.

In various other embodiments, the gaming device adjusts the speed of reel decelerations such that the reels come to a stop at the same rate after a respective stop input device is activated. For example, for a first reel, the processor may randomly determine a following stop position at which to stop the first reel which is three symbol positions away. For a second reel, the processor may randomly determine a following stop position at which to stop the second reel which is fifteen symbol positions way. In this embodiment, the gaming device stops both of the first and second reels at the same speed after the respective stop input devices are activated. Thus, the average velocity of the second reel would be higher than that of the first reel as the second reel decelerates.

In various other embodiments, the virtual maps and reel spin speeds may vary when the Pachisuro-style game is provided as a bonus game, providing varying skill levels.

In another embodiment in which the Pachisuro-style game is a bonus game, the reels may spin backwards (or the opposite direction of that in the base game) in the bonus game. This would also require an additional virtual map for each stop position depending on the direction.

In another embodiment, a Pachisuro-style bonus game may challenge the player to hit a specific symbol, or activate the stop input device at the time the specific symbol is displayed at a designated symbol display area while one or more respective reels are spinning. In one such embodiment, each reel will automatically stop a designated number (e.g., two) of stop positions after the stop input device is activated. In certain embodiments of this bonus game, multiple spins of one or more reels are provided to the player and the reel spin speed increases sequentially with each subsequent spin.

In another embodiment in which the Pachisuro-style game is provided as a bonus game, the gaming device improves the players odds of receiving a desired award by using the same paytable for consecutive stop positions. In such embodiments, the virtual maps for one or more consecutive stop positions include the same range of stop positions and respective weights, such that the player has a larger period of time (or range of stop positions) during which to stop the reels.

In another embodiment in which the Pachisuro-style game is a bonus game, the gaming device enables the player to stop each of the plurality of reels of the game at the same time by activating a single stop input device. In this embodiment, when the player selects the stop input device, the reels will stop such that an aligned symbol combination is displayed at the reels.

In various embodiments, the Pachisuro-style game includes different skill levels. In certain such embodiments, a player may receive higher awards for higher skill levels.

The player may select which skill level they want to play. In this case, the player would know that they may receive smaller payouts for the same winning combinations for playing an easy version compared to playing a higher skill level version. In one embodiment, the reels spin faster in higher skill levels. Alternatively, the cost to play may be different to play a higher skill level version.

In other embodiments, digital glass or another suitable display may display a persistence game including storyboarding. In such embodiments, various game events or bonuses in the Pachisuro-style game enable the player to advance in the persistence game.

For example, certain symbols associated with stop positions on the reels could cause certain events to happen in the persistence game. In one simple example, the persistence game has a travel theme in which a player travels to different destinations. A designated symbol is a plane ticket symbol, or other suitable symbol, symbolizing an advance to another destination or level in the persistence game. If this symbol is displayed when the reels come to a stop, the player advances as appropriate in the persistence game. It should be appreciated that such a persistence game may have any game theme in various other embodiments.

In certain other embodiments, a player stops one or more of a plurality of reels in a Pachisuro-style game by activating a stop input device as described in the above detailed embodiment. However, in these embodiments, the processor 12 causes one or more of the reels to stop without player interaction, like a reel in a traditional slot game. Thus, the player has some input into the symbols displayed when the reels stop spinning, but does not control all of the reels.

In another embodiment, the gaming device plays music while the player is playing the Pachisuro-style game. In one such embodiment, the music is synchronized with the spinning of the reels to help the player develop a "rhythm" which aids in stopping the reels at desired times. For example, in one embodiment, the reels spin at 80 revolutions per minute and the music being played includes 80 beats per minute, or a multiple thereof. Additionally, in a higher skill level version, the beats per minute may be slightly different than the revolutions per minute in an attempt to challenge the player's timing.

It should be appreciated that in various other embodiments, the reels may spin at any suitable speed.

It should be appreciated that in various other embodiments, the Pachisuro-style game may include independent reels. Specifically, in such an embodiment, independent reels associated with each respective symbol display area spin independently, in any direction and start and stop at different times as desired by the implementer. It should be appreciated that in such an embodiment, each of a plurality of stop input devices could be associated with a plurality of independent reels (e.g., three) stacked vertically. In one such embodiment, a player stops each of the independent reels in a column by activating the stop input device associated with the column. In other such embodiments, different stop input devices are associated with each respective independent reel, or any suitable number of the independent reels.

It should be appreciated that in various other embodiments, the Pachisuro game is offered in a multi-player configuration. In one such embodiment, different players activate the respective stop input devices for each of a plurality of different reels. In such embodiments, players may share an award in any suitable manner or an award may only be provided to a designated player. It should also be appreciated that in various such embodiments, the multi-player configuration may be provided as a bonus game incorporating a central display, wherein players qualify for the bonus play based on suitable base game or wager-based criteria.

It should be appreciated that in various embodiments, the memory device stores an additional virtual map for each entire reel including each of the stop positions of the respective reel and a weight associated with each respective stop position in the virtual map for the entire reel. In one such embodiment, if the player has not activated the stop input device associated with the mechanical reel after a predetermined amount of time, the processor 12 determines which of the stop positions the mechanical reel will stop at using the virtual map for the entire reel, based on the weights in the virtual map for the entire reel and a randomly determined number.

It should be appreciated that in various other embodiments, if the player has not activated the stop input device associated with the mechanical reel after a predetermined amount of time, the processor randomly determines the initiating stop position for the reel when the reel is spinning.

It should be appreciated that in various embodiments, the memory device may store a component paytable for each combination of stop positions of the plurality of reels, wherein each component paytable has an average expected payback percentage within a designated range of average expected payback percentages.

It should be appreciated that each of the foregoing examples are for illustrative purposes and that any of the features of any of the examples or other disclosure herein may be combined in any manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:
at least one processor;
at least one display device;
at least one input device; and
at least one memory device that stores a plurality of instructions which, when executed by the at least one processor, cause the at least one processor to:
(a) cause the at least one display device to display a plurality of reels, wherein, for each reel:
(i) said reel includes a plurality of stop positions, each stop position including one of a plurality of different symbols; and
(ii) for each stop position of said reel, said stop position is associated with a virtual map including one of a plurality of different sets of the stop positions of said reel, each stop position of said set being associated with one of a plurality of different weights; and
(b) for a play of a game:
(i) cause the at least one display device to display each reel spinning;
(ii) for one of the reels, while said reel is spinning:
(A) cause an indication at a point in time at which a player should provide, via the at least one input device, a stop input such that a probability of a designated winning symbol combination being displayed is maximized;
(B) determine an initiating stop position for said reel responsive to receiving, via the at least one input device, the stop input, the initiating stop position based on said received stop input;

(C) using the weights associated with the stop positions of the virtual map associated with said initiating stop position, determine an actual stop position for said reel; and (D) cause the at least one display device to stop said reel from spinning at said actual stop position;

(iii) determine whether any of a plurality of different winning symbol combinations are displayed; and (iv) cause the at least one display device to display any awards associated with any displayed winning symbol combinations.

2. The gaming system of claim 1, wherein each winning symbol combination is associated with one of a plurality of different awards, and the designated winning symbol combination is associated with a highest one of the plurality of different awards.

3. The gaming system of claim 1, wherein the plurality of instructions, when executed by the at least one processor, cause the at least one processor to not provide (b)(ii) until at least one reel has stopped spinning.

4. The gaming system of claim 3, wherein the plurality of instructions, when executed by the at least one processor, cause the at least one processor to determine the designated winning symbol combination based at least in part on the symbols displayed on the at least one stopped reel.

5. The gaming system of claim 4, wherein the plurality of instructions, when executed by the at least one processor, cause the at least one processor to determine the designated winning symbol combination by:

determining one or more obtainable winning symbol combinations based on the symbols displayed on the at least one stopped reel, determining which of the one or more obtainable winning symbol combinations is associated with a highest award, and setting the obtainable winning symbol combination associated with the highest award as the designated winning symbol combination.

6. The gaming system of claim 1, wherein the indication is at least one of a visual indication and an aural indication.

7. A method of operating a gaming system, said method comprising:

(a) causing, by at least one processor, at least one display device to display a plurality of reels, wherein, for each reel:

(i) said reel includes a plurality of stop positions, each stop position including one of a plurality of different symbols; and (ii) for each stop position of said reel, said stop position is associated with a virtual map including one of a plurality of different sets of the stop positions of said reel, each stop position of said set being associated with one of a plurality of different weights; and (b) for a play of a game:

(i) causing, by the at least one processor, the at least one display device to display each reel spinning;

(ii) for one of the reels, while said reel is spinning:

(A) causing, by the at least one processor, an indication at a point in time at which a player should provide, via at least one input device, a stop input such that a probability of a designated winning symbol combination being displayed is maximized;

(B) determining, by the at least one processor, an initiating stop position for said reel responsive to receiving, via the at least one input device, the stop input, the initiating stop position based on said received stop input;

(C) determining, by the at least one processor and using the weights associated with the stop positions of the virtual map associated with said initiating stop position, an actual stop position for said reel; and (D) causing, by the at least one processor, the at least one display device to stop said reel from spinning at said actual stop position;

(iii) determining, by the at least one processor, whether any of a plurality of different winning symbol combinations are displayed; and (iv) causing, by the at least one processor, the at least one display device to display any awards associated with any displayed winning symbol combinations.

8. The method of claim 7, wherein each winning symbol combination is associated with one of a plurality of different awards, and the designated winning symbol combination is associated with a highest one of the plurality of different awards.

9. The method of claim 7, which includes not providing (b)(ii) until at least one reel has stopped spinning.

10. The method of claim 9, which includes determining, by the at least one processor, the designated winning symbol combination based at least in part on the symbols displayed on the at least one stopped reel.

11. The method of claim 10, which includes determining, by the at least one processor, the designated winning symbol combination by:

determining, by the at least one processor, one or more obtainable winning symbol combinations based on the symbols displayed on the at least one stopped reel, determining, by the at least one processor, which of the one or more obtainable winning symbol combinations is associated with a highest award, and setting, by the at least one processor, the obtainable winning symbol combination associated with the highest award as the designated winning symbol combination.

12. The method of claim 7, wherein the indication is at least one of a visual indication and an aural indication.

13. The method of claim 7, which is provided through a data network.

14. The method of claim 13, wherein the data network is an internet.

15. A gaming system including:

at least one processor;

at least one display device;

at least one input device;

a plurality of mechanical reels, each mechanical reel including a plurality of stop positions, each stop position including one of a plurality of different symbols; and at least one memory device that stores:

(a) for each reel, for each stop position of said reel, a virtual map including one of a plurality of different sets of the stop positions of said reel, each stop position of said set being associated with one of a plurality of different weights; and (b) a plurality of instructions which, when executed by the at least one processor, cause the at least one processor to:

(i) cause each mechanical reel to spin;

(ii) for one of the mechanical reels, while said mechanical reel is spinning:

(A) cause an indication at a point in time at which a player should provide, via the at least one input device, a stop input such that a probability of a designated winning symbol combination being displayed is maximized;

(B) determine an initiating stop position for said mechanical reel responsive to receiving, via the at least one input device, the stop input, the initiating stop position based on said received stop input;

(C) using the weights associated with the stop positions of the virtual map associated with said initiating stop position, determine an actual stop position for said mechanical reel; and (D) stop said mechanical reel from spinning at said actual stop position;

(iii) determine whether any of a plurality of different winning symbol combinations are displayed; and (iv) cause the at least one display device to display any awards associated with any displayed winning symbol combinations.

16. The gaming system of claim 15, wherein each winning symbol combination is associated with one of a plurality of different awards, and the designated winning symbol combination is associated with a highest one of the plurality of different awards.

17. The gaming system of claim 15, wherein the plurality of instructions, when executed by the at least one processor, cause the at least one processor to not provide (b)(ii) until at least one mechanical reel has stopped spinning.

18. The gaming system of claim 17, wherein the plurality of instructions, when executed by the at least one processor, cause the at least one processor to determine the designated winning symbol combination based at least in part on the symbols displayed on the at least one stopped mechanical reel.

19. The gaming system of claim 18, wherein the plurality of instructions, when executed by the at least one processor, cause the at least one processor to determine the designated winning symbol combination by:

determining one or more obtainable winning symbol combinations based on the symbols displayed on the at least one stopped mechanical reel, determining which of the one or more obtainable winning symbol combinations is associated with a highest award, and setting the obtainable winning symbol combination associated with the highest award as the designated winning symbol combination.

20. The gaming system of claim 15, wherein the indication is at least one of a visual indication and an aural indication.

21. A gaming system comprising:

at least one processor; and at least one memory device that stores a plurality of instructions that, when executed by the at least one processor, cause the at least one processor to:

(a) cause at least one display device to display a plurality of reels, wherein, for each reel:

(i) said reel includes a plurality of stop positions, each stop position including one of a plurality of different symbols; and (ii) for each stop position of said reel, said stop position is associated with a virtual map including one of a plurality of different sets of the stop positions of said reel, each stop position of said set being associated with one of a plurality of different weights; and (b) for a play of a game:

(i) cause the at least one display device to display each reel spinning;

(ii) for one of the reels, while said reel is spinning:

(A) cause an indication at a point in time at which a player should provide a stop input such that a probability of a designated winning symbol combination being displayed is maximized;

(B) determine an initiating stop position for said reel responsive to receiving the stop input, the initiating stop position based on said received stop input;

(C) using the weights associated with the stop positions of the virtual map associated with said initiating stop position, determine an actual stop position for said reel; and (D) cause the at least one display device to stop said reel from spinning at said actual stop position;

(iii) determine whether any of a plurality of different winning symbol combinations are displayed; and (iv) cause the at least one display device to display any awards associated with any displayed winning symbol combinations.

22. The gaming system of claim 21, wherein each winning symbol combination is associated with one of a plurality of different awards, and the designated winning symbol combination is associated with a highest one of the plurality of different awards.

23. The gaming system of claim 21, wherein the plurality of instructions, when executed by the at least one processor, cause the at least one processor to not provide (b)(ii) until at least one reel has stopped spinning.

24. The gaming system of claim 23, wherein the plurality of instructions, when executed by the at least one processor, cause the at least one processor to determine the designated winning symbol combination based at least in part on the symbols displayed on the at least one stopped reel.

25. The gaming system of claim 24, wherein the plurality of instructions, when executed by the at least one processor, cause the at least one processor to determine the designated winning symbol combination by:

determining one or more obtainable winning symbol combinations based on the symbols displayed on the at least one stopped reel, determining which of the one or more obtainable winning symbol combinations is associated with a highest award, and setting the obtainable winning symbol combination associated with the highest award as the designated winning symbol combination.

* * * * *